(12) United States Patent
Zhou et al.

(10) Patent No.: US 10,681,326 B2
(45) Date of Patent: Jun. 9, 2020

(54) 360 DEGREE VIDEO SYSTEM WITH COORDINATE COMPRESSION

(71) Applicant: Avago Technologies General IP (Singapore) Pte. Ltd., Singapore (SG)

(72) Inventors: Minhua Zhou, San Diego, CA (US); Xuemin Chen, Rancho Santa Fe, CA (US); Yi Hu, Cambridge (GB)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 306 days.

(21) Appl. No.: 15/599,443

(22) Filed: May 18, 2017

(65) Prior Publication Data

US 2017/0339391 A1    Nov. 23, 2017

Related U.S. Application Data

(60) Provisional application No. 62/339,040, filed on May 19, 2016.

(51) Int. Cl.
*H04N 13/106* (2018.01)
*H04L 29/06* (2006.01)
(Continued)

(52) U.S. Cl.
CPC ....... *H04N 13/106* (2018.05); *H04L 65/4092* (2013.01); *H04L 65/602* (2013.01);
(Continued)

(58) Field of Classification Search
CPC ............... H04N 13/106; H04N 13/161; H04N 5/23238; H04N 21/21805; H04N 21/854;
(Continued)

(56) References Cited

U.S. PATENT DOCUMENTS

2002/0074669 A1    6/2002  Watanabe et al.
2004/0263636 A1    12/2004 Cutler
(Continued)

OTHER PUBLICATIONS

European Office Action from European Patent Application No. 12006331.8, dated Nov. 19, 2018, 6 pages.

*Primary Examiner* — John R Schnurr
(74) *Attorney, Agent, or Firm* — Morgan, Lewis & Bockius LLP

(57) ABSTRACT

In a system for 360 degree video capture and playback, 360 degree video may be captured, stitched, encoded, decoded, rendered, and played-back. In one or more implementations, a video capture device captures 360 degree video in a first projection format, and an encoding device encodes the captured 360 degree video into a 360 degree video bitstream. In some aspects, the 360 degree video bitstream is encoded with an indication of the first projection format. In one or more implementations, a rendering device converts the decoded 360 degree video bitstream from the first projection format to a second projection format based on the indication. In one or more implementations, a processing device generates projection maps where each is respectively associated with a different projection format, and a rendering device renders the decoded 360 degree video bitstream using one of the projections maps.

20 Claims, 41 Drawing Sheets

(51) Int. Cl.
*H04N 21/218* (2011.01)
*H04N 21/854* (2011.01)
*H04N 13/161* (2018.01)
*H04N 5/232* (2006.01)
*H04N 13/156* (2018.01)
*H04N 13/243* (2018.01)

(52) U.S. Cl.
CPC .......... *H04L 65/604* (2013.01); *H04L 65/607* (2013.01); *H04N 5/23238* (2013.01); *H04N 13/161* (2018.05); *H04N 21/21805* (2013.01); *H04N 21/854* (2013.01); *H04N 13/156* (2018.05); *H04N 13/243* (2018.05)

(58) Field of Classification Search
CPC .................. H04N 13/156; H04N 13/243; H04L 65/4092; H04L 65/602; H04L 65/604; H04L 65/607
See application file for complete search history.

(56) References Cited

U.S. PATENT DOCUMENTS

| | | |
|---|---|---|
| 2009/0324010 A1 | 12/2009 | Hou |
| 2010/0001997 A1* | 1/2010 | Kajikawa ................ G06T 17/20 345/419 |
| 2010/0270667 A1 | 10/2010 | Tong et al. |
| 2012/0307004 A1 | 12/2012 | Budagavi |
| 2016/0352791 A1* | 12/2016 | Adams ................ H04L 65/4069 |
| 2016/0353089 A1* | 12/2016 | Gallup ................ G02B 27/0172 |
| 2016/0353090 A1* | 12/2016 | Esteban ............. G02B 27/0172 |
| 2017/0251208 A1* | 8/2017 | Adsumilli ................ G06T 3/20 |
| 2017/0287200 A1* | 10/2017 | Forutanpour ............ G06T 15/04 |
| 2017/0301065 A1* | 10/2017 | Adsumilli ............... G06T 5/001 |
| 2017/0323423 A1* | 11/2017 | Lin ....................... H04N 13/139 |
| 2017/0332107 A1* | 11/2017 | Abbas .................... H04N 19/86 |
| 2018/0027186 A1 | 1/2018 | Jung |
| 2018/0053280 A1 | 2/2018 | Kim |
| 2018/0174314 A1 | 6/2018 | Bippus |
| 2019/0068879 A1* | 2/2019 | Bao .......................... G06T 7/80 |

* cited by examiner $$\text{for } (i=0; i<m; i++)\{$$
$$\text{for } (j=0; j<n; j++)\{$$
$$X_p = projectMapY[2n * X_c + j, 2m * Y_c + i].X_p;$$
$$Y_p = projectMapY[2n * X_c + j, 2m * Y_c + i].Y_p;$$
$$projectMapUV[n * X_c + j, m + Y_c + i] = (\frac{X_p}{2}, \frac{Y_p}{2})$$
$$\}$$
$$\}$$
where $X_c = 0, 1, ..., picWidthUV-1; Y_c = 0, 1, ..., picHeightUV-1$

```
for (i=0; i < m; i++){
  for (j=0; j < n; j++){
    X_p=projectMapY[2n * X_c + j, m*Y_c + i].X_p;
    Y_p=projectMapY[2n * X_c + j, m*Y_c + i].Y_p;
    projectMapUV[n * X_c + j, m*Y_c + i]= ( X_p/2 , Y_p);
  }
}
where X_c=0, 1, ..., picWidthUV-1; Y_c=0, 1, ..., picHeightUV-1
```

X-Coordinates

| | | | | | | | | | |
|---|---|---|---|---|---|---|---|---|---|
| 12662 | 12663 | 12664 | 12665 | 12667 | 12668 | 12669 | 12670 | 12671 | 12672 |
| | | 12663 | 12664 | 12665 | 12666 | 12667 | 12668 | 12669 | 12670 |
| | | 12661 | 12662 | 12663 | 12664 | 12665 | 12666 | 12667 | 12668 |
| | | 12669 | 12660 | 12661 | 12662 | 12663 | 12664 | 12665 | 12666 |
| | | 12667 | 12668 | 12669 | 12660 | 12661 | 12662 | 12663 | 12664 |
| | | 12665 | 12666 | 12667 | 12658 | 12659 | 12660 | 12661 | 12663 |
| | | 12663 | 12665 | 12666 | 12667 | 12658 | 12659 | 12660 | 12661 |
| Cache Model | | 12662 | 12663 | 12664 | 12668 | 12656 | 12657 | 12658 | 12659 |

X Coordinate Residuals

```
 0  0  1 -1  0  0  0  0
-1  0 -1  0  0  0  0  0
-1  0  0  0  0  0  0  0
 0  0  0  0  0  0  0  0
 0  0  0  0  0  0  0  0
 0  0  0  0  0  0 -1  0
 0  0  0  0  0  0  0  0
 1 -1  0  0  0  0  0  0
```

Y-Coordinates

| | | | | | | | | | |
|---|---|---|---|---|---|---|---|---|---|
| 5636 | 5637 | 5638 | 5639 | 5640 | 5641 | 5642 | 5643 | 5643 | 5644 |
| | | 5638 | 5639 | 5640 | 5641 | 5642 | 5642 | 5643 | 5644 |
| | | 5639 | 5640 | 5640 | 5641 | 5641 | 5642 | 5643 | 5644 |
| | | 5639 | 5640 | 5641 | 5641 | 5642 | 5643 | 5643 | 5644 |
| | | 5639 | 5640 | 5641 | 5642 | 5642 | 5643 | 5644 | 5645 |
| | | 5640 | 5641 | 5641 | 5642 | 5643 | 5644 | 5644 | 5645 |
| | | 5640 | 5641 | 5642 | 5642 | 5643 | 5644 | 5645 | 5646 |
| | | 5641 | 5642 | 5643 | 5644 | 5645 | 5645 | 5646 | 5647 |

Y Coordinate Residuals

```
 0  0  0  0  0 -1  1
 0  0  0  0  0  1  0
 1  0  0 -1  0  0  0
-1  0  0  1  0  0  0
 0  0  0  0  0  0  0
 1  0  0  0  0  0  0
-1  0  0  0  0  0  0
 1  0  0  0  0  0 -1  0
```

Line by Line Interleaved X, Y Coordinate Residuals

```
 0  0  1 -1  0  0  0  0  0  0  0  0  0 -1  1
 0  0  0  0  0  0 -1  1  0  0  0  0  0  1  0
-1  0 -1  0  0  0  0  0  1  0  0 -1  0  0  0
 0  0  0  0  0  0  0  1  0 -1  0  0  1  0  0  0
-1  0  0  0  0  0  0  0  0  0  0  0  0  0  0
 0  0  0  0 -1  0  0  0  1  0  0  0  0  0  0
 0  0  0  0  0  0  0  0 -1  0  0  0  0  0  0
 0  0  0  0  0  0  0  0  1 -1  0  0  0  0 -1  0
```

360 DEGREE VIDEO SYSTEM WITH COORDINATE COMPRESSION

CROSS-REFERENCE TO RELATED APPLICATIONS

The present application claims the benefit of priority under 35 U.S.C. § 119 from U.S. Provisional Patent Application Ser. No. 62/339,040 entitled "360 DEGREE VIDEO CAPTURE AND PLAYBACK," filed on May 19, 2016, the disclosure of which is hereby incorporated by reference in its entirety for all purposes.

TECHNICAL FIELD

The present disclosure relates to video capture and playback, and more particularly to 360 degree video system with coordinate compression.

BACKGROUND 360 degree video, also known as 360 degree videos, immersive videos, and/or spherical videos, are video recordings of a real-world panorama, where the view in every direction is recorded at the same time, shot using an omni-directional camera or a collection of cameras. During playback, the viewer has control of field of view (FOV) angles and viewing directions (a form of virtual reality).

BRIEF DESCRIPTION OF THE DRAWINGS

Certain features of the subject technology are set forth in the appended claims. However, for purpose of explanation, one or more implementations of the subject technology are set forth in the following figures.

FIG. 37 conceptually illustrates an example of XY-interleaved coordinate residual block after coordinate prediction and interleaving.

FIG. 42 is a Table illustrating examples of coordinate residual compression (residual, coding symbols and VLC codes).

The accompanying appendix, which is included to provide further understanding of the subject technology and are incorporated in and constitute a part of this specification, illustrate aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

In a system for 360 degree video capture and playback, 360 degree video may be captured, stitched, encoded, transmitted, stored, decoded, rendered, and played-back. In one or more implementations, a video capture device captures 360 degree video in a first projection format, and an encoding device encodes the captured 360 degree video into a 360 degree video bitstream. In some aspects, the 360 degree video bitstream is encoded with an indication of the first projection format. In one or more implementations, a rendering device converts the decoded 360 degree video bitstream from the first projection format to a second projection format based on the indication. In one or more implementations, a processing device generates projection maps where each is respectively associated with a different projection format, and a rendering device renders the decoded 360 degree video bitstream using one of the projections maps.

Figure 1:
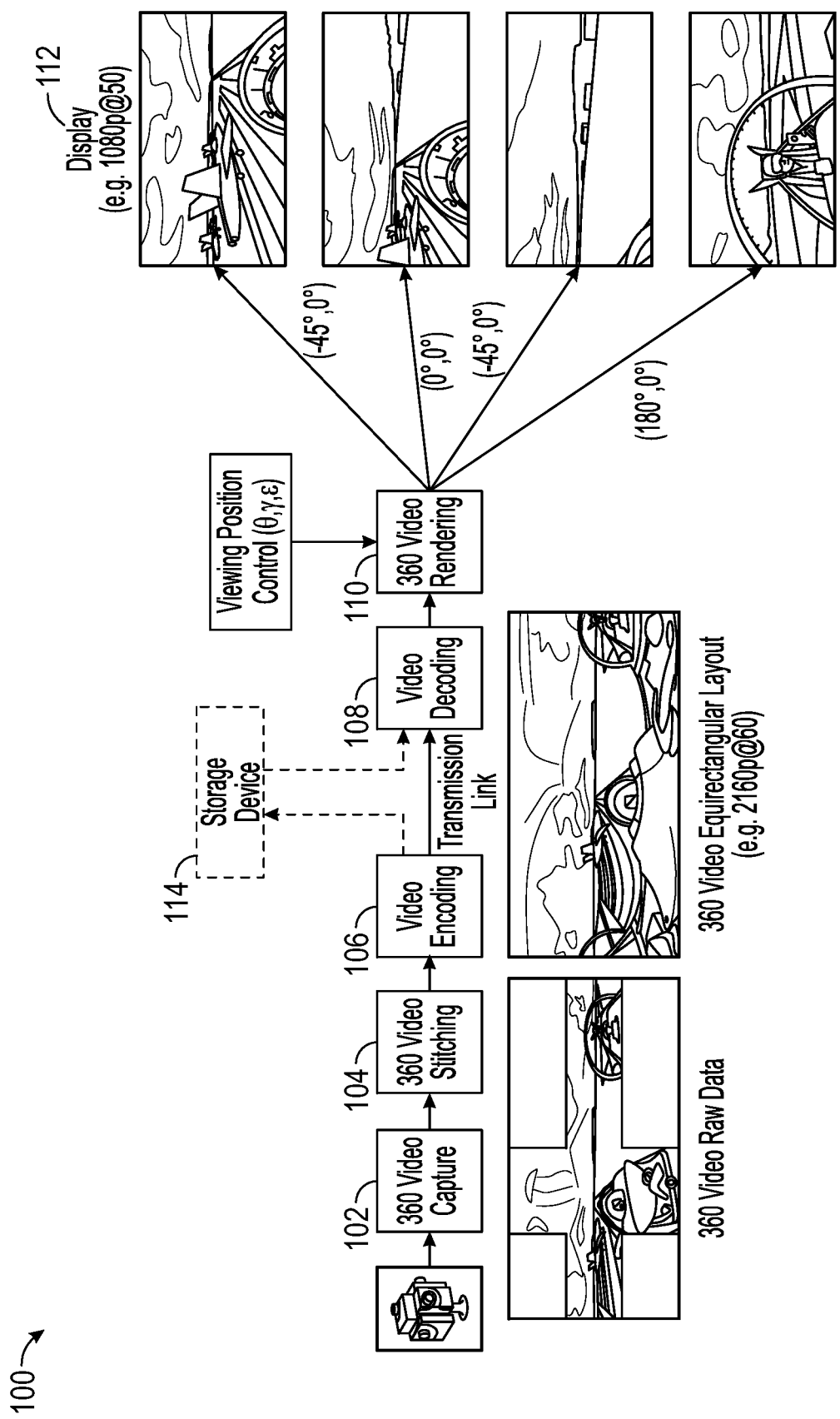
FIG. 1 illustrates an example network environment in which 360 degree video capture and playback may be implemented in accordance with one or more implementations.

FIG. 1 illustrates an example network environment 100 in which 360 degree video capture and playback can be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a 360 degree video capture device 102, a 360 degree video stitching device 104, a video encoding device 106, a transmission link or storage media, a video decoding device 108, and a 360 degree video rendering device 110. In one or more implementations, one or more of the devices 102, 104, 106, 108, 110 may be combined into the same physical device. For example, the 360 degree video capture device 102, the 360 degree video stitching device 104, and the video encoding device 106 may be combined into a single device, and the video decoding device 108 and the 360 degree video rendering device 110 may be combined into a single device. In some aspects, the network environment 100 may include a storage device 114 that stores the encoded 360 degree video (such as on DVDs, Blueray, using Digital Video Recorder (DVR) mode to record at the cloud or gateway/set-top-box) and then played back on a display device (e.g., 112).

The network environment 100 may further include a 360 degree video projection format conversion device (not shown) that may perform 360 degree video projection format conversion before the video encoding by the video encoding device 106 and/or after the video decoding by the video decoding device 108. The network environment 100 may also include a 360 degree video projection format conversion device (not shown) that is inserted between video decoding device 108 and 360 degree video rendering device 110. In one or more implementations, the video encoding device 106 may be communicatively coupled to the video decoding device 108 via a transmission link, such as over a network. In one or more implementations, the compressed 360 video produced by the video encoding device 106 may be recorded on a storage device 114, and input into the video decoding device 108 directly from the storage device 114 during the playback. In the subject system, the 360 degree video stitching device 104 may utilize an additional coordinate system that provides more freedom on the 360 degree video capture side when projecting captured 360 degree video to a 2D input picture coordinate system for storage or transmission. The 360 degree video stitching device 104 may also support multiple projection formats for 360 degree video storage, compression, transmission, decoding, rendering, etc. For example, the video stitching device 104 may remove overlapped areas captured by a camera rig, and output e.g. six view sequences that each covers a 90°×90° viewport. The 360 degree video projection format conversion device (not shown) may convert an input 360 degree video projection format (e.g. cube projection format) to an output 360 degree video projection format (e.g. the equirectangular format).

The video encoding device 106 may minimize spatial discontinuities (i.e. the number of face boundaries) in the composed picture, for better spatial prediction thus better compression efficiency in the video compression. For the cube projection for example, a preferable layout may have the minimized number of face boundaries, e.g. 4, within a composed 360 degree video picture. The video encoding device 106 may implement unrestricted motion compensation (UMC) for better compression efficiency.

In the subject system, the 360 degree video rendering device 110 may derive a chroma projection map from a Luma prediction map. The 360 degree video rendering device 110 may also chose the rendering picture size to maximize the display video quality. The 360 degree video rendering device 110 may also jointly select the horizontal FOV angle α and the vertical FOV angle β to minimize the rendering distortion. The 360 degree video rendering device 110 may also control the FOV angles to realize real-time 360 degree video rendering subject to available memory bandwidth budget.

In FIG. 1, the 360 degree video is captured by a camera rig, and stitched together into the equirectangular format. The video is then compressed into any suitable video compression format (e.g. MPEG/ITU-T AVC/H.264, HEVC/H.265, VP9 etc.) and transmitted via transmission link (e.g. cable, satellite, terrestrial, internet streaming, etc.). On the receiver side, the video is decoded (e.g., 108) and stored in the equirectangular format, then is rendered (e.g., 110) according to the viewing direction angles and field of view (FOV) angles, and displayed (e.g., 112). In the subject system, the end-users have control of FOV angles and viewing direction angles in order to view the video at desired viewing angles.

Coordinate Systems

There are multiple coordinate systems that apply to the subject technology, including, but not limited to:

(x, y, z)—3D 360 degree video capture (camera) coordinate system (x', y', z')—3D 360 degree video viewing coordinate system ($x_p$, $y_p$)—2D normalized projection coordinate system, with $x_p \in [0.0:1.0]$ and $y_p \in [0.0:1.0]$.

($X_p$, $Y_p$)—2D input picture coordinate system, with $X_p \in$ [0: inputPicWidth−1] and $Y_p \in$ [0: inputPicHeight−1], where inputPicWidth×inputPicHeight is input picture size of a color component (e.g. Y, U or V).

($x_c$, $y_c$)—2D normalized rendering coordinate system, with $x_c \in [0.0:1.0]$ and $y_c \in [0.0:1.0]$.

($X_c$, $Y_c$)— 2D output rendering picture coordinate system, with $X_c \in$ [0: renderingPicWidth−1] and $Y_c \in$ [0: renderingPicHeight−1], where picWidth×picHeight is the output rendering picture size of a color component (e.g. Y, U or V).

($x_r$, $y_r$, $z_r$)—3D 360 degree video projection coordinate system

Figure 2:
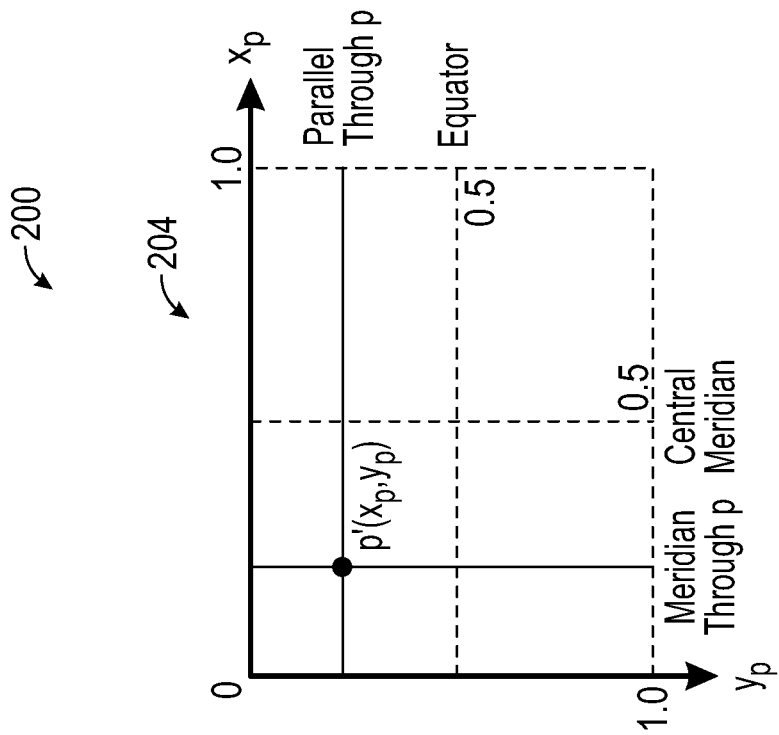
FIG. 2 conceptually illustrates an example of an equirectangular projection format.
Figure 2:
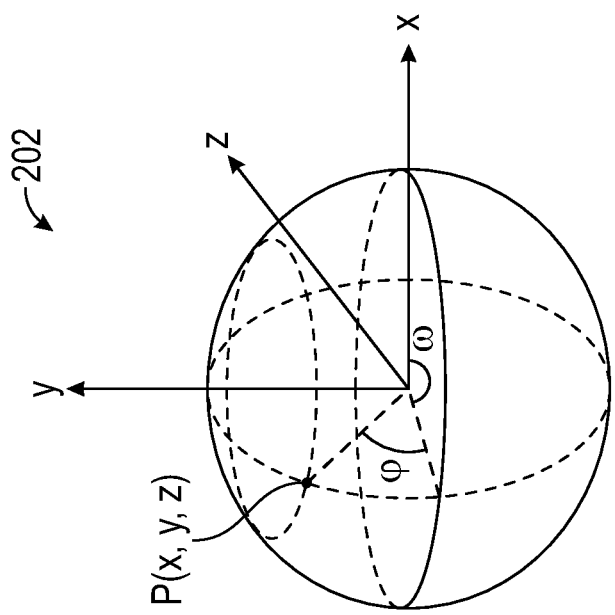

FIG. 2 conceptually illustrates an example of an equirectangular projection format 200. The equirectangular projection format 200 represents a standard way of texture mapping a sphere in computer graphics. It is also known as equidistant cylindrical projection, geographic projection, plate cane or carte parallelogrammatique. As shown in FIG. 2, to project a sphere surface point p(x, y, z) (e.g., 202) to a sample p'($x_p$, $y_p$) in the normalized projection coordinate system (e.g., 204), both longitude ω and latitude φ are computed for p(x, y, z) according to Equation 1.

$$\begin{cases} \omega = \arctan2(x, z) \\ \varphi = \arcsin\left(\dfrac{y}{\sqrt{x^2 + y^2 + z^2}}\right) \end{cases} \quad \text{Equation 1}$$

where $\omega \in [-\pi:\pi]$ and $\varphi \in \left[-\dfrac{\pi}{2}:\dfrac{\pi}{2}\right]$.

π is the ratio of a circle's circumference to its diameter, commonly approximated as 3.1415926.

The equirectangular projection format 200 may be defined as in Equation 2:

$$\begin{cases} x_p = \dfrac{\omega}{2\pi} + 0.5 \\ y_p = -\dfrac{\varphi}{\pi} + 0.5 \end{cases}, \quad \text{Equation 2}$$

where $x_p \in [0.0:1.0]$ and $y_p \in [0.0:1.0]$. ($x_p$, $y_p$) is the coordinate in the normalized projection coordinate system.

Figure 3:
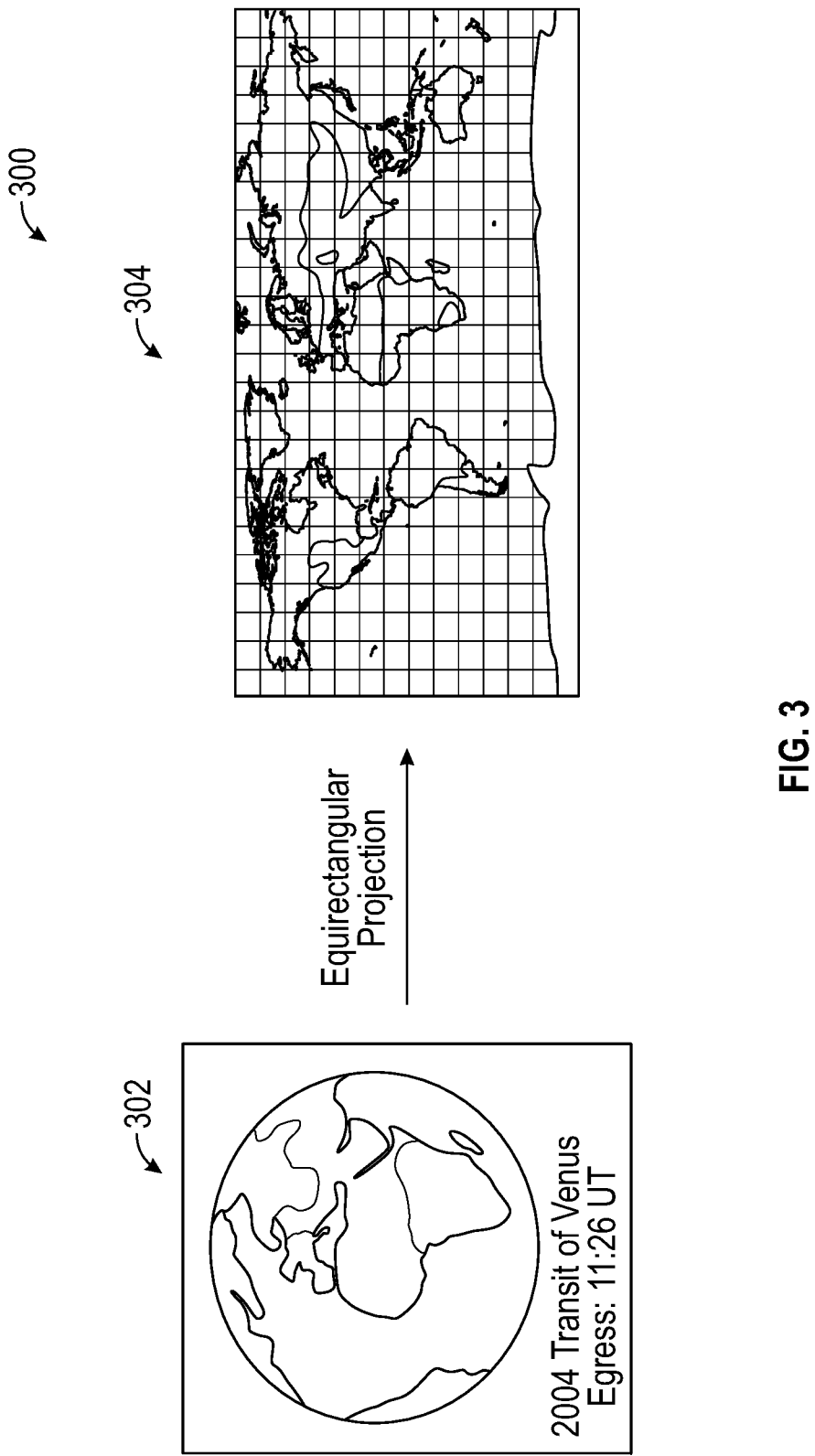
FIG. 3 conceptually illustrates an example of an equirectangular projection with Earth map.

FIG. 3 conceptually illustrates an example of an equirectangular projection format 300 with Earth map. In the equirectangular projection format 300, the picture has 1:1 mapping along the equator only, and is stretched elsewhere. The largest mapping distortion occurs at north and South Pole of a sphere (e.g., 302), where a single point is mapped to line of samples on the equirectangular projection picture (e.g., 304), resulting in lots of redundant data in the composed 360 degree video using the equirectangular projection format 300.

Figure 4:
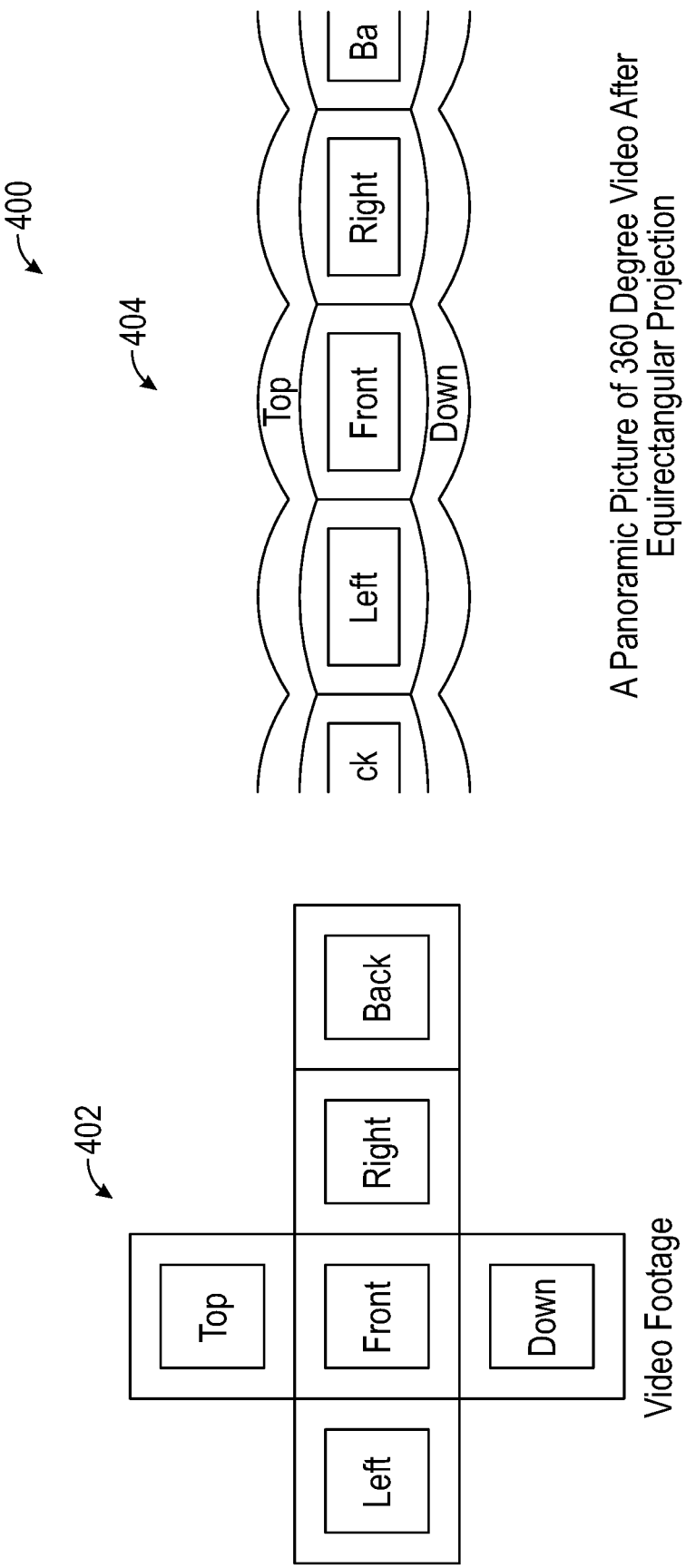
FIG. 4 conceptually illustrates an example of 360 degree video with equirectangular projection.
Figure 5:
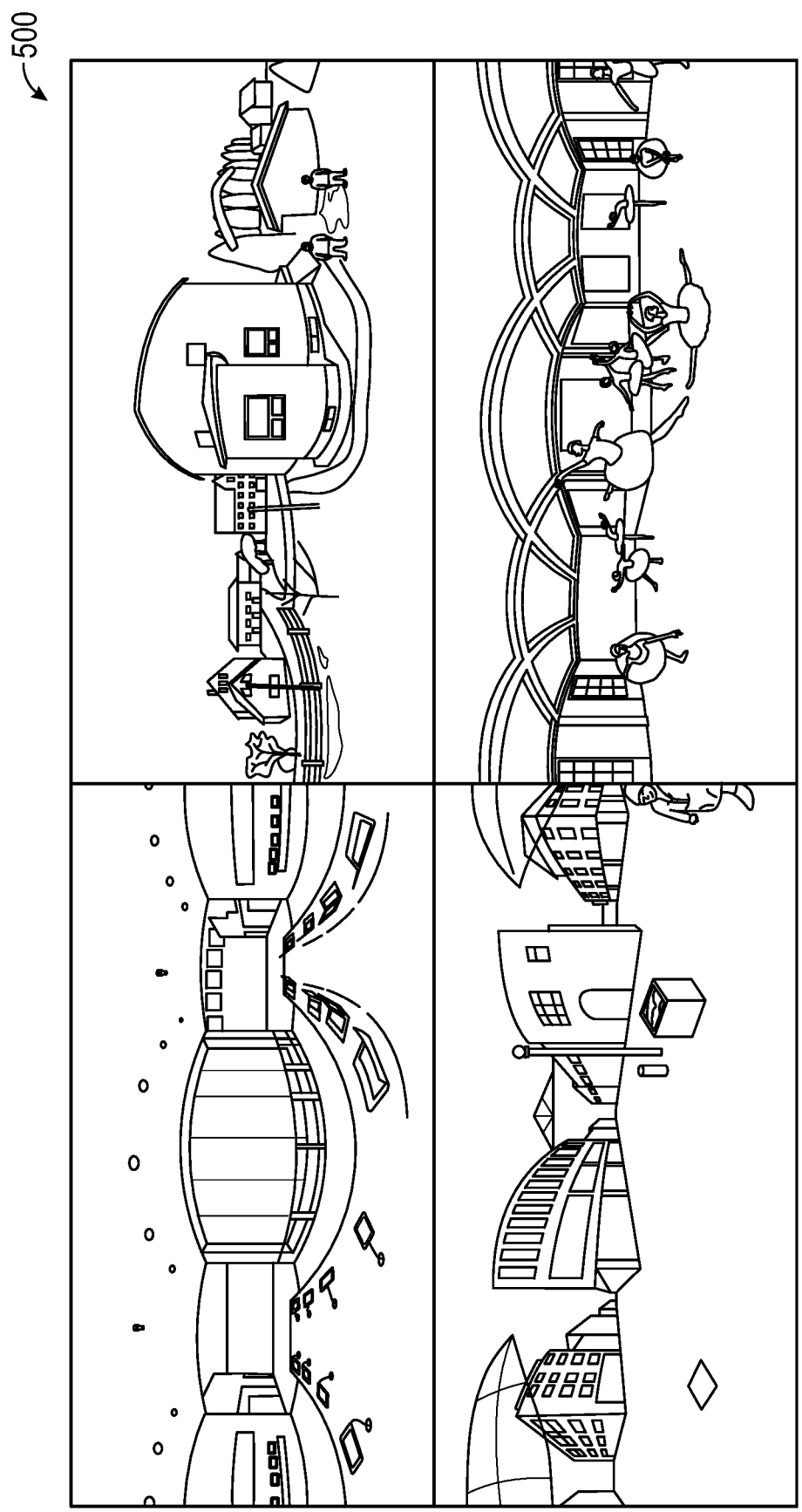
FIG. 5 conceptually illustrates examples of 360 degree images in equirectangular projection format.

FIG. 4 conceptually illustrates an example of 360 degree video with equirectangular projection format 400. To leverage the existing infrastructure for video delivery in which single layer video codec is employed, the 360 degree video footages (e.g., 402) captured by multiple cameras at different angles are normally stitched and composed into a single video sequence stored in the equirectangular projection format. As shown in FIG. 4, in the equirectangular projection format 400, the left, front and right video footage of the 360 degree video is projected in the middle of the picture, the back video footage is split evenly and placed in the left and right sides of the picture; the top and down video forage is placed on the top and bottom part of the picture, respectively (e.g., 404). All the video footage is stretched, with the top and down video footage being stretched the most. FIG. 5 conceptually illustrates examples of 360 degree video images in equirectangular projection format.

Cube Projection

Figure 6:
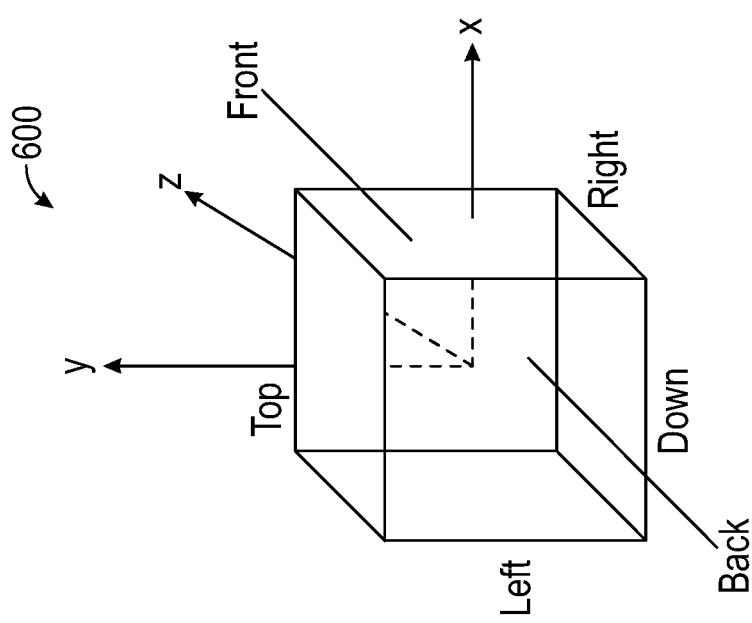
FIG. 6 conceptually illustrates an example definition of a six-faced cube.

FIG. 6 conceptually illustrates an example definition of a six-faced cube 600. Another common projection format to store the 360 degree view is to project video footage to cube faces. As shown in FIG. 6 the six faces of a cube are named as Front, Back, Left, Right, Top and Down.

Figure 7:
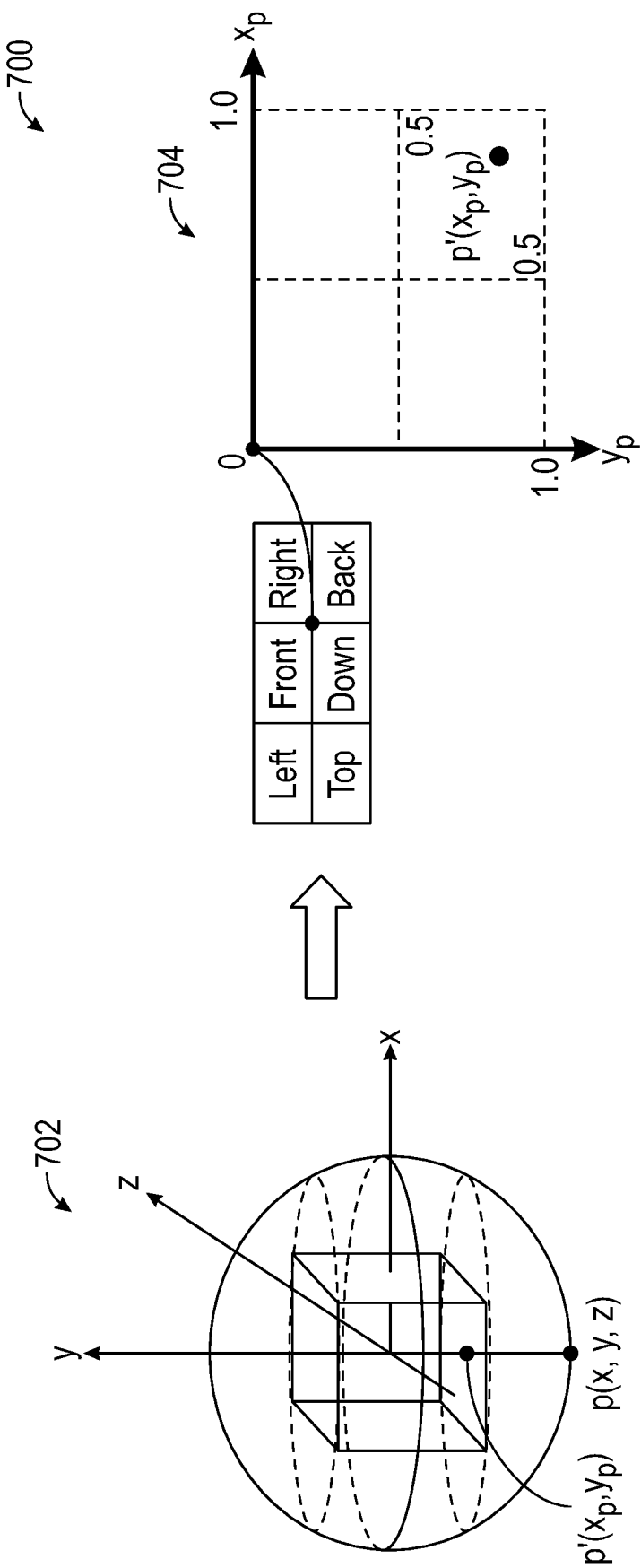
FIG. 7 conceptually illustrates an example of a cube projection format.

FIG. 7 conceptually illustrates an example of a cube projection format 700. In FIG. 7, the cube projection format 700 includes mapping a sphere surface point p(x, y, z) to one of six cube faces (e.g., 702), in which both the cube face ID and coordinate ($x_p$, $y_p$) in the normalized cube projection coordinate system are computed (e.g., 704).

Figure 8:
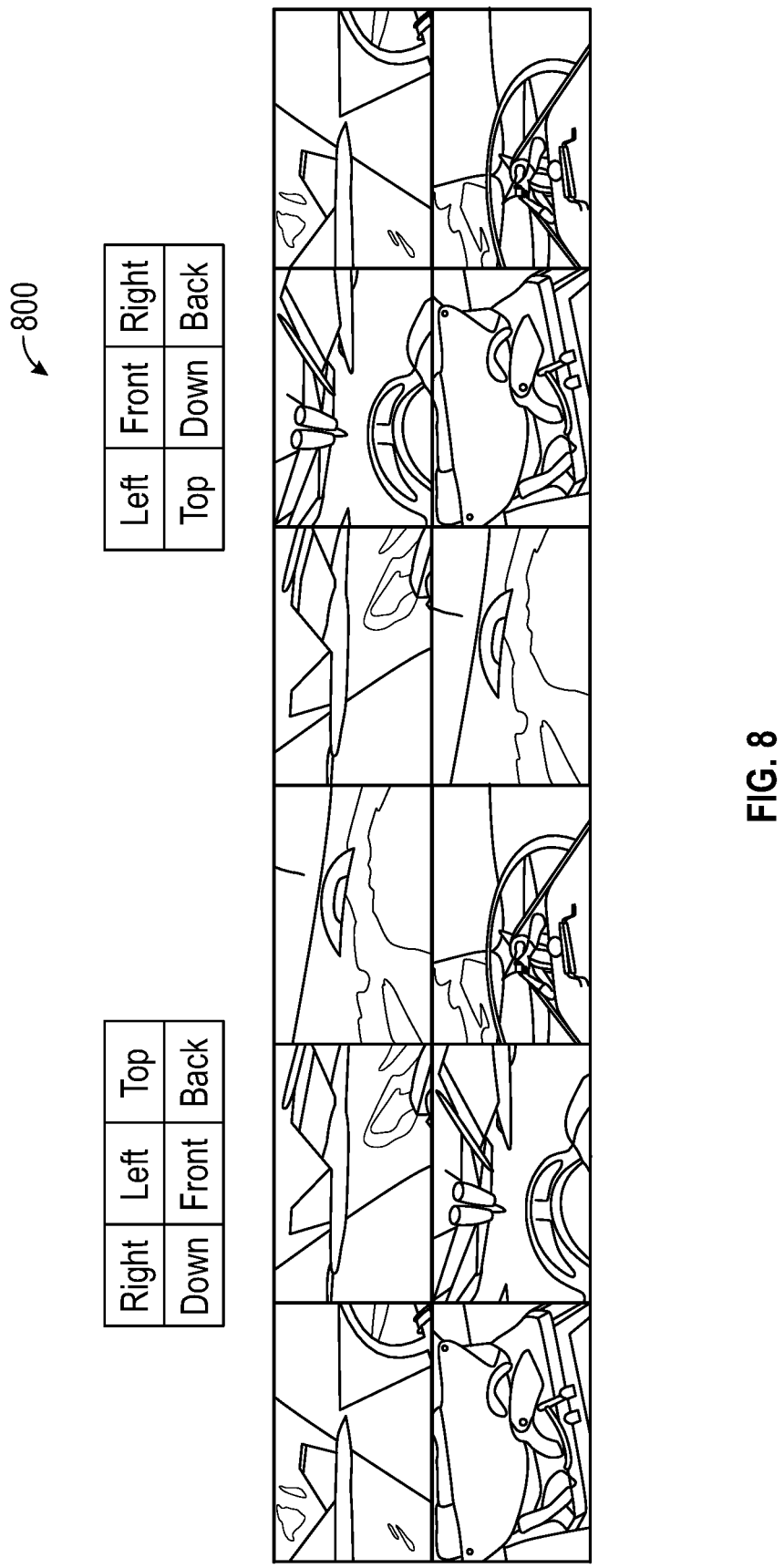
FIG. 8 conceptually illustrates examples of 360 degree images in cube projection format.

FIG. 8 conceptually illustrates examples of 360 degree video images in the cube projection format 800. The projection rule of the cube projection is described in Table 1, where pseudo code for mapping a sphere surface point p(x, y, z) to a cube face is provided.

TABLE 1

Pseudo-code for Cube Projection Mapping if (z > 0&&(−z ≤ y ≤ z)&&(−z ≤ x ≤ z))

$$\left\{ \text{faceID} = \text{Front}; x_p = \dfrac{z + x}{2z}; y_p = \dfrac{z - y}{2z} \right\}$$

else if (z < 0&&(z ≤ y ≤ −z)&&(z ≤ x ≤ −z))

$$\left\{ \text{faceID} = \text{Back}; x_p = \dfrac{z + x}{2z}; y_p = \dfrac{z + y}{2z} \right\}$$

else if (x > 0&&(−x ≤ y ≤ x)&&(−x ≤ z ≤ x))

TABLE 1-continued

Pseudo-code for Cube Projection Mapping $$\left\{\text{faceID} = \text{Right};\ x_p = \frac{x-z}{2x};\ y_p = \frac{x-y}{2x}\right\}$$

else if (x < 0 && (x ≤ y ≤ -x) && (x ≤ z ≤ -x))

$$\left\{\text{faceID} = \text{Left};\ x_p = \frac{x-z}{2x};\ y_p = \frac{x+y}{2x}\right\}$$

else if (y > 0 && (-y ≤ x ≤ y) && (-y ≤ z ≤ y))

$$\left\{\text{faceID} = \text{Top};\ x_p = \frac{y+x}{2y};\ y_p = \frac{y+z}{2y}\right\}$$

else if (y < 0 && (y ≤ x ≤ -y) && (y ≤ z ≤ -y))

$$\left\{\text{faceID} = \text{Down};\ x_p = \frac{y-x}{2y};\ y_p = \frac{y+z}{2y}\right\}$$

Field of View (FOV) and Viewing Direction Angles

For display of 360 degree video, a portion of each 360 degree video picture needs to be projected and rendered. The field of view (FOV) angles define how big portion of a 360 degree video picture is displayed, while the viewing direction angles defines which portion of the 360 degree video picture is shown.

For displaying a 360 degree video, just imagine that the video is mapped on a unity sphere surface, a viewer sitting at the center point of the sphere is able to view a rectangular screen, and the screen has its four corners located on the sphere surface. Here (x', y', z') is called the 360 view viewing coordinate system and $(x_c, y_c)$ is referred as the normalized rendering coordinate system.

Figure 9:
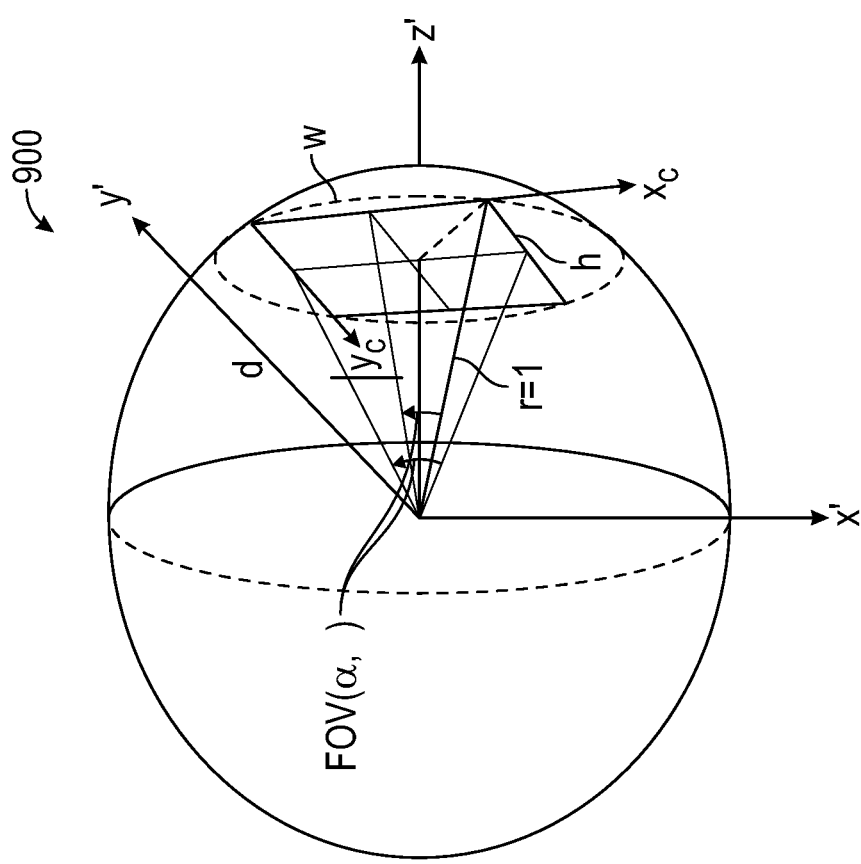
FIG. 9 conceptually illustrates an example of a normalized projection plane size determined by field-of-view angles.

FIG. 9 conceptually illustrates an example of a normalized projection plane size 900 determined by field-of-view angles. As shown in FIG. 9, in the viewing coordinate system (x',y',z'), the center point of the projection plane (i.e. the rectangular screen) is located on z' axis and is parallel to x'y' plane. Therefore, the projection plane size w×h and its distance to the center of the sphere d can be computed by:

$$\begin{cases} w = \dfrac{2ta}{\sqrt{ta^2 + tb^2 + 1}} \\ h = \dfrac{2tb}{\sqrt{ta^2 + tb^2 + 1}} \\ d = \dfrac{1}{\sqrt{ta^2 + tb^2 + 1}} \end{cases} \quad \text{Equation 3}$$

where $ta = \tan\left(\dfrac{\alpha}{2}\right)$ and $tb = \tan\left(\dfrac{\beta}{2}\right)$ and $\alpha \in (0:\pi]$ is the horizontal FOV angle and $\beta \in (0:\pi]$ is the vertical FOV angle.

Figure 10:
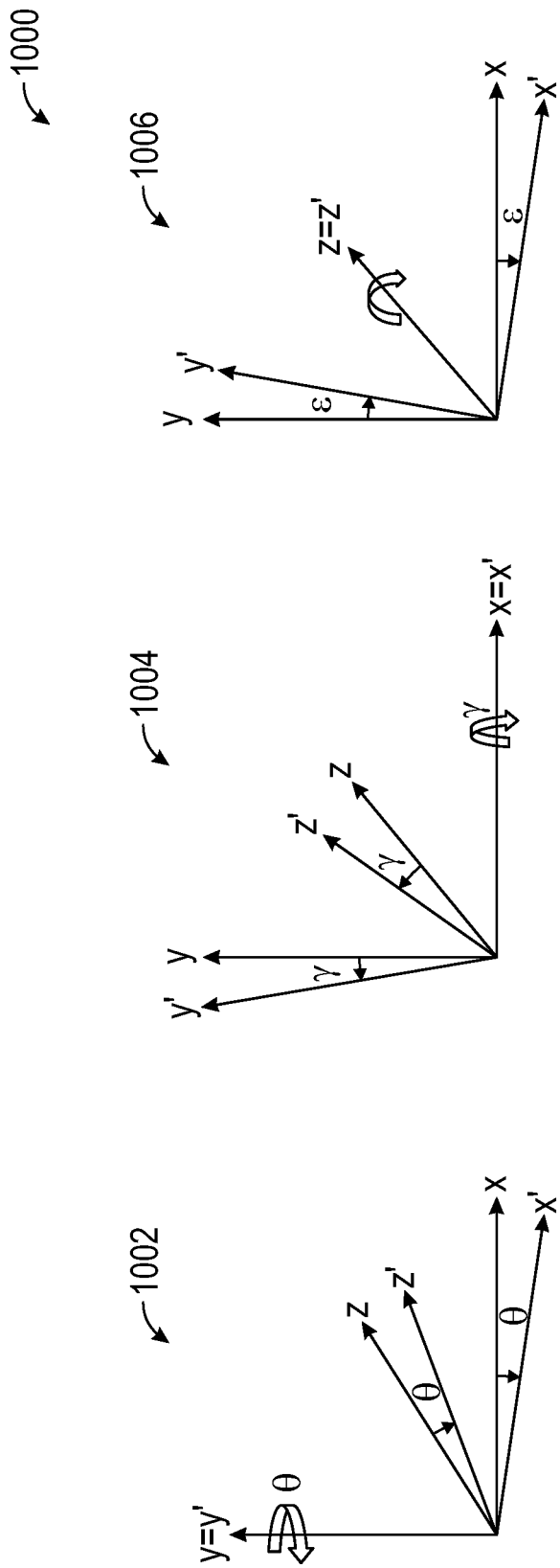
FIG. 10 conceptually illustrates an example of viewing direction angles.

FIG. 10 conceptually illustrates an example of viewing direction angles 1000. The viewing direction is defined by rotation angles of the 3D viewing coordinate system (x', y', z') relative to the 3D capture coordinate system (x,y,z). In one or more implementations, the viewing direction angles are defined as the clockwise rotation angle θ along y axis (e.g., 1002, yaw), the counterclockwise rotation angle γ along x axis (e.g., 1004, pitch), and the counterclockwise rotation angle ε along z axis (e.g., 1006, roll).

In one or more implementations, the coordinate mapping between the (x,y,z) and (x',y',z') coordinate system is defined as:

$$\begin{bmatrix} x \\ y \\ z \end{bmatrix} = \begin{bmatrix} \cos\epsilon & \sin\epsilon & 0 \\ -\sin\epsilon & \cos\epsilon & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} 1 & 0 & 0 \\ 0 & \cos\gamma & \sin\gamma \\ 0 & -\sin\gamma & \cos\gamma \end{bmatrix} \begin{bmatrix} x' \\ y' \\ z' \end{bmatrix}$$

That is, $$\begin{bmatrix} x \\ y \\ z \end{bmatrix} = \begin{bmatrix} \cos\epsilon\cos\theta & -\cos\epsilon\sin\theta\sin\gamma + \sin\epsilon\cos\gamma & \cos\epsilon\sin\theta\cos\gamma + \sin\epsilon\sin\gamma \\ -\sin\epsilon\cos\theta & \sin\epsilon\sin\theta\sin\gamma + \cos\epsilon\cos\gamma & -\sin\epsilon\sin\theta\cos\gamma + \cos\epsilon\sin\gamma \\ -\sin\theta & -\cos\theta\sin\gamma & \cos\theta\cos\gamma \end{bmatrix} \begin{bmatrix} x' \\ y' \\ z' \end{bmatrix} \quad \text{Equation 4}$$

Figure 11:
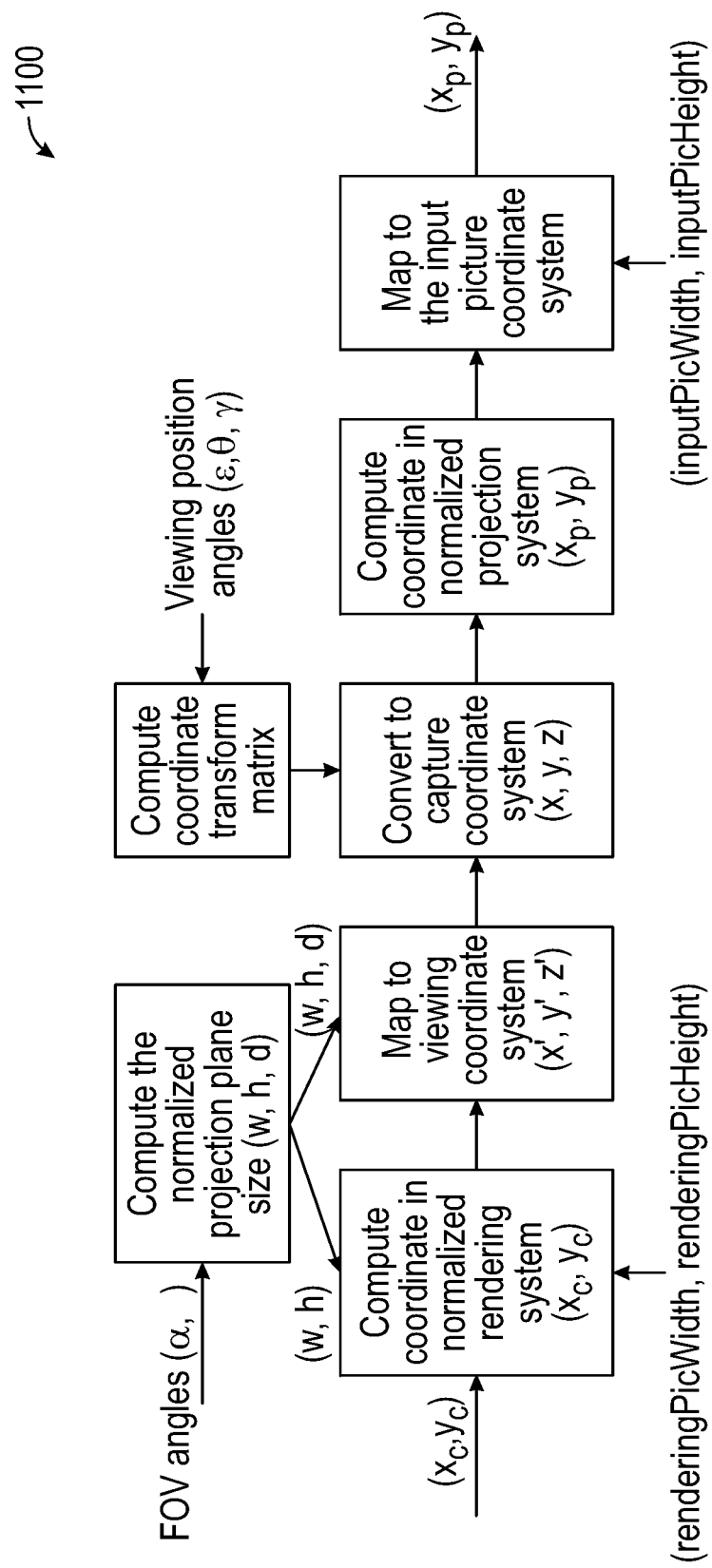
FIG. 11 illustrates a schematic diagram of a coordinate mapping between an output rendering picture and an input 360 degree video picture.

FIG. 11 illustrates a schematic diagram of a coordinate mapping 1100 between an output rendering picture and an input picture. With the FOV and viewing direction angles defined above, the coordinate mapping between the output rendering picture coordinate system $(X_c, Y_c)$ (i.e. the rendering picture for display) and the input picture coordinate system $(X_p, Y_p)$ (i.e. the input 360 degree video picture) can be established. As shown in FIG. 11, given a sample point $(X_c, Y_c)$ in the rendering picture, the coordinate of the corresponding sample point $(X_p, Y_p)$ in the input picture can be derived by the following steps:

Compute the normalized projection plane size and distance to sphere center based on the FOV angles (α, β) (i.e. Equation 3); compute the coordinate transform matrix between the viewing and capture coordinate system based on the viewing direction angles (ε, θ, γ) (i.e. Equation 4)

Normalize $(X_c, Y_c)$ based on the rendering picture size and the normalized projection plane size.

Map the coordinate $(x_c, y_c)$ in the normalized rendereing coordinate system to the 3D viewing coordinate system (x',y', z').

Convert the coordinate to the 3D capture coordinate system (x, y, z)

Derive the coordinate $(x_p, y_p)$ in the normalized projection coordinate system Convert the derived coordinate to integer position in the input picture based on input picture size and projection format.

Figure 12:
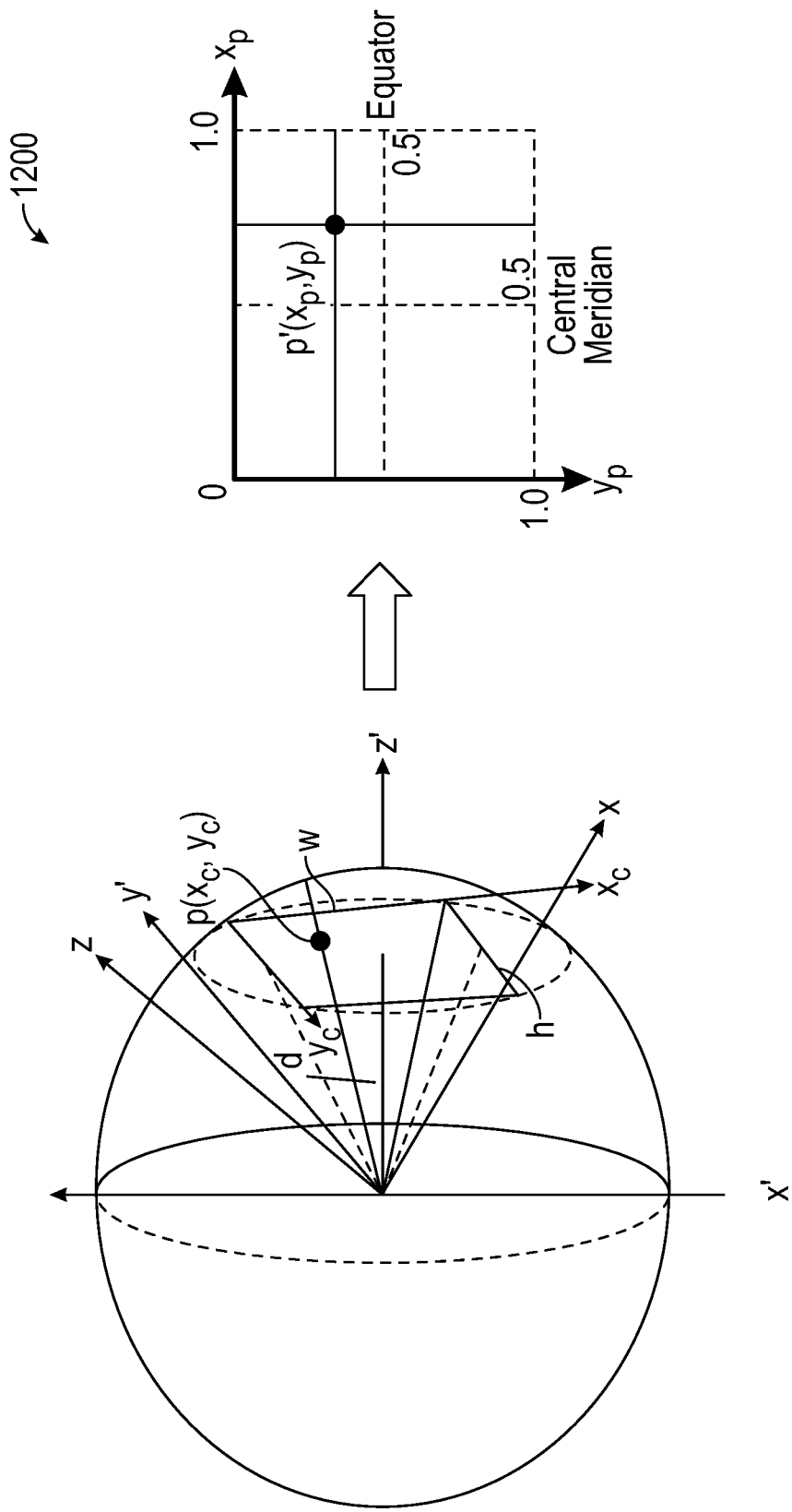
FIG. 12 conceptually illustrates an example of mapping a point in the normalized rendering coordinate system to the normalized projection coordinate system using the equirectangular projection format.

FIG. 12 conceptually illustrates an example of mapping a point in the normalized rendering coordinate system (e.g., $p(x_c, y_c)$) to the normalized projection coordinate system (e.g., $p'(x_p, y_p)$) using the equirectangular projection format 1200.

In one or more implementations, projection from the equirectangular input format is performed. For example, if the input picture is in the equirectangular projection format, the following steps may apply to map a sample point $(X_c, Y_c)$ in the rendering picture to a sample point $(X_p, Y_p)$ in the input picture.

Compute normalized display projection plane size based on the FOV angles:

$$\begin{cases} w = \dfrac{2ta}{\sqrt{ta^2 + tb^2 + 1}} \\ h = \dfrac{2tb}{\sqrt{ta^2 + tb^2 + 1}} \text{, where } ta = \tan\left(\dfrac{\alpha}{2}\right) \text{ and } tb = \tan\left(\dfrac{\beta}{2}\right) \\ d = \dfrac{1}{\sqrt{ta^2 + tb^2 + 1}} \end{cases}$$

Map $(X_c, Y_c)$ into the normalized rendering coordinate system:

$$\begin{cases} x_c = \dfrac{X_c w}{renderingPicWidth} \\ y_c = \dfrac{Y_c h}{renderingPicHeight} \end{cases}$$

Compute the coordinate of $p(x_c, y_c)$ in $(x', y', z')$ viewing coordinate system:

$$\begin{cases} x' = x_c - \dfrac{w}{2} \\ y' = -y_c + \dfrac{h}{2} \\ z' = d \end{cases}$$

Convert coordinate $(x',y',z')$ into $(x, y, z)$ capture coordinate system based on the viewing direction angles:

$$\begin{bmatrix} x \\ y \\ z \end{bmatrix} = \begin{bmatrix} \cos\epsilon\cos\theta & -\cos\epsilon\sin\theta\sin\gamma + \sin\epsilon\cos\gamma & \cos\epsilon\sin\theta\cos\gamma + \sin\epsilon\sin\gamma \\ -\sin\epsilon\cos\theta & \sin\epsilon\sin\theta\sin\gamma + \cos\epsilon\cos\gamma & -\sin\epsilon\sin\theta\cos\gamma + \cos\epsilon\sin\gamma \\ -\sin\theta & -\cos\theta\sin\gamma & \cos\theta\cos\gamma \end{bmatrix} \begin{bmatrix} x' \\ y' \\ z' \end{bmatrix}$$

Project $p(x,y,z)$ onto the normalized projection coordinate system $p'(x_p, y_p)$:

$$\begin{cases} x_p = \dfrac{\arctan2(x, z)}{2\pi} + 0.5 \\ y_p = -\dfrac{\arcsin\left(\dfrac{y}{\sqrt{x^2 + y^2 + z^2}}\right)}{\pi} + 0.5 \end{cases} \quad \text{Equation 5}$$

Map $p'(x_p, y_p)$ onto the input picture (equirectangular) coordinate system $(X_p, Y_p)$ $$\begin{cases} X_p = (int)(x_p * inputPicWidth) \\ Y_p = (int)(y_p * inputPicHeight) \end{cases},$$

where:
$\alpha$, $\beta$ are FOV angles and $\epsilon$, $\theta$, $\gamma$ are viewing direction angles.
renderingPicWidth×renderingPicHeight is the renedering picture size inputPicWidth×inputPicHeight is the input picture size (in equirectangular projection format)

Figure 13:
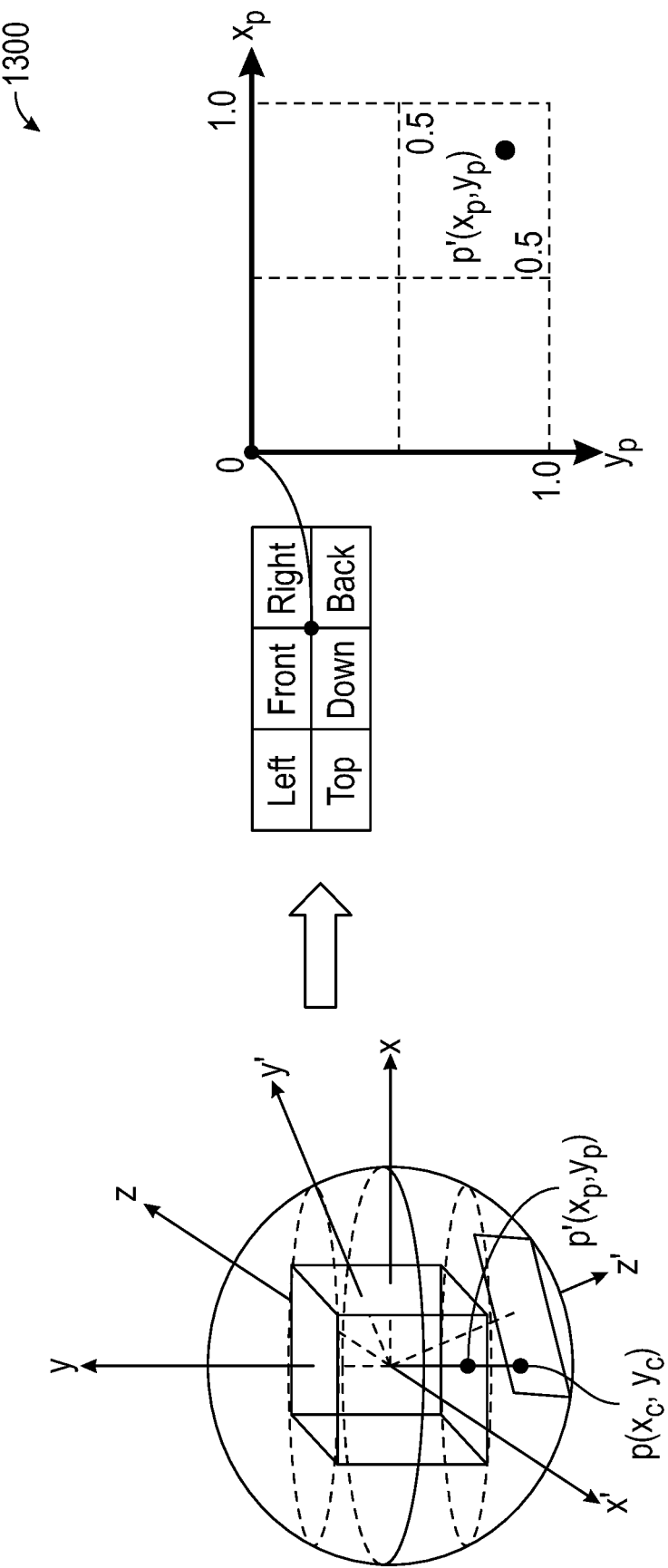
FIG. 13 conceptually illustrates an example of mapping a point in the normalized rendering coordinate system to the normalized projection coordinate system using the cube projection format.

FIG. 13 conceptually illustrates an example of mapping a point in the normalized rendering coordinate system (e.g., $p(x_c, y_c)$) to the normalized projection coordinate system (e.g., $p'(x_p, y_p)$) using the cube projection format 1300.

In one or more implementations, projection from the cube projection input format is performed. For example, if the input picture is in cube projection format, the following similar steps apply to map a sample point $(X_c, Y_c)$ in the rendering picture to a sample point $(X_p, Y_p)$ in the input picture.

Compute normalized display projection plane size based on the FOV angles:

$$\begin{cases} w = \dfrac{2ta}{\sqrt{ta^2 + tb^2 + 1}} \\ h = \dfrac{2tb}{\sqrt{ta^2 + tb^2 + 1}} \text{, where } ta = \tan\left(\dfrac{\alpha}{2}\right) \text{ and } tb = \tan\left(\dfrac{\beta}{2}\right) \\ d = \dfrac{1}{\sqrt{ta^2 + tb^2 + 1}} \end{cases}$$

Map $(X_c, Y_c)$ into the normalized rendering coordinate system:

$$\begin{cases} x_c = \dfrac{X_c w}{renderingPicWidth} \\ y_c = \dfrac{Y_c h}{rendetringPicHeight} \end{cases}$$

Compute the coordinate of $p(x_c, y_c)$ in $(x', y', z')$ viewing coordinate system:

$$\begin{cases} x' = x_c - \dfrac{w}{2} \\ y' = -y_c + \dfrac{h}{2} \\ z' = d \end{cases}$$

Convert coordinate $(x',y',z')$ into $(x, y, z)$ capture coordinate system based on the viewing direction angles:

$$\begin{bmatrix} x \\ y \\ z \end{bmatrix} = \begin{bmatrix} \cos\epsilon\cos\theta & -\cos\epsilon\sin\theta\sin\gamma + \sin\epsilon\cos\gamma & \cos\epsilon\sin\theta\cos\gamma + \sin\epsilon\sin\gamma \\ -\sin\epsilon\cos\theta & \sin\epsilon\sin\theta\sin\gamma + \cos\epsilon\cos\gamma & -\sin\epsilon\sin\theta\cos\gamma + \cos\epsilon\sin\gamma \\ -\sin\theta & -\cos\theta\sin\gamma & \cos\theta\cos\gamma \end{bmatrix} \begin{bmatrix} x' \\ y' \\ z' \end{bmatrix}$$

Project $p(x,y,z)$ onto the normalized cube coordinate system $p'(x_p, y_p)$ based on the Pseudo code defined in Table 1.

Map $p'(x_p, y_p)$ onto the input cube coordinate system $(X_p, Y_p)$ (assuming all the cube faces have a same resolution)

$$\begin{cases} X_p = (int)\left(x_p * \dfrac{inputPicWidth}{3}\right) + Xoffset[faceID] \\ Y_p = (int)\left(y_p * \dfrac{inputPicHeight}{2}\right) + Yoffset[faceID] \end{cases},$$

where:

α, β are FOV angles and ϵ, θ, γ are viewing direction angles.

renderingPicWidth×renderingPicHeight is the renedering picture size inputPicWidth×inputPicHeight is the input picture size (in cube projection format)

{(Xoffset[faceID],Yoffset[facID])|faceID=Front, back, Left, Right, Top and Down} is the coordinate offsets of a cube face in the input cube projection coordinate system.

$$\begin{cases} Xoffset[6] = \left\{0, \dfrac{inputPicWidth}{3}, \dfrac{2inputPicWidth}{3}, \right. \\ \qquad\qquad\quad \left. 0, \dfrac{inputPicWidth}{3}, \dfrac{2inputPicWidth}{3}\right\} \\ Yoffset[6] = \left\{0, \quad 0, \quad 0, \right. \\ \qquad\qquad\quad \left. \dfrac{inputPicHeight}{2}, \dfrac{inputPicHeight}{2}, \dfrac{inputPicHeight}{2}\right\} \end{cases}$$

For the cube projection format depicted in FIG. 13, the face ID is in the order of Front, back, Left, Right, Top followed by Down to access the coordinate offsets array.

Sample Rendering for Display

In the projection of 360 degree video for display, multiple samples in a input 360 degree video picture (e.g. in equirectangular format or cube projection format) may project to a same integer location ($X_c$, $Y_c$) in the rendering picture. To have a smooth rendering, not only the integer-pel positions, but also its sub-pel positions in the rendering picture are projected to find counterpart samples in the input picture.

Figure 14:
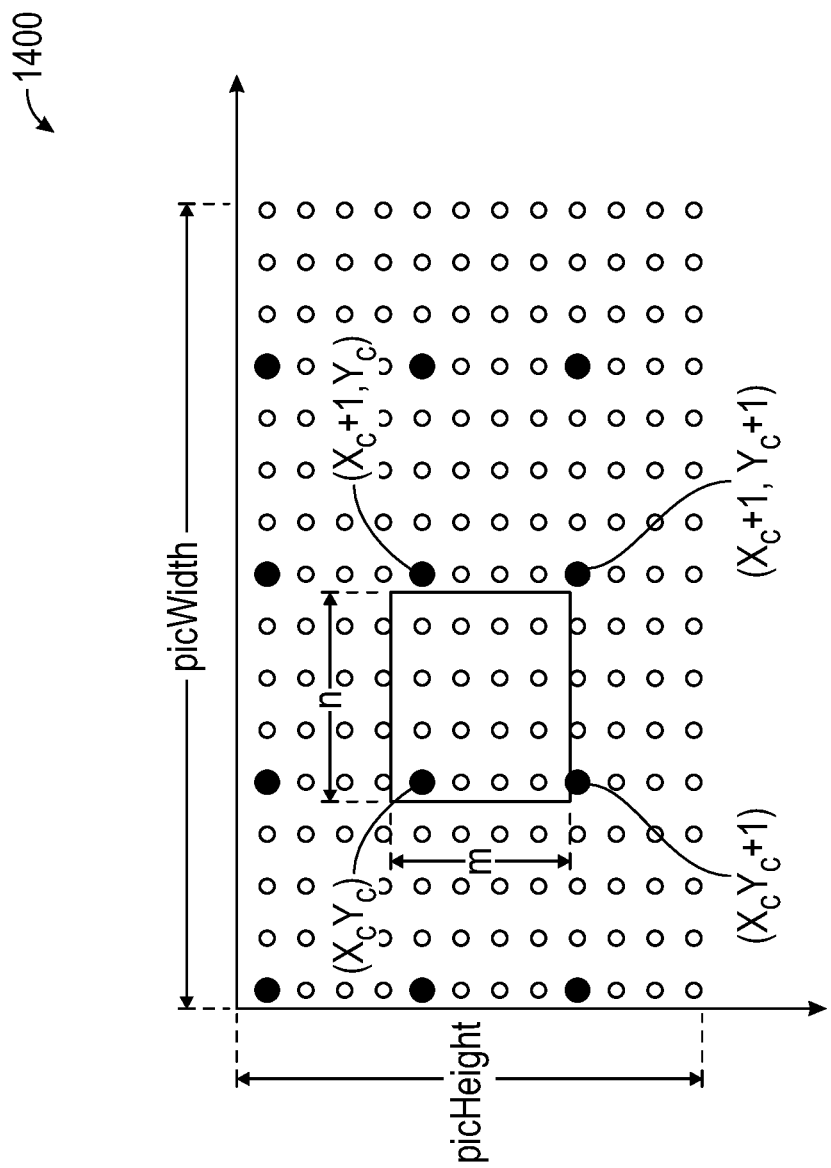
FIG. 14 conceptually illustrates an example of a two-dimensional layout 1400 of samples of an input 360 degree video picture being projected for 360 degree video rendering.

FIG. 14 conceptually illustrates an example of a two-dimensional layout 1400 of samples of an input 360 degree video picture being projected for 360 degree video rendering. As shown in FIG. 14, if the projection precision is $$\dfrac{1}{n}$$

sub-pel in horizontal direction and $$\dfrac{1}{m}$$

sub-pel in vertical direction, then the sample value of the rendering picture at location ($X_c$, $Y_c$) can be rendered by:

Equation 6

$$renderingImg[X_c, Y_c] = \dfrac{\sum_{i=0}^{m-1}\sum_{j=0}^{n-1} inputImg\left[mapping\_func\left(X_c + \dfrac{j+0.5}{n}, Y_c + \dfrac{i+0.5}{m}\right)\right] + \dfrac{mn}{2}}{mn},$$

where:

($X_p$, $Y_p$)=mapping_func($X_c$, $Y_c$) is the coordinate mapping function from the rendering picture to input 360 degree video picture defined in sections above (e.g. w/equirectangular projection or cube projection format).

inputImg[$X_p$, $Y_p$] is the sample value at location ($X_p$, $Y_p$) in the input picture.

renderingImg[$X_c$,$Y_c$] is the sample value at location ($X_c$, $Y_c$) in the output rendering picture.

Instead of computing the coordinate mapping between the output rendering coordinate system ($X_c$, $Y_c$) and the input picture coordinate system ($X_p$, $Y_p$) on-the-fly, the coordinate mapping can also be pre-computed and stored as the projection map for the entire rendering picture. Since the viewing direction and FOV angles may not frequently change from picture to picture, the pre-computed projection map can be shared by the rendering of multiple pictures. A projection map stores the coordinate mapping information between the output rendering coordinate system ($X_c$, $Y_c$) and the input picture coordinate system ($X_p$, $Y_p$) for an entire output rendering picture (i.e. viewport). The coordinate mapping information for a sample location of the output rendering picture may include 2-D integer-pel or sub-pel coordinate(s) of corresponding reference sample locations in an input 360 video picture, and associated face ID if the incoming 360 video is in a projection format of multiple faces (e.g. cube projection format).

Let projectMap [n*$X_c$+j, m*$Y_c$+i] be the pre-computed projection map, with $X_c$=0, 1, . . . , renderingPicWidth −=0, 1, . . . , renderingPicHeight−1, j=0, 1, . . . , n−1 and i=0, 1, . . . , m−1. Each entry of the projection map stores the pre-computed coordinate value ($X_p$, $Y_p$) of the input picture coordinate system for a sub-pel location $$\left(X_c + \dfrac{j+0.5}{n}, Y_c + \dfrac{i+0.5}{m}\right)$$

in the rendering picture. The rendering can be written as:

Equation 7

$$renderingImg[X_c, Y_c] = \dfrac{\sum_{i=0}^{m-1}\sum_{j=0}^{n-1} inputImg[projectMap[n*X_c + j, m*Y_c + i]] + \dfrac{mn}{2}}{mn}$$

A picture may have multiple color components, such as YUV, YCbCr, RGB. The above rendering process can apply to color components, independently.

Figure 15:
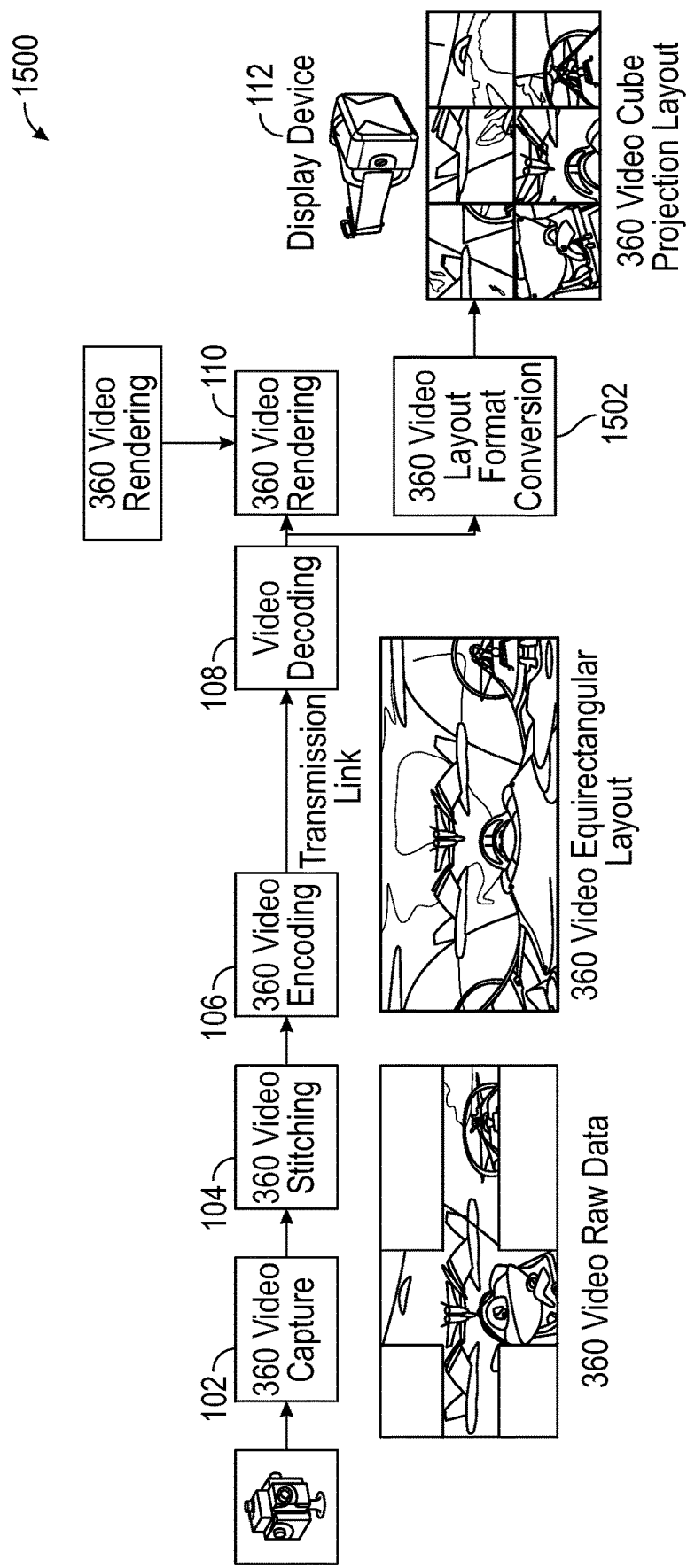
FIG. 15 illustrates a block diagram of an example of a 360 degree video capture and playback system with projection format conversion.

FIG. 15 illustrates a block diagram of an example of a 360 degree video capture and playback system 1500 with projection format conversion. In one or more implementations, a 360 degree video display device (such as HMDs—Head Mounted Display) may have a built-in 360 degree video rendering capability but only takes specific 360 degree video project format as input (e.g. the cube projection format). On the other hand, the 360 degree video that the system receives may be in a different projection format (e.g. the equirectangular projection format). In those cases, the 360 degree video capture and playback system 1500 may need to have the 360 degree video projection format conversion capability to support those display devices. FIG. 15 illustrates an example of such a system in which the received 360 degree video in the equirectangular format is converted to the cube projection format before feeding into the display device.

The projection format conversion from equirectangular projection to cube projection can be realized by projecting and rendering an equirectangular picture to the six cube faces (i.e. front, back, left, right, top and down) with fixed FOV angles of $$\alpha = \beta = \frac{\pi}{2}$$

and the viewing direction angle settings listed in Table 2.

TABLE 2

Viewing direction angle setting for equirectanglar to cube projection format conversion

| Angle | Front | Back | Left | Right | Top | Down |
|---|---|---|---|---|---|---|
| $\epsilon$ | 0 | 0 | 0 | 0 | 0 | 0 |
| $\theta$ | 0 | $\pi$ | $-\frac{\pi}{2}$ | $\frac{\pi}{2}$ | 0 | 0 |
| $\gamma$ | 0 | 0 | 0 | 0 | $\frac{\pi}{2}$ | $-\frac{\pi}{2}$ |

If the input equirectangular picture size is inputPicWidth× inpuPicHeight, each cube face may have a rendering resolution of $$\frac{inputPicWidth}{4} \times \frac{inpuPicHeight}{2}$$

for the least amount of quality degradation, which leads to about 25% less data after format conversion. In one or more implementations, the projection format and layout information of incoming 360 degree video is signaled in a high-level video system message for format conversion.

Figure 16:
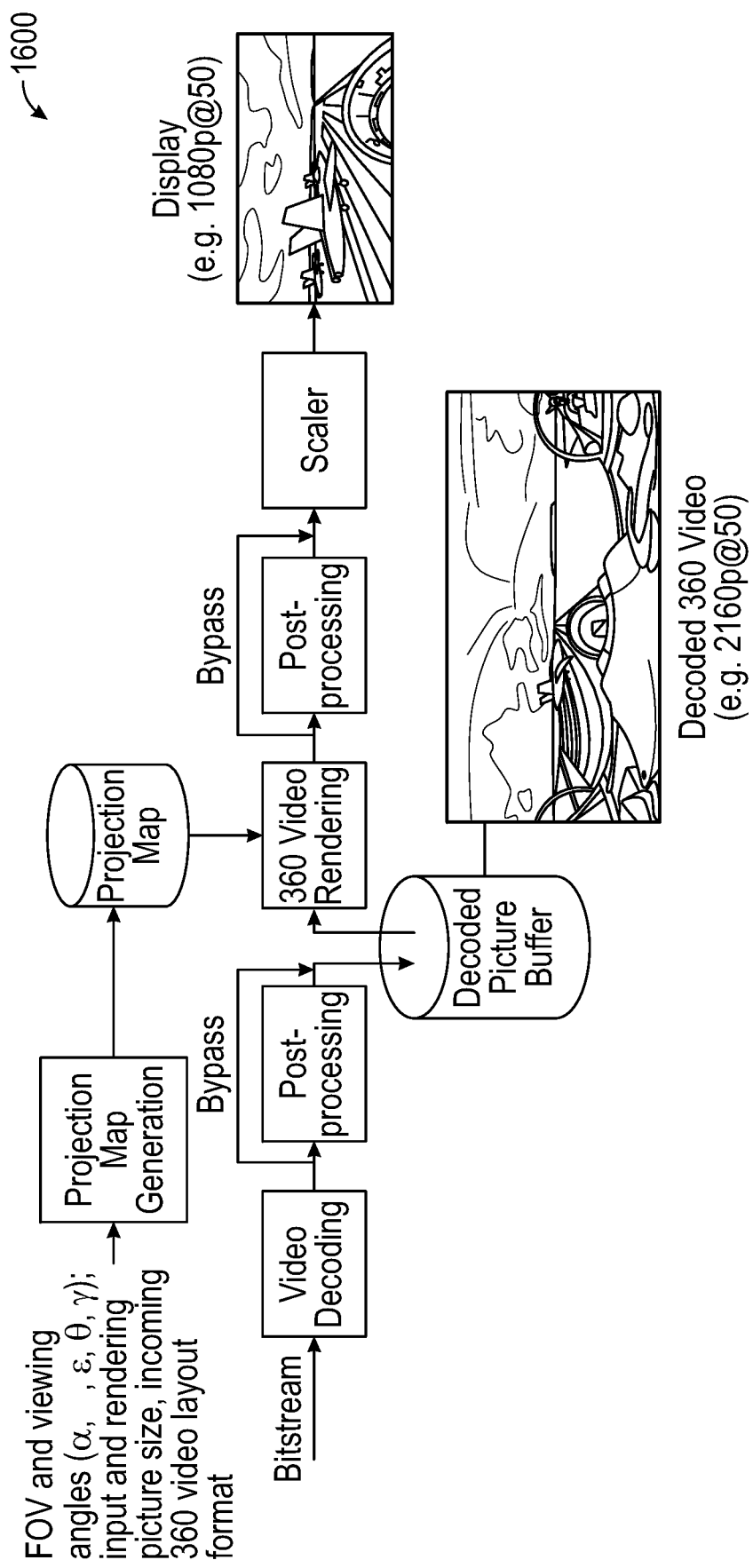
FIG. 16 illustrates a block diagram of an example of a 360 degree video rendering system.

FIG. 16 illustrates a block diagram of an example of a 360 degree video rendering system 1600. In FIG. 16, the projection map is pre-computed and stored, instead of computing on-the-fly. Post-processing (such as de-nosing, sharping, de-ringing, etc.) may apply after video decoding and after 360 degree video rendering. The post-processing can also be bypassed in some implementations. A scaler is also added to scale the rendered picture to fit with the display size.

Figure 17:
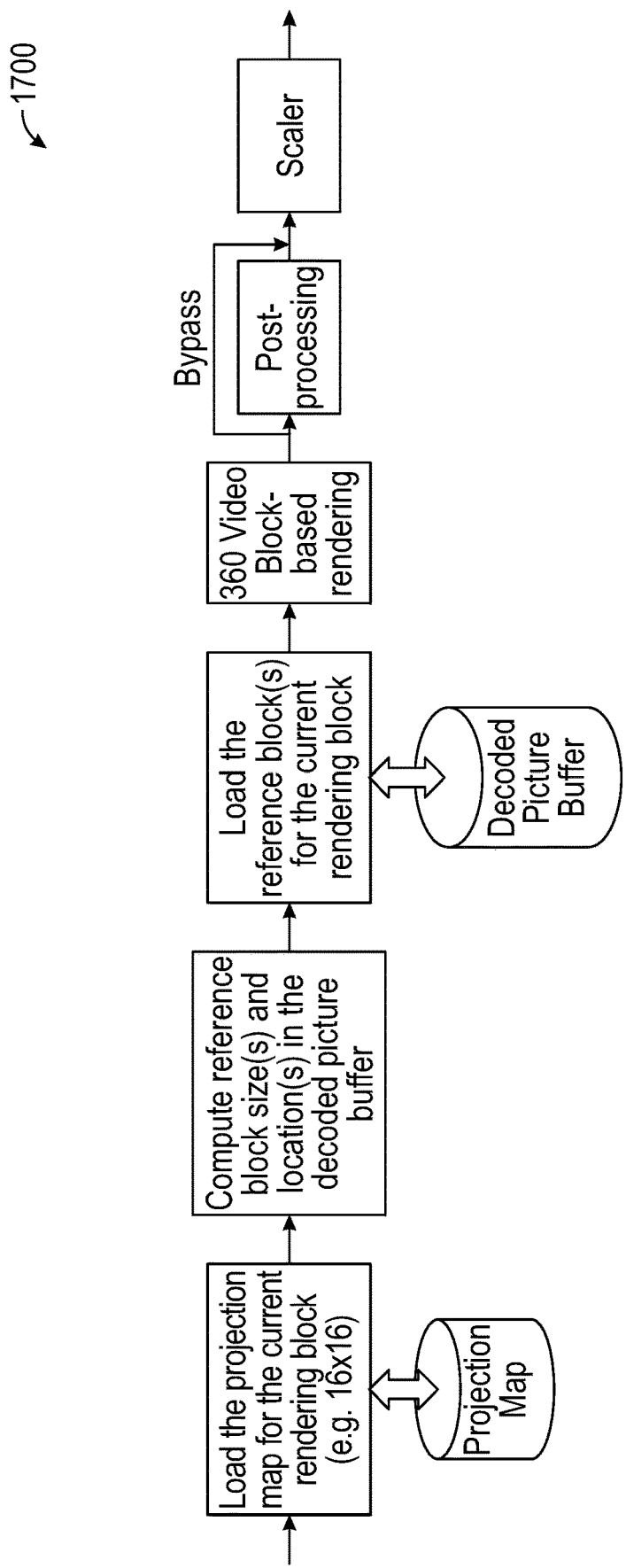
FIG. 17 conceptually illustrates an example of a process for 360 degree video rendering.

FIG. 17 conceptually illustrates an example of a process 1700 for 360 degree video rendering. In FIG. 17, the block-based 360 degree video rendering process (e.g., 1700) is based on the pre-computed projection map. For rendering a block (e.g. 16×16) of a picture color component (Y, U, or V), the following steps may apply:

1) Load the projection map for the current rendering block.
2) Compute the reference block size(s) and location(s) in the decoded picture buffer. Note that a rendering block may require multiple reference blocks fetched from the decoded picture buffer, depending on the input 360 degree video projection format and rendering block size and location, etc.
3) Load the reference block(s) for the current rendering block from the decoded picture buffer
4) Conduct block-based rendering using e.g. Equation 7.
5) Process the rendered block with post-processing and/or scaling if needed.
6) Move to the next rendering block, and repeat step 1 to 5 until reaching the end of picture.

Figure 18:
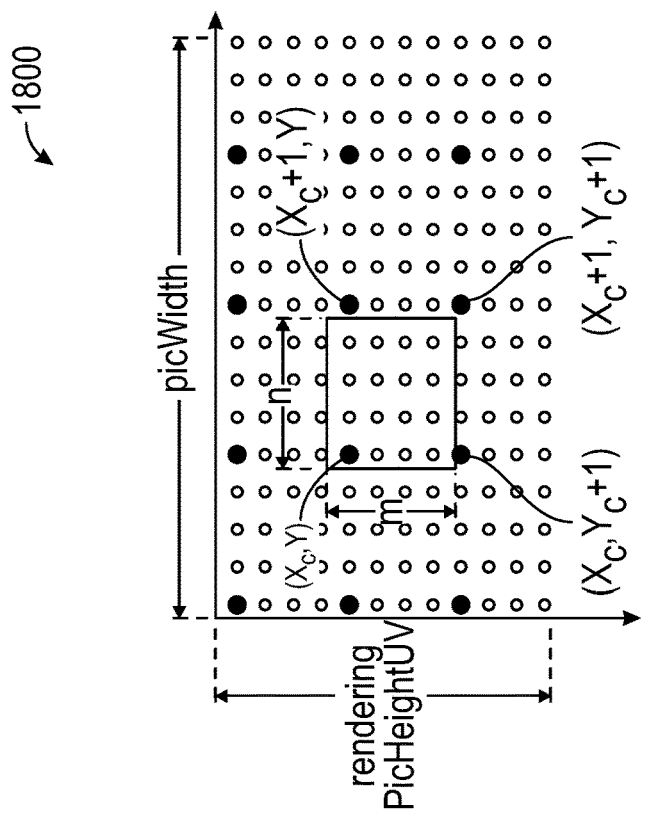
FIG. 18 conceptually illustrates an example of a Chroma projection map derivation from a Luma projection map for a first Chroma format.
Figure 19:
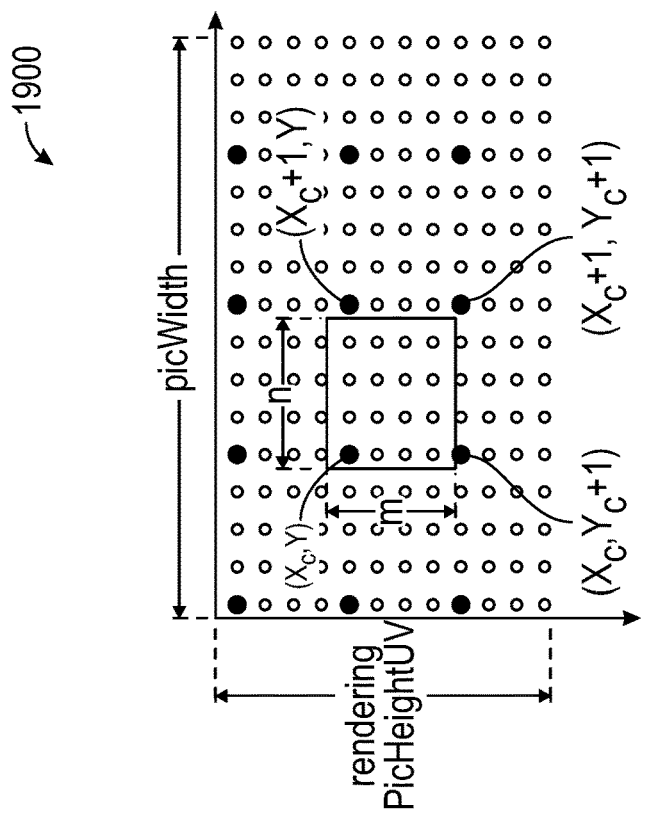
FIG. 19 conceptually illustrates an example of a Chroma projection map derivation from a Luma projection map for a second Chroma format.

FIG. 18 conceptually illustrates an example of a Chroma projection map derivation 1800 from a Luma projection map for a first Chroma format. FIG. 19 conceptually illustrates an example of a Chroma projection map derivation 1900 from a Luma projection map for a second Chroma format. The projection map stores coordinate mapping information from the output rendering picture coordinate picture system ($X_c$, $Y_c$) to the input picture coordinate system ($X_p$, $Y_r$). An entry of the projection map stores the coordinate value of corresponding integer location ($X_p$, $Y_p$) in the input picture for a location ($X_c$, $Y_c$) in the rendering picture, and associated face ID if the projection format in use has multiple faces. An entry in the projection map may use e.g. 32-bit for coordinates, 16-bit for $X_p$ and 16-bit for $Y_p$, and use an appropriate number of bits for face ID. ($X_c$, $Y_c$) may represent both integer-pel and sub-pel sample locations in the rendering picture. In one or more implementation, face ID storage can be avoided if coordinate values stored for projection map are absolute coordinates relative to the upper-left corner of an input 360 video picture regardless of face ID values.

A projection map (either for Y, or UV component of a rendering picture) can be pre-computed and stored based on the FOV and viewing direction angles ($\alpha$, $\beta$, $\epsilon$, $\theta$, $\gamma$), the input and rendering picture size, the incoming 360 degree video projection format (e.g. equirectanglar projection format) and a rendering precision (e.g., m, n).

Since the viewing direction and FOV angles may not change from picture to picture, it may be advantageous to pre-compute the projection map so that the same map can be shared by the rendering of multiple pictures. Also, rendering a 360 degree video picture for display requires access of the input picture which oftentimes is stored in off-chip memory (see Equation 6 or 7). For better memory access efficiency, the rendering is carried out block by block (e.g. 16×16 or 32×32) not pixel by pixel. Using the pre-computed projection map, it is easy to figure out, block by block, where to load and how many reference samples to load from the decoded picture buffer (where the decoded 360 degree video pictures are stored) for rendering a block.

Instead of computing the projection map for luminance picture component Y and the Chrominance components UV (or CbCr) independently, the Chroma projection map can be derived from the Luma prediction map. In one or more implementations, there are multiple variants to derive the Chroma projection map from the pre-computed Luma prediction map.

In variant 1, the Chroma map is derived by simply down-sampling a Luma map. The pseudo code is provided in FIG. 18 for the first Chroma format (e.g., Chroma format 4:2:0) and in FIG. 19 for the second Chroma format (e.g., Chroma format 4:2:2), respectively, where projectMapY [n*$X_c$+j, m*$Y_c$+I] is the pre-computed Luma projection map, with $X_c$=0, 1, . . . , renderingPicWidthY−1, $Y_c$=0, 1, . . . , renderingPicHeightY−1, j=0, 1, . . . , n−1 and i=0, 1, . . . , m−1, and where projectMapUV[n*$X_c$+j, m*$Y_c$+I] is the derived Chroma projection map, with $X_c$=0, 1, . . . , renderingPicWidthUV−1, $Y_c$=0, 1, . . . , renderingPicHeightUV−1, j=0, 1, . . . , n−1 and i=0, 1, . . . , m−1.

Figure 20:
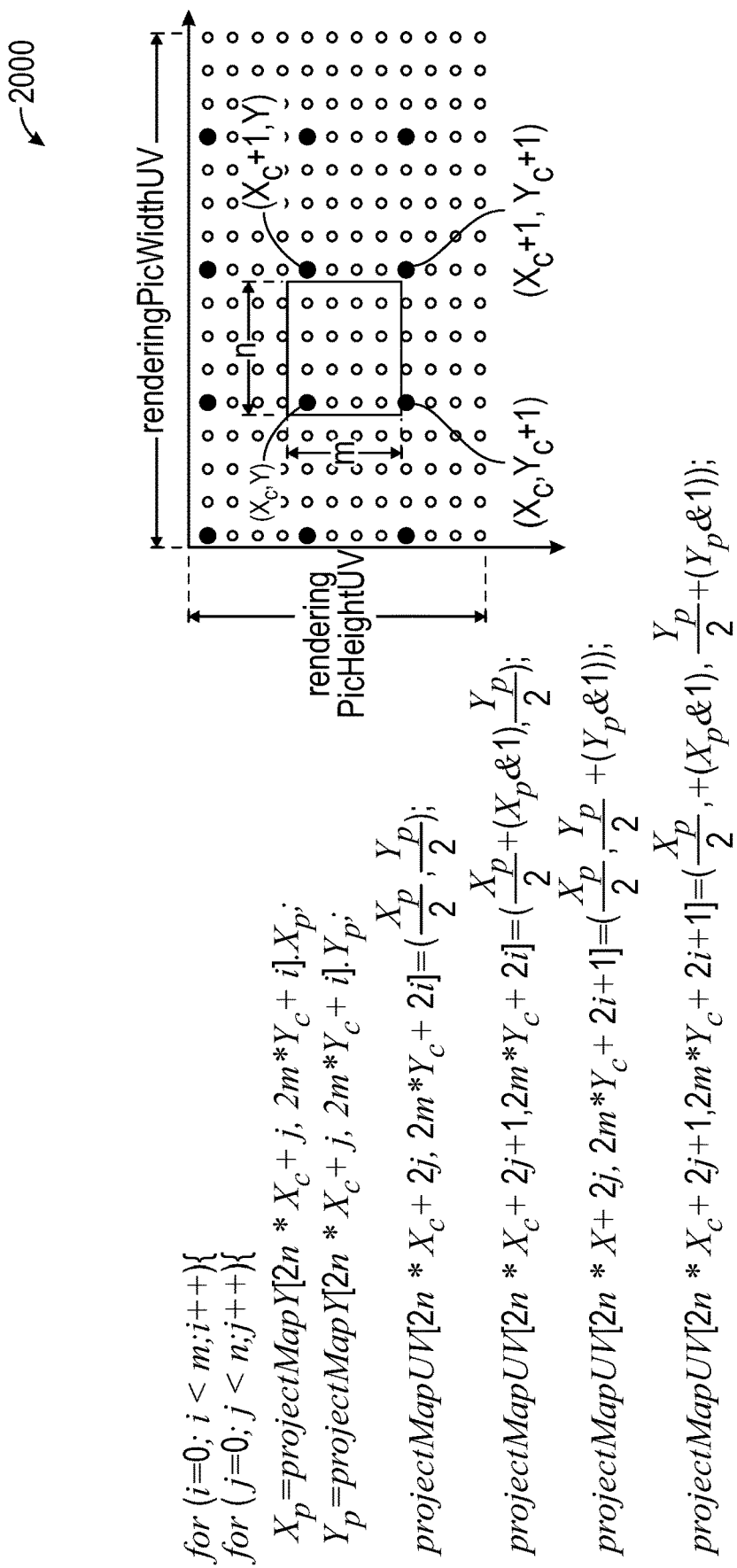
FIG. 20 conceptually illustrates another example of a Chroma projection map derivation from a Luma projection map for the first Chroma format.
Figure 21:
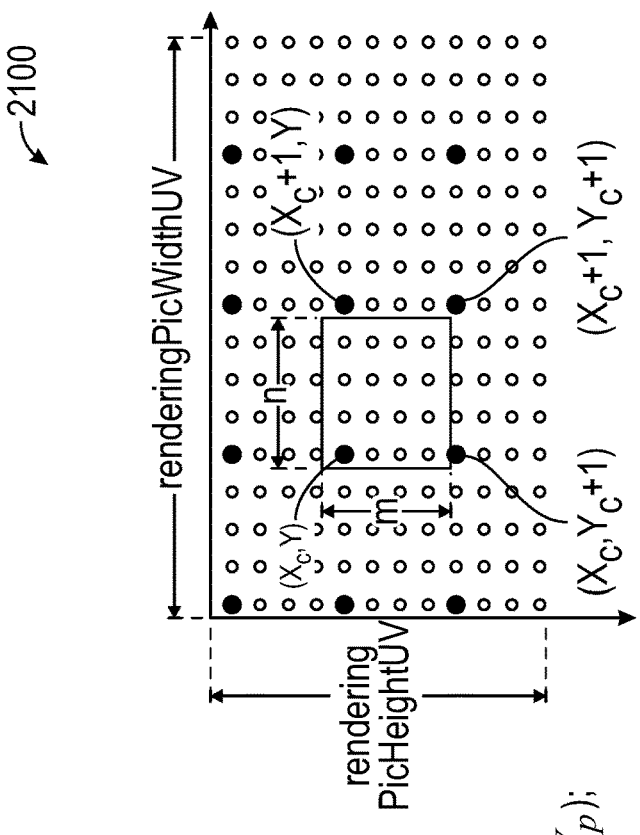
FIG. 21 conceptually illustrates another example of a Chroma projection map derivation from a Luma projection map for the second Chroma format.

With variant 1, the rendering of a pixel in Chroma picture component (U or V) at integer location ($X_c$, $Y_c$) may be defined as (for Chroma format 4:2:0 and 4:2:2):

$$renderingImgUV[X_c, Y_c] = \frac{\sum_{i=0}^{m-1}\sum_{j=0}^{n-1} inputImgUV[projectMapUV[n*X_c + j, m*Y_c + i]] + \frac{mn}{2}}{mn}$$

with $X_c = 0, 1, \ldots, renderingPicWidthUV - 1,$ $Y_c = 0, 1, \ldots, renderingPicHeightUV - 1.$ FIG. 20 conceptually illustrates another example of a Chroma projection map derivation 2000 from a Luma projection map for the first Chroma format. FIG. 21 conceptually illustrates another example of a Chroma projection map derivation 2100 from a Luma projection map for the second Chroma format.

In variant 2, the Chroma projection map is derived by considering sub-pel coordinate accuracy for Chroma when converted from an integer Luma position (Chroma format 4:2:0). The pseudo code is provided in FIG. 20 for the first Chroma format (e.g., Chroma format 4:2:0) and in FIG. 21 for the second Chroma format (e.g., Chroma format 4:2:2), respectively. Here, $\left(\frac{Xp}{2}+1\right)$ and/or $\left(\frac{Yp}{2}+1\right)$ may be clipped or wrapped around (depending on the input picture projection formats and layouts) to avoid reference samples going beyond Chroma picture boundaries.

With variant 2, the rendering of a pixel in Chroma picture component (U or V) at integer location ($X_c$, $Y_c$) is defined as (e.g., Chroma format 4:2:0):

$$renderingImgUV[X_c, Y_c] = \frac{\sum_{i=0}^{2m-1}\sum_{j=0}^{2n-1} inputImgUV[projectMapUV[2n*X_c + j, 2m*Y_c + i]] + \frac{2mn}{4mn}}{}$$

For the second Chroma format (e.g., Chroma format 4:2:2), the rendering of a pixel in Chroma picture component (U or V) at integer location ($X_c$, $Y_c$) is defined as:

$$renderingImgUV[X_c, Y_c] = \frac{\sum_{i=0}^{2m-1}\sum_{j=0}^{n-1} inputImgUV[projectMapUV[2n*X_c + j, m*Y_c + i]] + mn}{2mn} \text{ with } X_c =$$

$0, 1, \ldots, picWidthUV - 1, Y_c = 0, 1, \ldots, picHeightUV - 1.$

For both variants, the Chroma projection map can be derived once from the pre-computed Luma map, and stored in memory in some implementations. In the rendering processing, both Luma map and Chroma map can be fetched. In other implementations, the Luma map may the only being fetched on a block-by-block manner during the rendering process, such that the Chroma map is derived on-the-fly block-by-block, and discarded after being consumed for the rendering of the current Chroma block (both U and V).

For an on-the-fly implementation, a third variant includes performing Chroma sub-pel interpolation at m*n Chroma sub-pel locations that is first based on the Luma projection map, then averages the m*n interpolated samples to compute the final pixel rendering pixel value at integer location ($X_c$, $Y_c$) of the Chroma (U and V) rendering picture.

If the rendering block size is pre-defined for the system, the projection map may be stored in a way that the coordinate mapping information for a rendering block is grouped together and stored in continuous memory, so that the projection map loading overhead can be minimized. The projection map storage format expressed in FIG. 18 to FIG. 20 is intended for clarity of description, and may vary depending on implementation.

Referring back to FIG. 16, the rendering picture size may be selected in a manner that maximizes the display video quality. For example, if the resolution of both a display device and the input 360×180 degree video in equirectangular projection format is 4K (3840×2160), and the FOV angles are set to 120×60 degree, then it may be undesirable to set the rendering picture size directly to 4K. This is because using the rendering expression in Equation 7 implementing this setting may likely repeat the same pixel three times in both directions, which results in poor display quality. Instead, it may be desirable to set the rendering picture size to 1280×720 and use the scaler to up-sample the rendered 720p pictures by a factor of 3 in both directions for 4K display, which can lead to better display video quality on 4K monitors due to proper up-sampling normally implemented in the scaler.

In some aspects, if the display resolution is 640×480 and the rendering picture size is also set to 640×480, the display view may likely have aliasing effects, because using the rendering expression in Equation 7 would represent a down-sample operation of a 1280×720 picture by skipping pixels in both directions. For a better display quality, the rendering picture size may still be set to 1280×720. After rendering, the scaler may be used to down-sample the picture 640×480 (i.e. with down-sampling factor 2 in the horizontal direction and 1.5 in the vertical direction). Therefore, the rendering picture size renderingPicWidth×renderingPicHeight may be precomputed by the following steps:

1) Based on the input 360 degree video picture size inputPicWidth×inpuPicHeight, the projection format of the 360 degree video picture and the FOV angles (α, β), compute the desired rendering picture size renderingPicWidth_d×renderingPicHeight_d. For example, if the input video is 360×180 degree video in equirectangular format, the desired rendering picture size can be computed as:

$$\begin{cases} \text{renderingPicWidth\_d} = \dfrac{\alpha \ \text{inputPicWidth}}{360} \\ \text{renderingPicHeight\_d} = \dfrac{\beta \ \text{inputPicWHeight}}{180} \end{cases}$$

2) Based on the available scaling ratios of the scaler and the display (monitor) picture size displayPicWidth× displayPicHeight, select a scaling ratio that would minimize the difference between the desired rendering picture size and actually used rendering picture size, and by $$\begin{cases} r_x = \underset{r}{\mathrm{argmin}} \left| \text{renderingPicWidth\_d} - \dfrac{\text{displayPicWidth}}{r} \right| & \text{for all } r \in \{\text{available horizontal scaling ratios}\} \\ r_y = \underset{r}{\mathrm{argmin}} \left| \text{renderingPicheight\_d} - \dfrac{\text{displayPicHeight}}{r} \right| & \text{for all } r \in \{\text{available vertical scaling ratios}\} \end{cases}$$

3) Compute the rendering picture size renderingPicWidth×renderingPicHeight by $$\begin{cases} \text{renderingPicWidth} = \dfrac{\text{displayPicWidth}}{r_x} \\ \text{renderingPicHeight} = \dfrac{\text{displayPicHeight}}{r_y} \end{cases}$$

In one or more implementations, the cropping operation may also be used to verify a video display aspect ratio requirement. The scaler may process the full resolution of the rendering output, then perform cropping to fit the display aspect ratio, or process a cropped window of the rendering output to ensure the video display aspect ratio requirement.

In one or more implementations, instead of setting horizontal FOV angle α and the vertical FOV angle β independently, the FOV angles (α, β) can be selected jointly to minimize the rendering distortion. The idea is to maintain the horizontal and vertical pixel ratio in the input picture and in the output rendering picture as close as possible.

As an example, the following steps can be used to jointly determine the FOV angles (α, β) for input 360 degree video of equirectangular projection format:

1) Compute the pixel ratio in the input picture:

$$\dfrac{\text{inputPicWidth}/360}{\text{inputPicHeight}/180} = \dfrac{\text{inputPicWidth}}{2\text{inputPicHeight}}$$

2) Compute the pixel ratio in the rendering picture:

$$\dfrac{\text{renderingPicWidth}/w}{\text{renderingPicHeight}/h} = \dfrac{\tan\frac{\beta}{2}}{\tan\frac{\alpha}{2}} \dfrac{\text{renderingPicWidth}}{\text{renderingPicHeight}}$$

(see equation 3 for w and h computation)

3) Compute β based on α by setting the pixel ratio to be equal in step 1 and 2:

$$\beta = 2 * \mathrm{atan}\left( \dfrac{\text{inputPicWidth}}{2\text{inputPicHeight}} \dfrac{\text{renderingPicHeight}}{\text{renderingPicWidth}} \tan\dfrac{\alpha}{2} \right)$$

For example:
Given α=100°
1280×640 input 360 degree video picture size of equirectanglar format and 416×240 rendering picture size
β=69°

For a cube projection format, each cube face covers 90×90 degree viewport, and the input ratio in the input picture can be computed as:

$$\dfrac{\left(\dfrac{\text{inputPicWidth}}{3}\right)/90}{\left(\dfrac{\text{inputPicHeight}}{2}\right)/90} = \dfrac{2\text{inputPicWidth}}{3\text{inputPicHeight}}$$

In one or more implementations, the FOV β can be computed based on the FOV α by setting the pixel ratio to be equal in step 1 and 2:

$$\beta = 2 * \mathrm{atan}\left( \dfrac{2\text{inputPicWidth}}{3\text{inputPicHeight}} \dfrac{\text{renderingPicHeight}}{\text{renderingPicWidth}} \tan\dfrac{\alpha}{2} \right)$$

For example:
given α=100°
960×640 input 360 degree video picture size of cube projection format and 416×240 rendering picture size
β=69°

Figure 22:
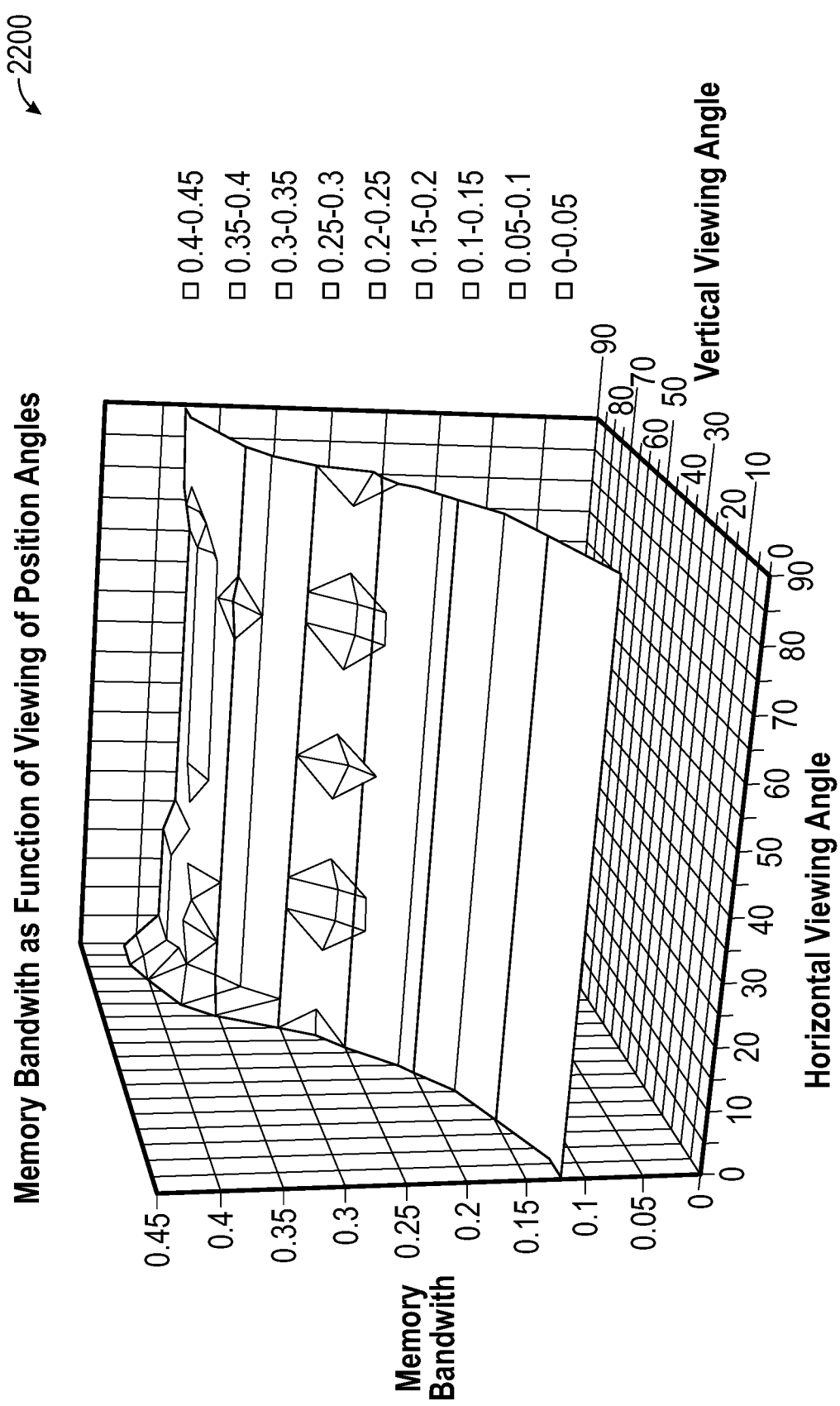
FIG. 22 illustrates a plot diagram of an example of rendering memory bandwidth consumption as a function of viewing direction angles.

FIG. 22 illustrates a plot diagram 2200 of an example of memory bandwidth as a function of viewing direction angles. Since the input 360 degree video (for rendering) and projection map are stored in off-chip memory for hardware solutions where on-chip expensive memory is highly limited, the real-time 360 degree video rendering may be subject to certain available memory bandwidth budget. In this respect, the disclosed system includes control of the FOV angles to realize real-time 360 degree video rendering subject to available memory bandwidth budget In FIG. 22, an example of the memory bandwidth consumed with respect to the viewing direction angles is illustrated, the configuration may be as follows:
Input equirectangular picture size 1280×636;
Rendering picture size 416×240
FOV angles (α, β) set to 100°×69°;
16×16 block-based rendering; load data from the input picture block by block
Memory bandwidth measure is the total number of loaded samples from the input picture divided by the input picture size (where no cache may be used)

In one or more implementations, when ε is fixed to 0, it is observed that memory bandwidth consumption is relatively constant with respect to the horizontal viewing angle θ. In one or more implementations, the memory bandwidth increases as the vertical viewing angle γ increases, and is the largest when γ=90°. Therefore, the memory bandwidth of rendering is mainly impacted by the vertical viewing direction angle γ (i.e., pitch).

Knowing that memory bandwidth consumption is relatively constant with respect to the horizontal viewing angle and uses the joint FOV angles setting method described above, the disclosed system includes pre-computing a 3D memory bandwidth consumption map based on the vertical viewing angel $\gamma$ and the horizontal FOV angle $\alpha$.

Figure 23:
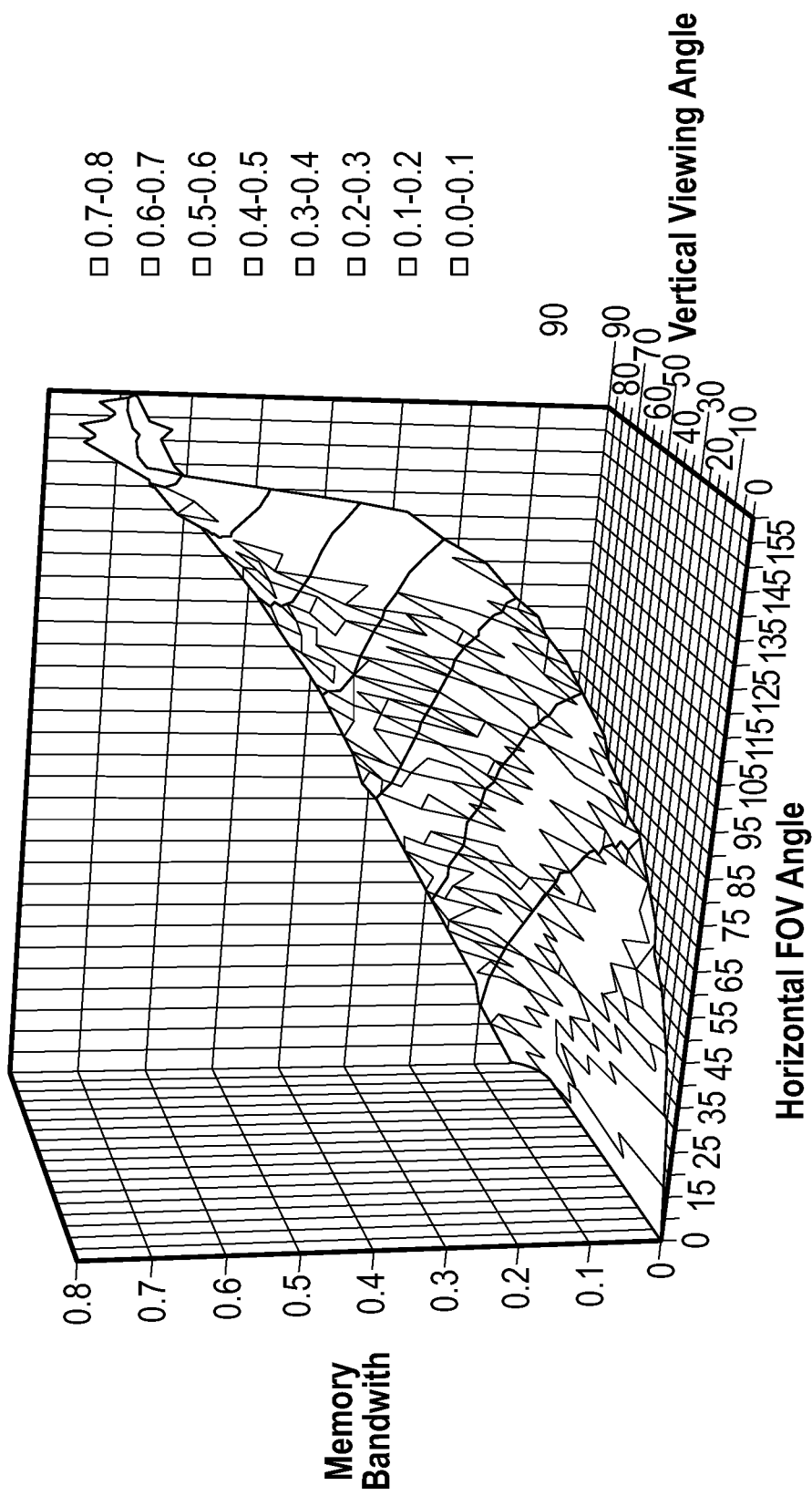
FIG. 23 illustrates a plot diagram of an example of rendering memory bandwidth consumption as a function of FOV angles and viewing direction angles.

FIG. 23 illustrates a plot diagram 2300 of an example of memory bandwidth consumption as a function of FOV angles and viewing direction angles. In FIG. 23, such a memory bandwidth consumption map has the following configuration:

Input equirectangular picture size 1280×636;
Rendering picture size 416×240
FOV angles ($\alpha$, $\beta$) jointly determined as described in embodiment 7
16×16 block-based rendering; load data from the input picture block by block
Memory bandwidth measure is the total number of loaded samples from the input picture divided by the input picture size (where no cache may be used)

In one or more implementations, memory bandwidth consumption map may be generated by considering the specific cache model (e.g. cache size, cache block size, etc.) used in the system.

In 360 degree video rendering, viewing direction angle may be set by users, hence a 360 view capture and playback system can control the rendering to meet the memory bandwidth budget by selecting approximate FOV angles from the pre-computed memory bandwidth consumption map. For example, the viewing direction angle (especially the vertical direction viewing angle pitch) may be constrained by the memory bandwidth budget of the rendering engine. This may result in that the user watches 360 video with system adjusted FOV angles and/or viewing direction angles due to memory bandwidth constraints.

The vertical viewing angle $\gamma$ is in [−90°: 90°] and the horizontal FOV angle $\alpha$ is in [0°: 180°]. For a same FOV, a vertical viewing angle $\gamma$ consumes a same amount of memory bandwidth as a vertical viewing angle −$\gamma$. Therefore, the memory bandwidth consumption map be computed for the vertical viewing angle $\gamma$ [0: 90°] and the horizontal FOV angle $\alpha$ in [0°: 180°], which can be stored with a reasonable amount of memory when the angle step size is e.g. 5°. By leveraging the symmetric nature of memory bandwidth consumption with respect to the viewing direction angles, the same memory bandwidth consumption map can be used for the vertical viewing angle $\gamma$ in [−90°: 0°] and the horizontal FOV angle $\alpha$ in [0°: 180°].

Figure 24:
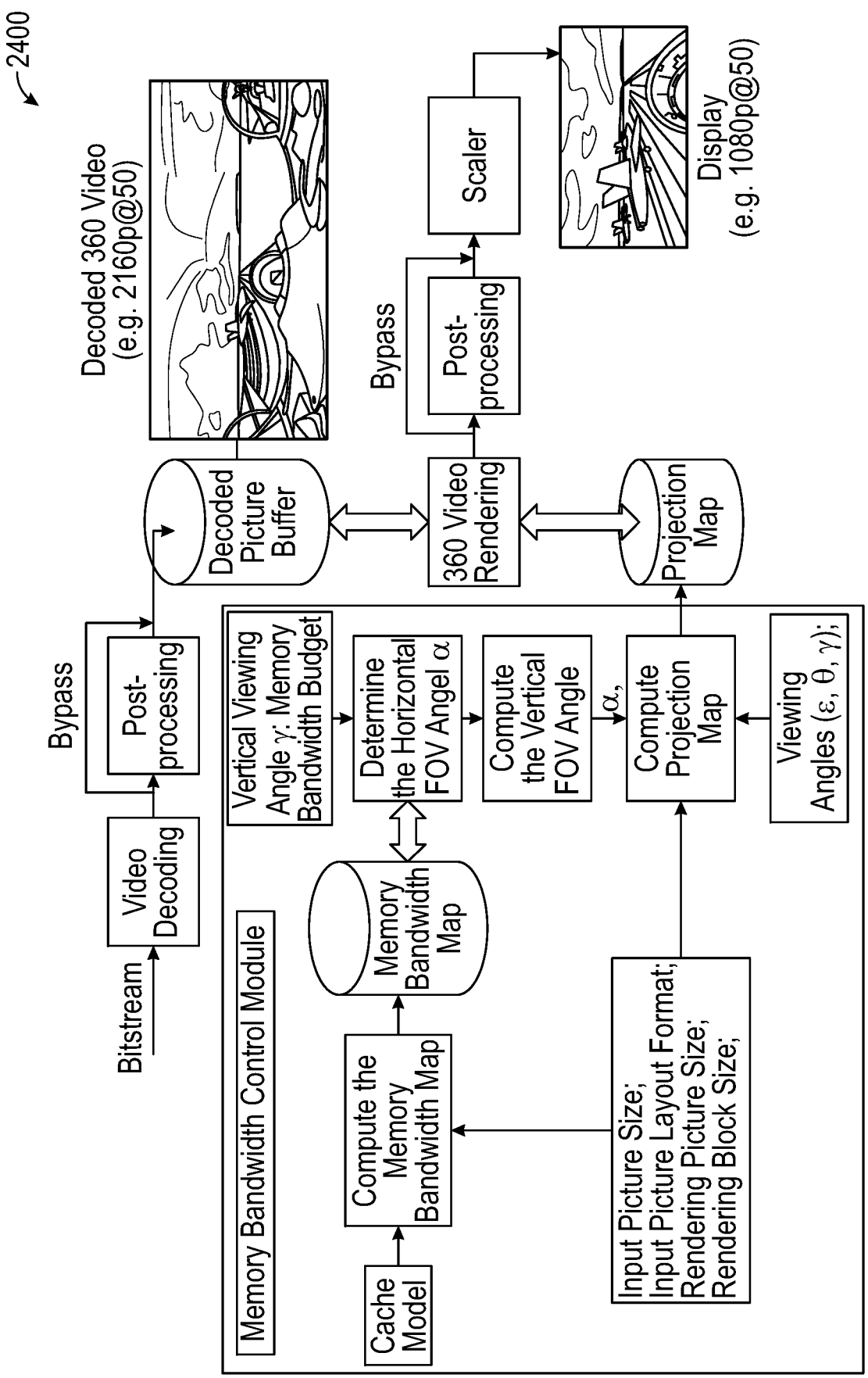
FIG. 24 illustrates a block diagram of an example of a 360 degree video playback system with memory bandwidth control in rendering.

FIG. 24 illustrates a block diagram of an example of a 360 degree video playback system 2400 with memory bandwidth control in rendering. Given the input 360 degree video picture size inputPicWidth×inpuPicHeight, the input 360 video projection format (e.g. equirectanglar), and rendering picture size renderingPicWidth×renderingPicHeigh, the rendering block size, the cache model, the memory bandwidth budget for rendering and the viewing direction angles ($\epsilon$, $\theta$, $\gamma$), the memory bandwidth control module may consist of the following steps:

1) Compute the memory bandwidth consumption map with respect to the vertical viewing angle $\gamma$ [0: 90°] (or constrain the vertical viewing angle for the given memory bandwidth) and the horizontal FOV angle $\alpha$ in [0°: 180°] based on the input picture size and projection format, the rendering picture size and block size and the cache model. In some aspects, the FOV angles ($\alpha$, $\beta$) are jointly computed with the process described above.

2) Store the memory bandwidth consumption map in memory
3) Given the vertical viewing direction angle $\gamma$ and the available memory bandwidth budget for rendering, search on the memory bandwidth consumption map (see FIG. 22) to determine the horizontal FOV angle $\alpha$ that would validate the rendering process satisfying the memory bandwidth budget.
4) Determine the vertical FOV angle $\beta$ based on the process described above.
5) Pre-compute and store the projection map
6) The remainder of the rendering process In one or more implementations, the example of FIG. 24 applies to the equirectangular 360 degree video projection format, but can be applied to support other 360 degree video projection formats depending on implementation.

In one or more implementations, a 360 degree video playback system may keep the rendering picture size as is, but purposely reduce the active rendering area to reduce the rendering complexity and memory bandwidth requirements. For example, the 360 degree video playback system may purposely leave the top and bottom few lines of the output rendering picture blank (e.g. putting in black pixels as letter boxing). The system can also purposely reduce the vertical viewing angle $\gamma$ as opposed to exactly following user's viewing angle setting to reduce the rendering memory bandwidth requirement.

Figure 25:
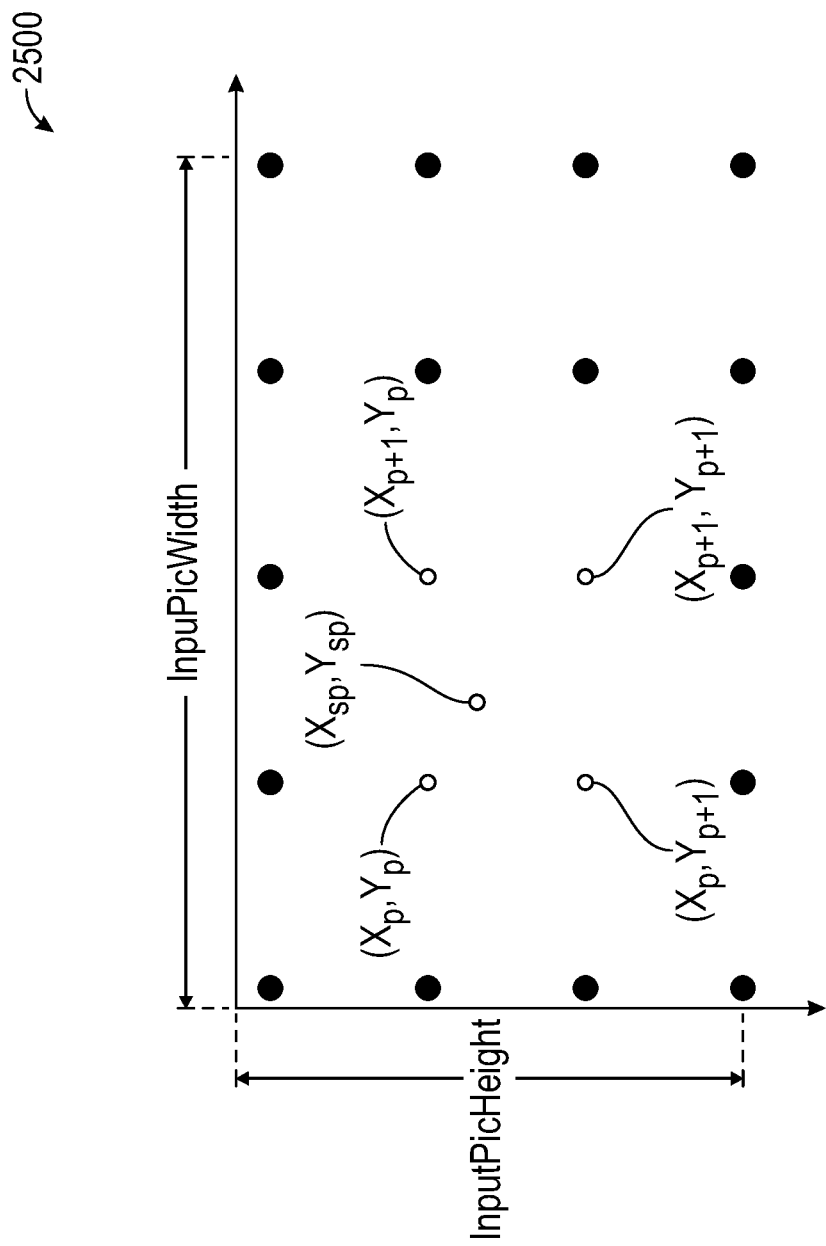
FIG. 25 conceptually illustrates an example of a sample rendering for display for Luma or Chroma picture component.

FIG. 25 conceptually illustrates an example of a sample rendering 2500 for display for Luma or Chroma picture component. In one or more implementations, instead of forcing to map coordinates ($X_c$, $Y_c$) of the rendering picture samples to the integer positions ($X_p$, $Y_p$) in the input 360 degree video picture, the disclosed system can also map ($X_c$, $Y_c$) in a way that keeps sub-pel precision of ($X_p$, $Y_r$), and perform the sample rendering by applying interpolation filters based on the sub-pel position indicated by ($X_{sp}$, $Y_{sp}$), which is similar to the interpolation used in the video motion compensation. The difference is that the interpolation filter would have to change from pixel to pixel in a worst-case use case, as the sub-pel position determined by ($X_{sp}$, $Y_{sp}$) can be different from pixel to pixel.

In one or more implementations, multiple samples in the input picture may map to a sample location ($X_c$, $Y_c$) in the rendering picture. In some aspects, the nearest four reference samples in the input picture may be used to render a sample at location ($X_c$, $Y_c$). For equirectangular input as example, and if the interpolation precision is (subpel$_x$, subpel$_y$), an integer reference sample location calculation may be expressed as:

$$\begin{cases} X_p = X_{sp} \gg subpel_x \\ Y_p = Y_{sp} \gg subpel_y \\ X_{p+1} = (X_p + 1) \% inputPicWidth \\ Y_{p+1} = \text{clip3}(0, inputPicHeight - 1, Y_p + 1) \end{cases}$$

In one or more implementations, the Luma sample rendering may be expressed as:

$$renderingImgY[X_c, Y_c] =$$
$$(inputImgY[X_p, Y_p] * w[0] + inputImgY[X_{p+1}, Y_p] * w[1] +$$
$$inputImgY[X_p, Y_{p+1}] * w[2] + inputImgY[X_{p+1}, Y_p] * w[3] +$$
$$2^{subpel_x + subpel_y - 1}) \gg (subpel_x + subpel_y),$$

where the weights w[s] with s=0, 1, 2, 3 are computed by:

$$\begin{cases} dmx = X_{sp} \ \&(2^{subpel_x} - 1) \\ dmy = Y_{sp} \ \&(2^{subpel_y} - 1) \\ w[0] = (2^{subpel_x} - dmx) * (2^{subpel_y} - dmy) \\ w[1] = dmx * (2^{subpel_y} - dmy) \\ w[2] = (2^{subpel_x} - dmx) * dmy \\ w[3] = dmx * dmy \end{cases}$$

In some implementations, the Chroma sample rendering of Chroma format 4:2:0 may apply when both $X_c$ and $Y_c$ have even values. In some aspects, the disclosed system includes using the nearest four reference samples in the input picture to render a sample at location $(X_c/2, Y_c/2)$. In one or more implementations, an integer reference sample location calculation may be expressed as:

$$\begin{cases} X_p = X_{sp} \gg subpel_x + 1) \\ Y_p = Y_{sp} \gg subpel_y + 1) \end{cases}$$

$$\begin{cases} X_{p+1} = (X_p + 1)\%(inputPicWidth/2) \\ Y_{p+1} = \text{clip3}(0, inputPicHeight/2 - 1, Y_p + 1) \end{cases}$$

In one or more implementations, the Chroma sample rendering (U and V) may be expressed as:

$renderingImgUV[X_c/2, Y_c/2] =$
$(inputImgUV[X_p, Y_p] * w[0] + inputImgUV[X_{p+1}, Y_p] * w[1] +$
$inputImgUV[X_p, Y_{p+1}] * w[2] + inputImgUV[X_{p+1}, Y_p] * w[3] +$
$2^{subpel_x + subpel_y + 1}) \gg (subpel_x + subpel_y + 2)$ where the weights w[s] with s=0, 1, 2, 3 are computed by:

$$\begin{cases} dmx = X_{sp} \ \&(2^{subpel_x+1} - 1) \\ dmy = Y_{sp} \ \&(2^{subpel_y+1} - 1) \\ w[0] = (2^{subpel_x+1} - dmx) * (2^{subpel_y+1} - dmy) \\ w[1] = dmx * (2^{subpel_y+1} - dmy) \\ w[2] = (2^{subpel_x+1} - dmx) * dmy \\ w[3] = dmx * dmy \end{cases}$$

In one or more implementations, instead of pre-computing and storing the projection maps, a 360 degree video capture and playback system may compute the projection map on-the-fly (and block-by-block) for saving memory bandwidth. In this case, the projection map may not be loaded from the off-chip memory.

Figure 26:
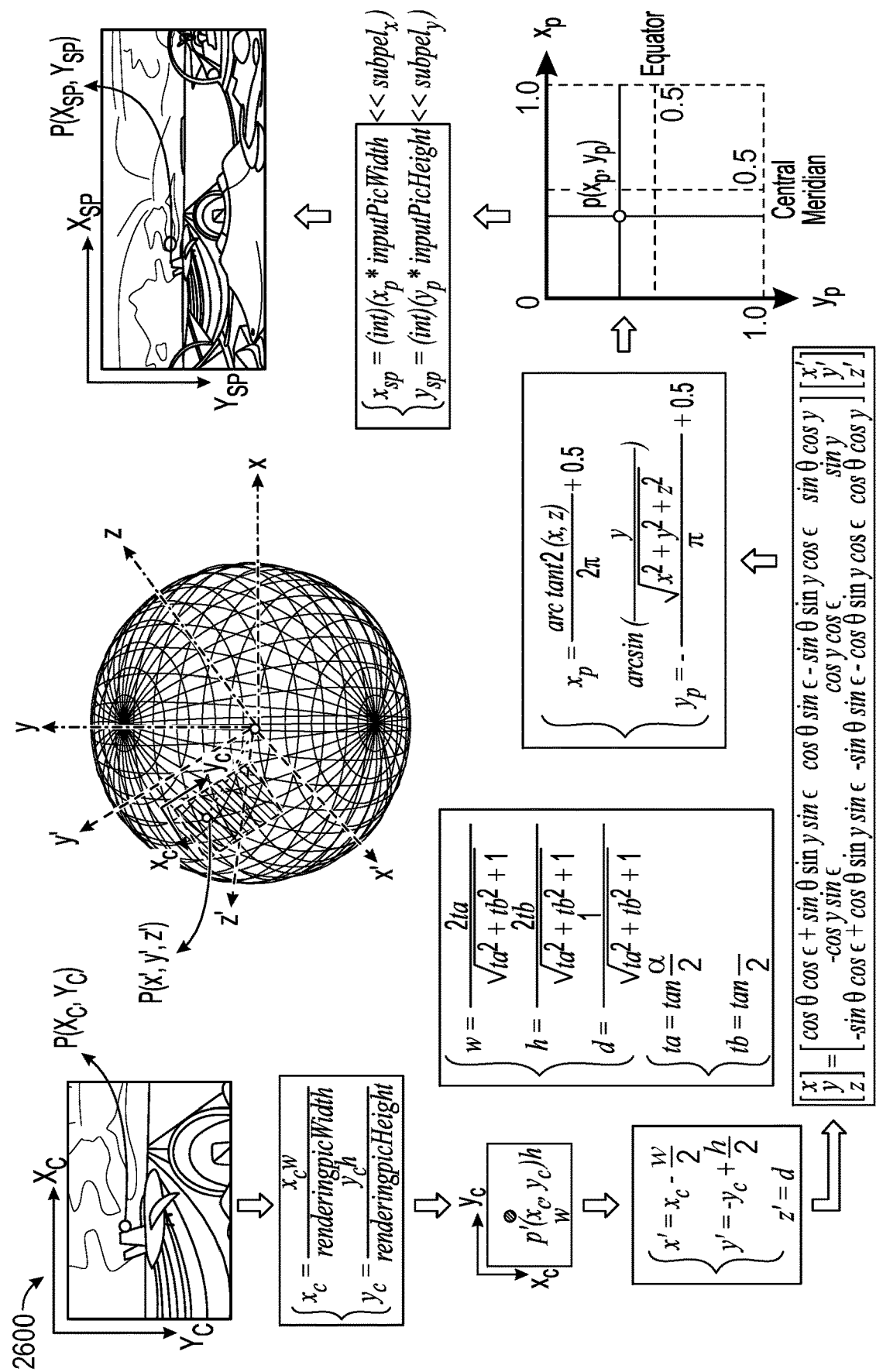
FIG. 26 conceptually illustrates a diagram of an example of projection map generation for equirectangular projection format.

FIG. 26 conceptually illustrates a diagram of an example of projection map generation 2600 for equirectangular projection. In one or more implementations, if the input picture is in equirectangular projection, and to map a sample point $(X_c, Y_c)$ in the rendering picture to a sample point $(X_{SP}, Y_{SP})$ in the input picture, the following steps may apply:

1) Compute normalized display projection plane size based on the FOV angles:

$$\begin{cases} w = \dfrac{2ta}{\sqrt{ta^2 + tb^2 + 1}} \\ h = \dfrac{2tb}{\sqrt{ta^2 + tb^2 + 1}} \\ d = \dfrac{1}{\sqrt{ta^2 + tb^2 + 1}} \end{cases}$$

where $ta = \tan\left(\dfrac{\alpha}{2}\right)$ and $tb = \tan\left(\dfrac{\beta}{2}\right)$ 2) Map $(X_c, Y_c)$ into the normalized rendering coordinate system:

$$\begin{cases} x_c = \dfrac{X_c w}{renderingPicWidth} \\ y_c = \dfrac{Y_c h}{renderingPicHeight} \end{cases}$$

3) Compute the coordinate of $p'(x_c, y_c)$ in (x', y', z') viewing coordinate system:

$$\begin{cases} x' = x_c - \dfrac{w}{2} \\ y' = -y_c + \dfrac{h}{2} \\ z' = d \end{cases}$$

4) Convert coordinate (x',y',z') into (x, y, z) capture coordinate system based on the viewing direction angles:

$$\begin{bmatrix} x \\ y \\ z \end{bmatrix} = \begin{bmatrix} \cos\epsilon\cos\theta & -\cos\epsilon\sin\theta\sin\gamma + \sin\epsilon\cos\gamma & \cos\epsilon\sin\theta\cos\gamma + \sin\epsilon\sin\gamma \\ -\sin\epsilon\cos\theta & \sin\epsilon\sin\theta\sin\gamma + \cos\epsilon\cos\gamma & -\sin\epsilon\sin\theta\cos\gamma + \cos\epsilon\sin\gamma \\ -\sin\theta & -\cos\theta\sin\gamma & \cos\theta\cos\gamma \end{bmatrix} \begin{bmatrix} x' \\ y' \\ z' \end{bmatrix}$$

5) Project p(x,y,z) onto the normalized projection coordinate system $p(x_p, y_p)$:

$$\begin{cases} x_p = \dfrac{\arctan2(x, y)}{2\pi} + 0.5 \\ y_p = -\dfrac{\arcsin\left(\dfrac{y}{\sqrt{x^2 + y^2 + z^2}}\right)}{\pi} + 0.5 \end{cases}$$

6) Map $p(x_p, y_p)$ onto the input picture (equirectangular) coordinate system $(X_{SP}, Y_{SP})$ $$\begin{cases} X_{SP} = (int)(x_p * inputPicWidth \ll subpel_x) \\ Y_{SP} = (int)(y_p * inputPicWidth \ll subpel_y) \end{cases},$$

where:
$\alpha, \beta$ are FOV angles and $\epsilon, \theta, \gamma$ are viewing direction angles.

renderingPicWidth×renderingPicHeight is the renedering picture size inputPicWidth×inputPicHeight is the input picture size (in equirectangular projection format)

Figure 27:
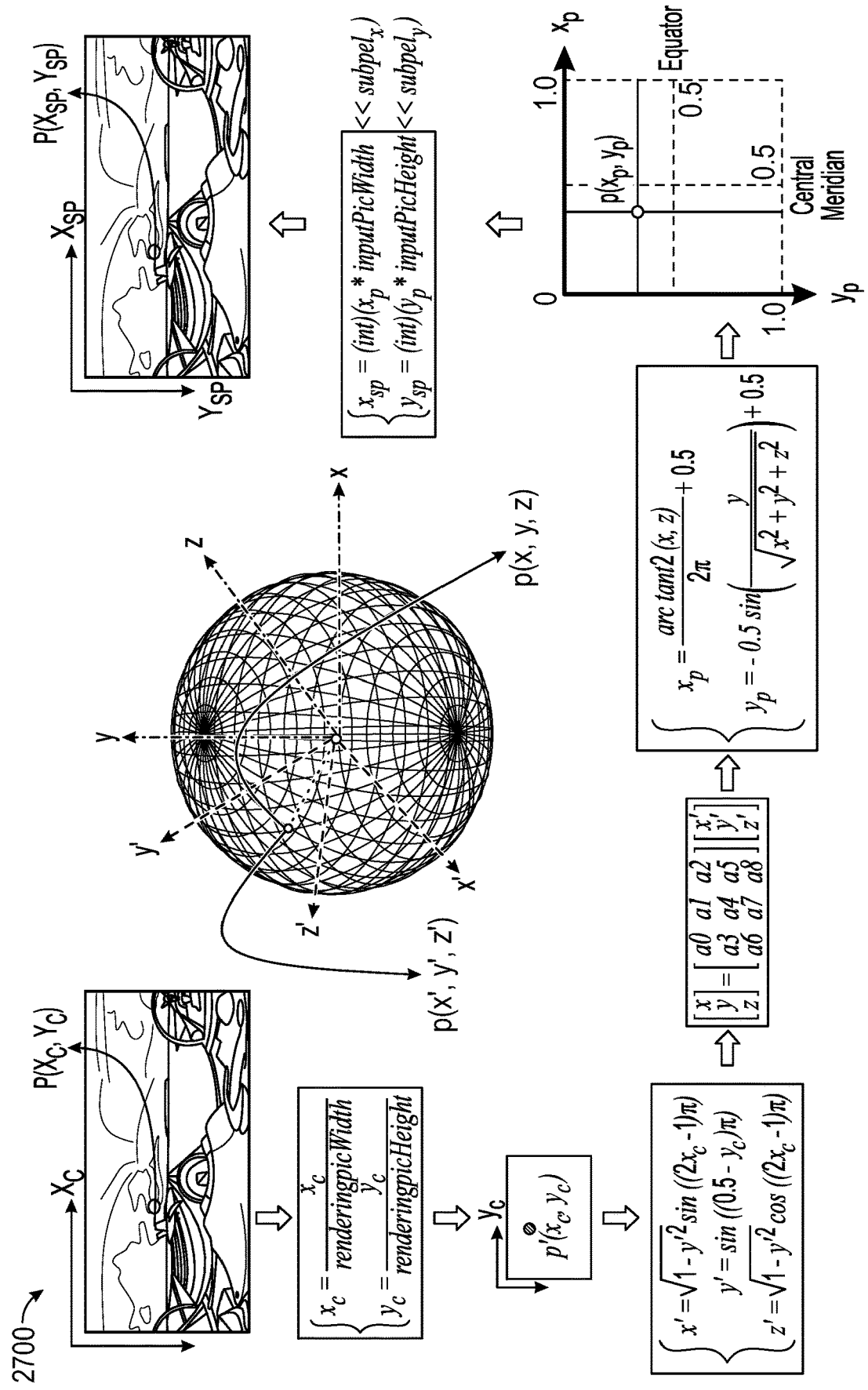
FIG. 27 conceptually illustrates a diagram of an example of a projection format conversion from equal area projection to equirectangular projection.

FIG. 27 conceptually illustrates a diagram 2700 of an example of a projection format conversion from equal area projection (EAP) to equirectangular projection (ERP). The input 360 degree video can be converted from one projection format to another. The coordinate mapping between a 360 degree video picture of an output projection format (i.e. target format) and a 360 degree video picture of an incoming projection format (i.e. source format) is called projection format conversion map. As shown in FIG. 27, a 2D coordinate $P(X_C, Y_C)$ in a 360 degree video picture of the output projection format (e.g. ERP in this case) is mapped to a 3D point p'(x', y', z') on a unity sphere, then converted to p(x, y, z) in the 3D capture coordinate system, and finally converted p(x, y, z) into the 2D input 360 degree video picture coordinate system based on the incoming projection format (e.g. EAP). The processing steps for generation of the projection format conversion map may be as follows:

1) Map $(X_c, Y_c)$ in ERP into the normalized rendering coordinate system:

$$\begin{cases} x_c = \dfrac{X_c w}{renderingPicWidth} \\ y_c = \dfrac{Y_c h}{renderingPicHeight} \end{cases}$$

2) Compute the coordinate of $p'(x_c, y_c)$ in (x', y', z') viewing coordinate system (e.g., ERP):

$$\begin{cases} x' = \sqrt{1 - y'^2} \sin((2x_c - 1)\pi) \\ y' = \sin((0.5 - y_c)\pi) \\ z' = \sqrt{1 - y'^2} \cos((2x_c - 1)\pi) \end{cases}$$

3) Convert coordinate (x',y',z') into (x, y, z) capture coordinate system based on the global rotation angles between two projection formats:

$$\begin{bmatrix} x \\ y \\ z \end{bmatrix} = \begin{bmatrix} a0 & a1 & a2 \\ a3 & a4 & a5 \\ a6 & a7 & a8 \end{bmatrix} \begin{bmatrix} x' \\ y' \\ z' \end{bmatrix}$$

4) Project p(x,y,z) onto the normalized projection coordinate system $p(x_p, y_p)$ (e.g., EAP):

$$\begin{cases} x_p = \dfrac{\arctan 2(x, y)}{2\pi} + 0.5 \\ y_p = -0.5 \sin\left(\dfrac{y}{\sqrt{x^2 + y^2 + z^2}}\right) + 0.5 \end{cases}$$

5) Map $p(x_p, y_p)$ onto the input picture (EAP) coordinate system $(X_{SP}, Y_{SP})$ $$\begin{cases} X_{SP} = (int)(x_p * inputPicWidth \ll subpel_x) \\ Y_{SP} = (int)(y_p * inputPicHeight \ll subpel_y) \end{cases},$$

where:

renderingPicWidth×renderingPicHeight is the picture size of output projection format (e.g. ERP)

inputPicWidth×inputPicHeight is the input picture size (e.g., EAP)

Figure 28:
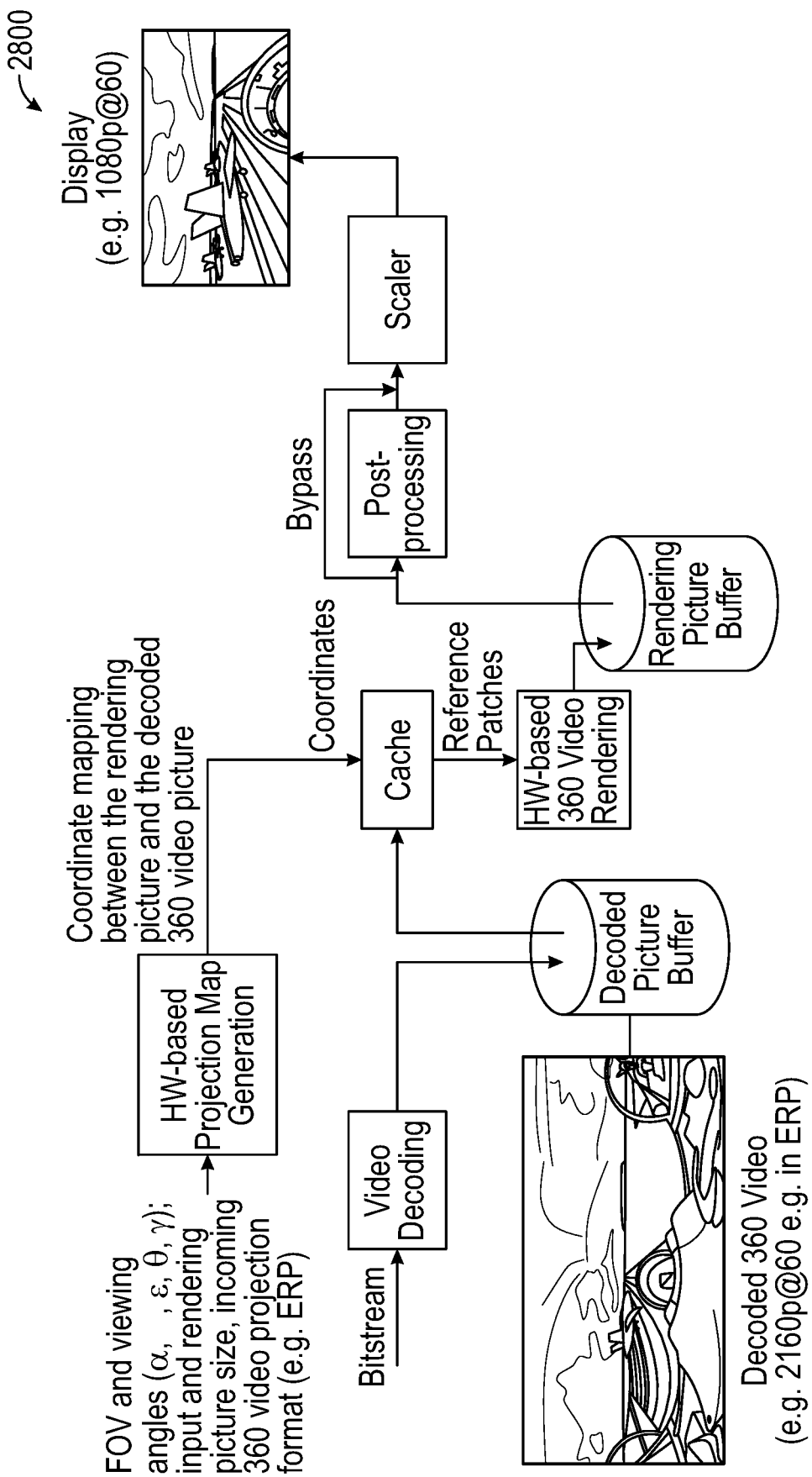
FIG. 28 conceptually illustrates a diagram of an example of viewport rendering from equirectangular projection using hardware-based projection map generation.

FIG. 28 conceptually illustrates a diagram 2800 of an example of viewport rendering from equirectangular projection. Hardware solutions may be the most economical solutions from the implementation cost and power consumption point of view. FIG. 28 depicts the diagram of a hardware based 360 degree video rendering system. The system may be made up of the following parts:

A video decoder that de-compresses the incoming 360 degree video stream and stores the decoded 360 degree video sequence into a decoded picture buffer.

A 360 degree video projection map generator that generates the projection map on-the-fly using hardware.

A cache model that brings in the reference sample patches for rendering based on the coordinates delivered in the projection map.

A 360 degree video rendering engine that produces rendering samples using e.g. bilinear interpolation of reference samples, and stores the rendered samples into the rendering picture buffer.

A video post-processing engine that reads in the rendering pictures, applies post-processing such as scaling and delivers the video to display.

One drawback of such a hardwired system as depicted in FIG. 28 is that it is not flexible to support other 360 degree video projection formats. For example, given that the hardwired system is specifically designed for ERP, the hardwired system may not support the an emerging projection format at the same performance (e.g. 4K@p60 in, and 1080p@60 out).

Figure 29:
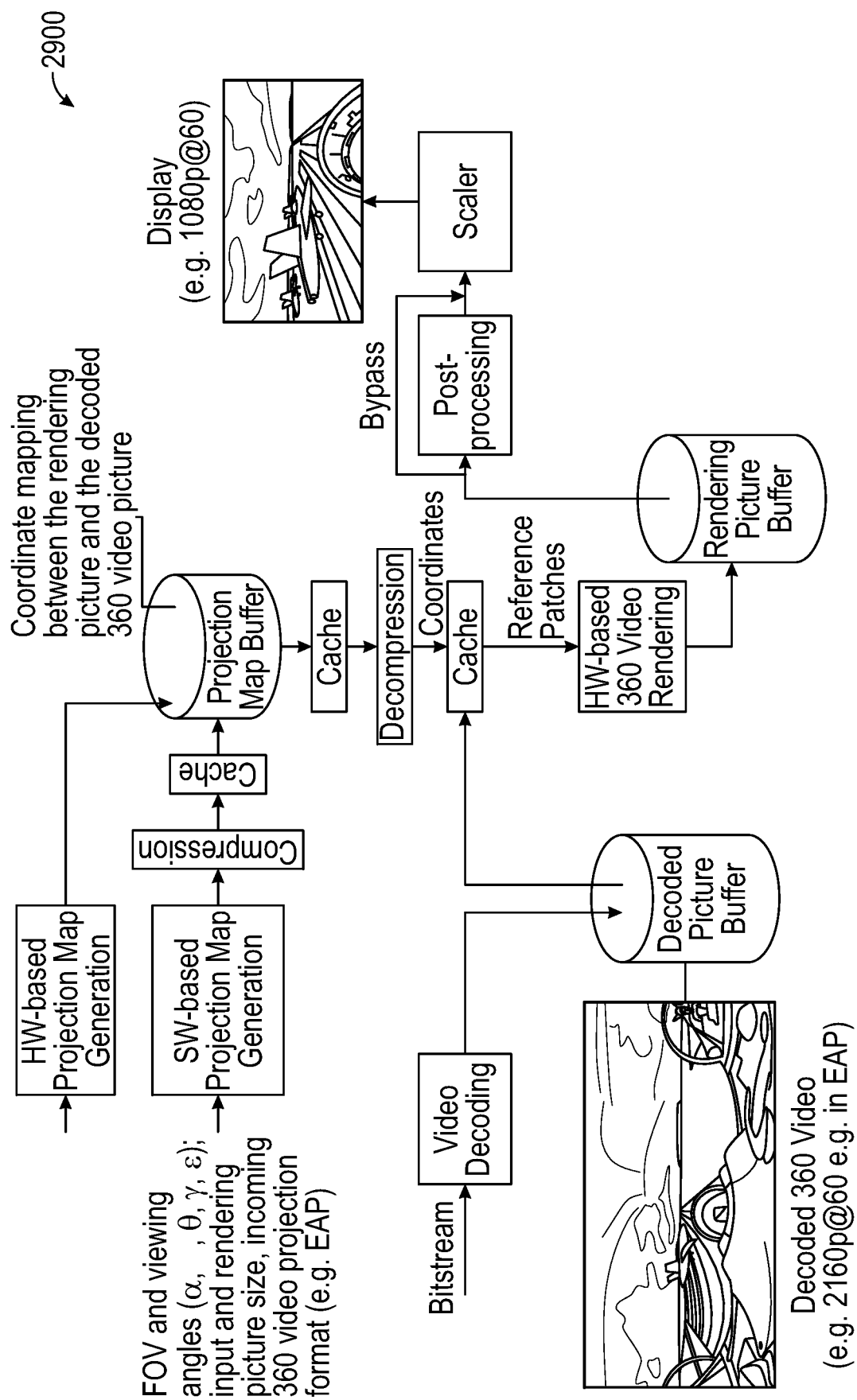
FIG. 29 conceptually illustrates a diagram of an example of viewport rendering from a projection format using a software-based projection map generation.

FIG. 29 conceptually illustrates a diagram 2900 of an example of viewport rendering from a projection format in which the projection map is generated using a programmable processor. As shown in FIG. 29, for any emerging projection format, the hardware projection map generator may not be used. Instead, a software-based projection map generation block is added. The generated projection map for an emerging projection format is compressed and stored in a projection map buffer. During the rendering, the compressed projection map is loaded and de-compressed before re-using the hardwired logic to load the reference patches and performing the rendering.

The projection map compression may be used for saving the memory bandwidth required for load/store of the pre-generated projection map for an emerging projection format. The determination of which part of projection map is loaded during the rendering is triggered by the block locations in the viewport for block-based rendering.

In some implementations, while the projection map generation is projection format dependent, the hardwired cache model and rendering engine can be re-used by any emerging projection formats. In other implementations, the projection map may not change from picture to picture, however, it may change if the viewing direction and/or FOV angles change. Hence, it can be computed by using a programmable processor (e.g., SW-based projection map generation), and the computation does not have to be performed in real-time.

Figure 30:
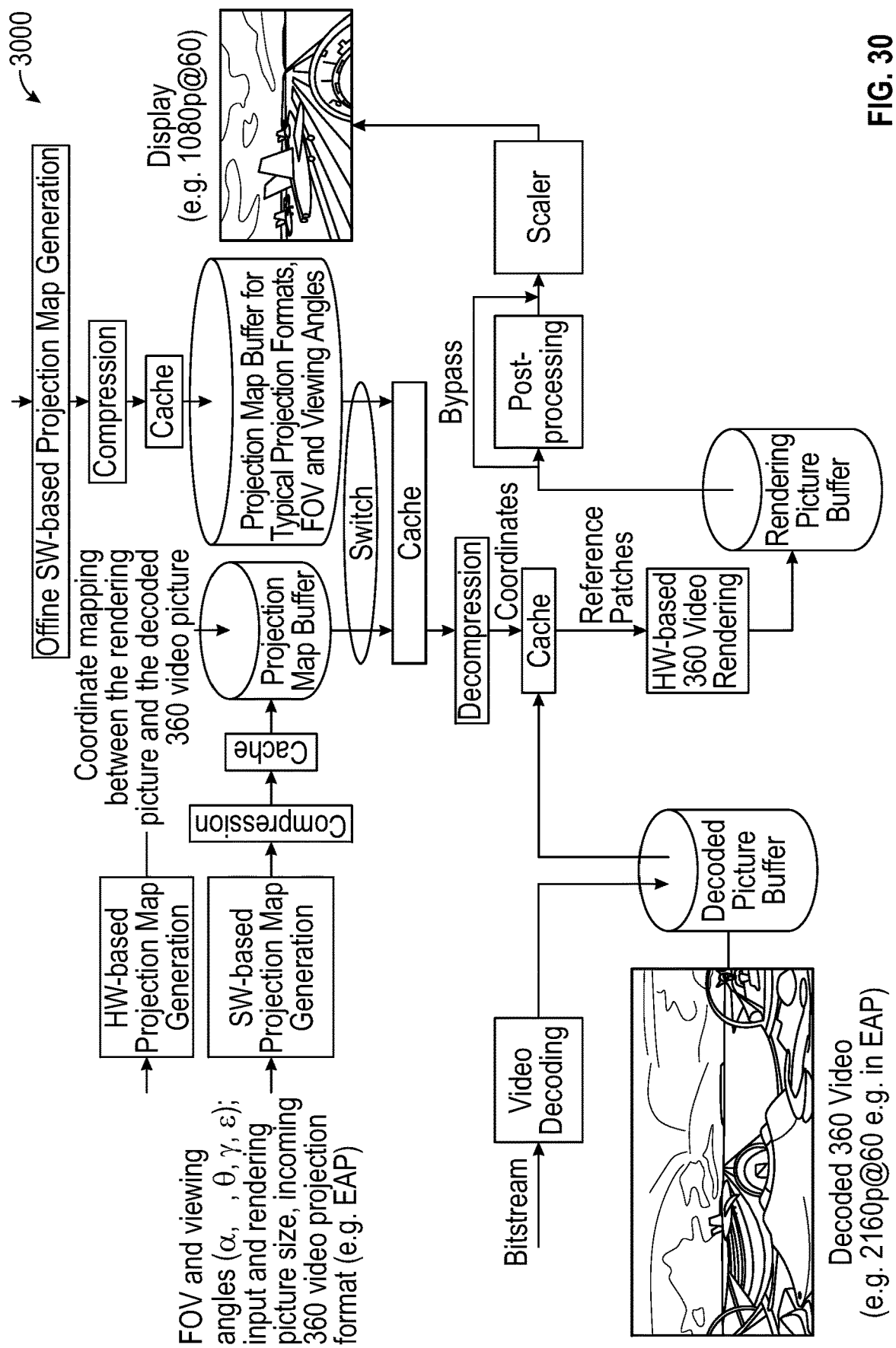
FIG. 30 conceptually illustrates a diagram of an example of an extended version of the viewport rendering system of FIG. 29.

FIG. 30 conceptually illustrates a diagram 3000 of an example of an extended version of the viewport rendering system of FIG. 29. In FIG. 30, the diagram 3000 includes a switch that is configured to switch between a projection map buffer that stores the generated projection maps in the emerging projection formats and an additional projection map buffer that stores projection maps with typical projection formats, FOV and viewing direction angles. Different from the rendering system of FIG. 29, in the system of FIG. 30, the projection map can be directly loaded from the additional projection map buffer if the projection map for an incoming projection format and used FOV and viewing direction angles is already generated and stored.

Figure 31:
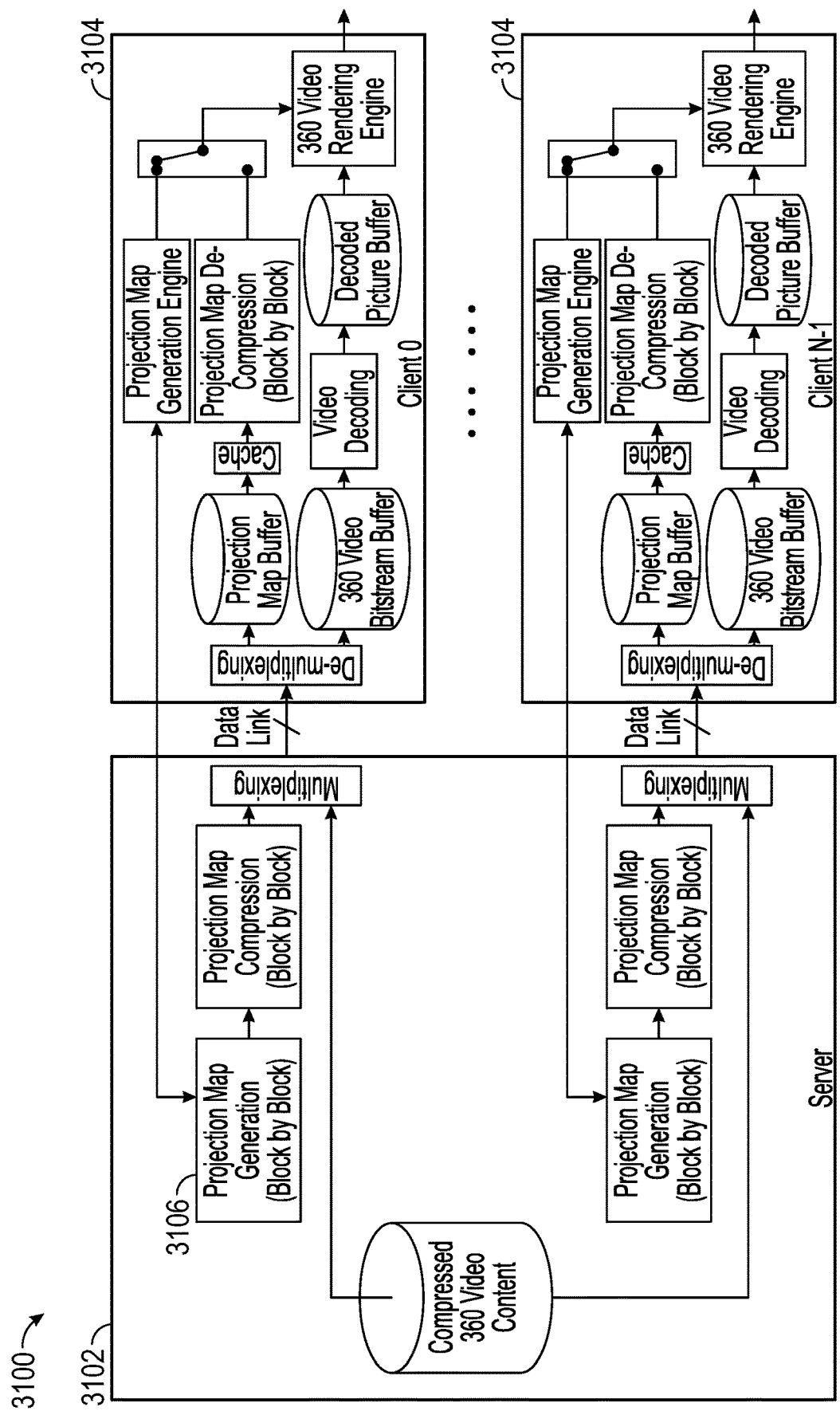
FIG. 31 illustrates a diagram of an example of a server-client arrangement for implementing the viewport rendering system of FIG. 29.

FIG. 31 illustrates a diagram 3100 of an example of a server-client arrangement for implementing the viewport rendering system of FIG. 29. A server 3102 may serve a compressed projection map to one or more clients 3104 over respective data links, if an incoming projection format is not supported by the projection map generation engine(s) on the client side. At each client 3104, the 360 video bitstream is decoded and rendered using the decompressed projection map provided by the server 3102.

On the server side, the projection map generation block 3106 may receive incoming projection format information, the FOV and viewing angles ($\alpha, \beta, \theta, \gamma, \epsilon$), the input picture size information and rendering picture size information as input over a back channel to the projection map generation block 3106. With the received information, the projection map generation block 3106 generates, compresses the projection map for the incoming projection format, and stores it on the server 3102. The server 3102 may then provide the compressed 360 video content along with the compressed projection map to a client 3104 for 360 degree video rendering.

On the client side, the projection map generation engine may receive incoming projection format information, the FOV and viewing angles ($\alpha, \beta, \theta, \gamma, \epsilon$), the input picture size information and rendering picture size information as input. If the incoming projection format is supported by the projection map generation engine (i.e. a so-called client-supported projection format), the server 3102 may just provide the client 3104 with the compressed 360 video content, the client-side projection map generation engine may generate the projection map and provide it to the 360 video rendering engine for rendering; if the incoming projection format is not supported by the projection map generation engine, the client 3104 may send all the required information for projection map generation to the server 3102 via a back channel, the server 3102 may provide the client 3104 with both the compressed 360 video content and compressed projection map, the client-side projection map de-compression block may de-compress the compressed projection map provided by the server 3102 and provide it to the 360 video rendering engine for rendering. In one or more implementations, the server 3102 may always receive all the required information for projection map generation from the client(s) 3104 regardless of whether the incoming projection format is supported by the client(s) 3104, and provide the client(s) 3104 both the compressed 360 video content and projection map, the client(s) 3104 may have discretion to use either the projection map generation engine or the projection map de-compression block to generate projection map and provide it to the 360 video rendering engine for rendering.

Figure 32:
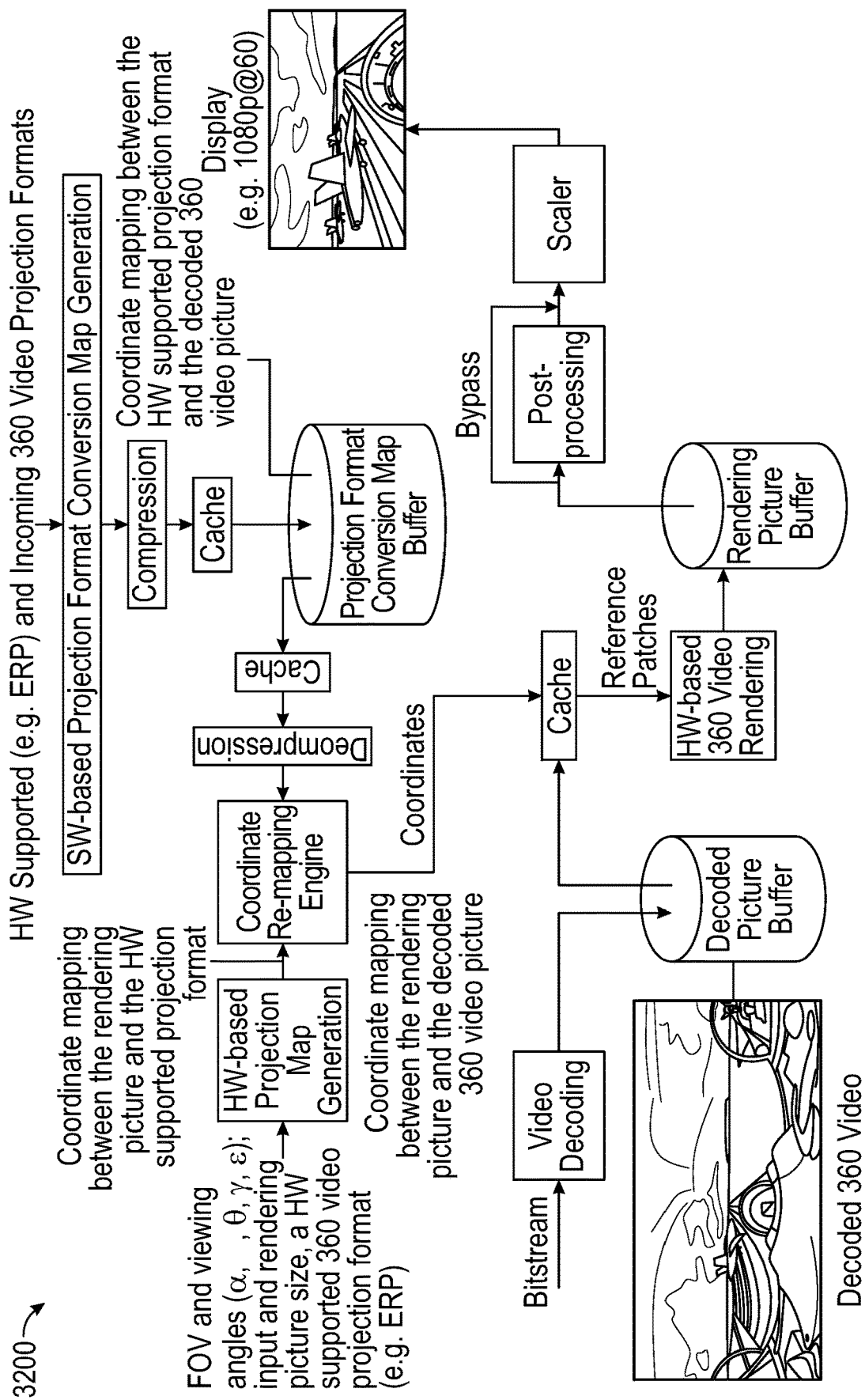
FIG. 32 conceptually illustrates a diagram of an example of viewport rendering from a projection format using a software-based projection format conversion map generation.

FIG. 32 conceptually illustrates a diagram 3200 of an example of viewport rendering in a projection format using a software-based projection format conversion map generation. Instead of using SW-based projection map generation to support an emerging projection format, in the rendering system of FIG. 32 a software based block is added to generate the projection format conversion map from the HW supported projection format (e.g. ERP) to an emgerging projection format (e.g. EAP). As shown in FIG. 32, all the function blocks of the hardware 360 degree video playback system (including the projection map generator, cache model and rendering engine) designed for a supported projection format (e.g. ERP) are active. To support an emerging projection format such as EAP on the top of a hardware rendering system that is exclusive to a supported projection format e.g. ERP, the following steps map apply:

Use software to generate the projection format conversion map from a supported projection format e.g. ERP to an emerging projection format e.g. EAP (only needs to be computed once).

Use the existing hardwired projection map generator to generate projection map from the rendering picture (viewport) to the supported projection format e.g. ERP.

Use the coordinate re-mapping engine to create the direct coordinate mapping from the the rendering picture (viewport) to the input emerging projection format e.g. EAP by cascading the on-the-fly generated projection map and the pre-stored projection format conversion map.

i) Projection map establishes the coordinate mapping between a sample location in the viewport and its reference sample in a 360 degree video picture of supported projection format (i.e. ERP in this case).

ii) Projection format conversion map establishes the coordinate mapping between a sample location in a 360 degree video picture of supported projection format (i.e. ERP in this case) and the input 360 degree video picture of an emerging projection format (i.e. EAP in this case).

iii) Cascading the projection map and the projection conversion map together establishes the coordinate mapping between a sample location in the viewport and its reference sample in the input 360 degree video picture of an emerging projection format (i.e. EAP in this case).

Use the cache model and rendering engine as is to perform viewport rendering.

Figure 33:
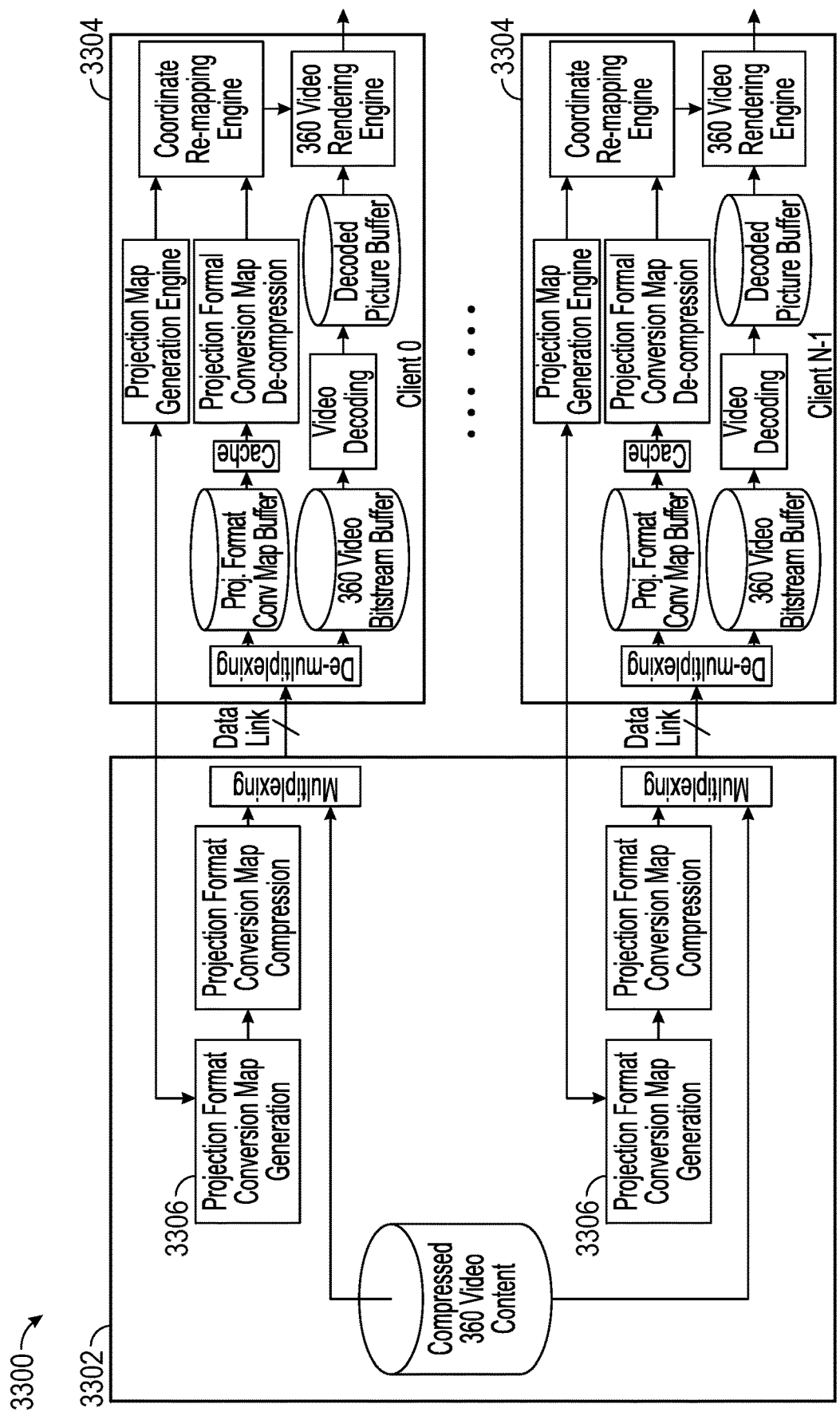
FIG. 33 illustrates a diagram of an example of a server-client arrangement for implementing the viewport rendering system of FIG. 32.

FIG. 33 illustrates a diagram 3300 of an example of a server-client arrangement for implementing the viewport rendering system of FIG. 32. A server 3302 may serve a compressed projection format coversion ion map to one or more clients 3304 over respective data links, if an incoming projection format is not supported by the projection map generation engine(s) on the client side. At each client 3304, the 360 video bitstream is decoded and rendered using the projection map which is generated by cascading the projection map produced by the client-side projection map generation engine and the decompressed projection format conversion map provided by the server 3302.

On the server side, the projection format coversion map generation block may receive incoming projection format information, the client-supported projection format information and the input picture size information as input over a back channel to the projection format conversion map generation block 3306. With the received information, the projection format conversion map generation block 3306 generates, compresses the projection format conversion map for the incoming projection format, and stores it on the server 3302. The server 3302 may then provide the compressed 360 video content along with the compressed projection format conversion map to a client 3304 for 360 video rendering.

On the client side, the projection map generation engine may receive incoming projection format information, the FOV and viewing angles ($\alpha, \beta, \theta, \gamma, \epsilon$), the input picture size information and rendering picture size information as input.

If the incoming projection format is supported by the projection map generation engine (i.e. a so-called client-supported projection format), the server 3302 may just provide the client 3304 with the compressed 360 video content, the client-side projection map generation engine may generate the projection map and provide it directly (i.e. bypass the coordinate re-mapping engine) to the 360 video rendering engine for rendering; if the incoming projection format is not supported by the projection map generation engine, the client 3304 may send all the required information for projection format conversion map generation to the server 3302 via a back channel, the server 3302 may provide the client 3304 with both the compressed 360 video content and compressed projection format conversion map, the client-side projection format conversion map de-compression block may de-compress the compressed projection format conversion map provided by the server 3302 and provide it to the coordinate-mapping engine. The coordinate-mapping engine then generates the projection map for the incoming projection format by taking the projection map for the client-supported projection format (coordinate mapping between the output rendering picture and the client-supported projection format) and the decompressed projection format conversion map (coordinate mapping between the client-supported projection format and the incoming projection format) as input and cascading them, and provide it to the 360 video rendering engine for rendering.

Figure 34:
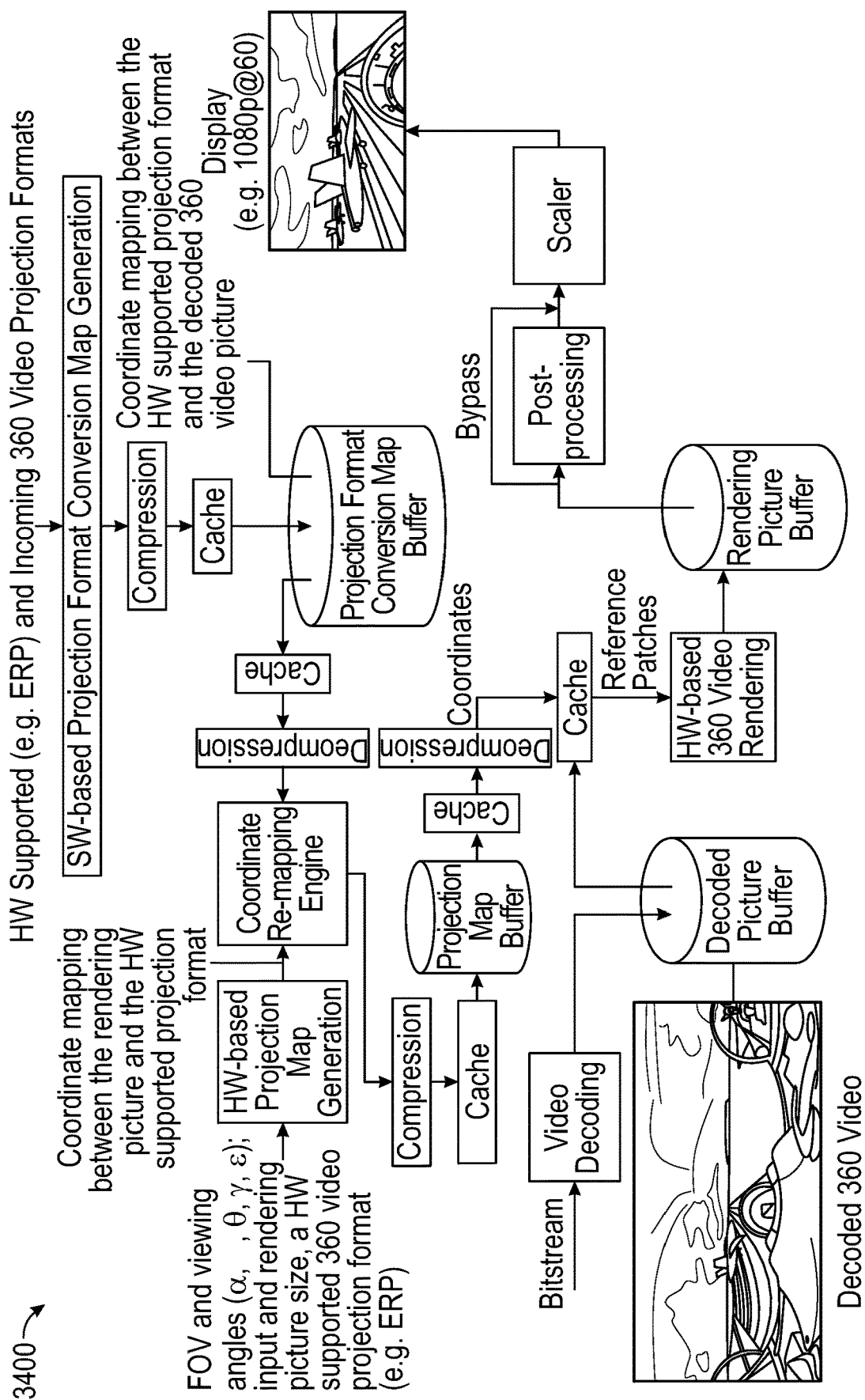
FIG. 34 conceptually illustrates a diagram of an example of an extended version of the viewport rendering system of FIG. 32.

FIG. 34 conceptually illustrates a diagram 3400 of an example of viewport rendering from a projection format using an extended system of FIG. 32. On the top of the rendering system of FIG. 32, an additional projection map buffer is added to the rendering system of FIG. 34. Instead of generating the projection map for an incoming projection format on-the-fly, the coordinate re-mapping engine may produce the projection map in advance, and compress and store it in the projection map buffer.

In some aspects, the software (or firmware) to generate the projection format conversion map between the supported projection format and the emerging projection format is used, and the map is compressed and stored. In some implementations, this process is performed once for an emerging projection format. In one or more implementations, when FOV and/or viewing direction angles change, a new projection map is generated by using the coordinate re-mapping logic, which receives the hardware-generated projection map between the rendering picture and the hardware-supported format as input, and the pre-stored projection format conversion map generated by the software as input. This process may be much faster than the software-based projection map generation, as the coordinate remapping block is in hardware. In this respect, the projection map may be compressed and stored into the projection map buffer. For rendering, the compressed projection map is loaded from the projection map buffer and de-compressed before fed into the rendering engine.

Coordinate compression is applied to save the memory bandwidth used for load/store of the pre-generated projection map and projection format conversion map for an emerging projection format. In one or more implementations, the face ID values for projection formats of multiple faces are not compressed. In other implementations, the associated face ID value for each coordinate may also be compressed, and the coordinates along a discontinuous face boundary do not have to be rounded to integer-pel precision.

Figure 35:
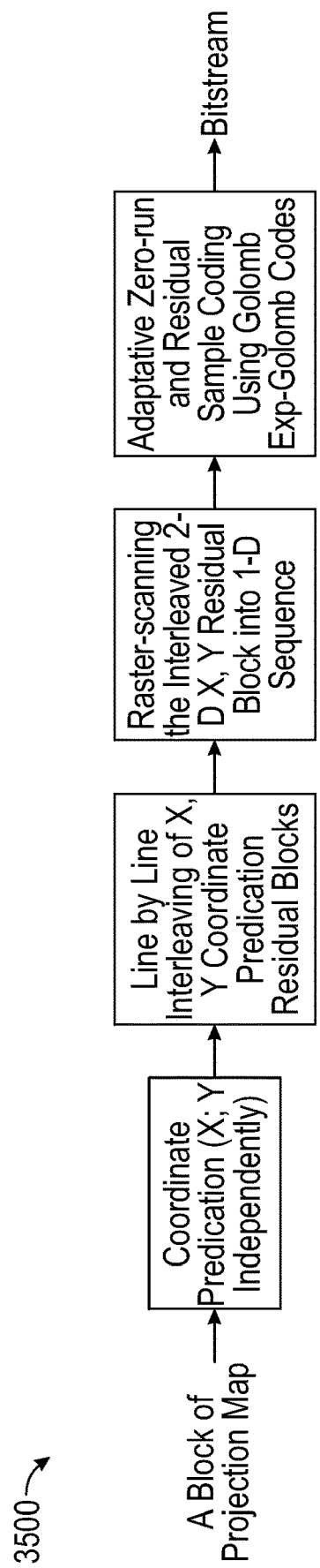
FIG. 35 conceptually illustrates a diagram of an example of coordinate compression for projection map and projection format conversion map.

FIG. 35 conceptually illustrates a diagram 3500 of an example of coordinate compression for projection map and projection format conversion map. Both the projection map and projection format conversion map be compressed in order to bring the memory bandwidth consumption for map load/store to an acceptable level.

A projection map or a projection format conversion map stores an array of 2D X, Y coordinates in integer-pel or sub-pel precision, which can be compressed losslessly by leveraging the coordinate correlation of neighboring sample locations. The coordinate compression algorithm as illustrated in FIG. 35 may have the following steps:

1) Coordinate prediction (X, Y coordinates independent) from neighboring pixels (or blocks)
2) Interleaving of X, Y coordinate prediction residual blocks
3) Raster-scanning the interleaved X,Y coordinate residual block into a 1-D sequence
4) Compression with the adaptive zero-run coding and residual sample coding by using the Golomb and Exp-Golomb codes, respectively.

A projection map or a projection format conversion map may be evenly divided into blocks for compression. For a projection map, the block size may be aligned with the viewport rendering block size so that a block of compressed projection map conveniently corresponds to a block of viewport (rendering picture) to be rendered. For a projection format conversion map, the block size does not need to be aligned with the rendering block size but may be selected in a way that leads to the best cache efficiency for loading in the compressed projection format conversion map during the viewport rendering. In one or more implementations, a projection map or a projection format conversion map may be down-sampled before compression to further reduce the memory bandwidth consumption for load/store of the compressed projection map or projection format conversion map.

Figure 36:
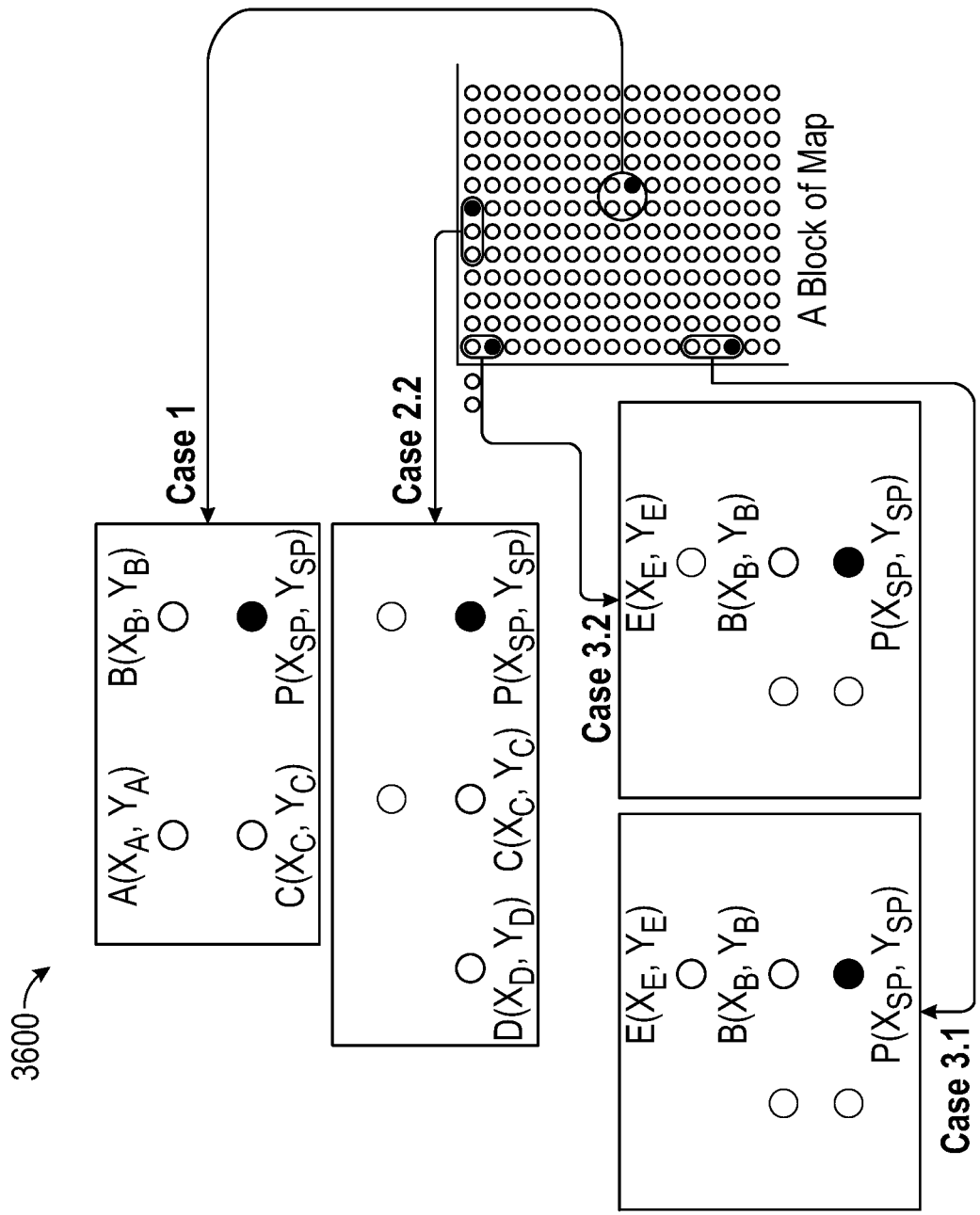
FIG. 36 conceptually illustrates examples of different cases of coordinate prediction.

FIG. 36 conceptually illustrates examples of different cases of coordinate prediction 3600. To minimize the implementation cost, neither a line buffer nor a column buffer may be used in the coordinate prediction. For coordinate prediction of a projection map or projection format conversion map block, there are several prediction cases based on the availability of neighbors, namely:

Case 1 (A, B, C are all available)

$$\begin{cases} \Delta X_{SP} = X_{SP} - (X_B + X_C - X_A) \\ \Delta Y_{SP} = Y_{SP} - (Y_B + Y_C - Y_A) \end{cases}$$

Case 2 (B is unavailable, i.e. at the $1^{st}$ row of a block)

Case 2.1 (the upper-left corner position of the block projection map at the $1^{st}$ column of the projection map picture) FLC-coding of $(X_{SP}, Y_{SP})$ Case 2.2 (positions other than case 2.1)

$$\begin{cases} \Delta X_{SP} = X_{SP} - (2X_C - X_D) \\ \Delta Y_{SP} = Y_{SP} - (2Y_C - Y_D) \end{cases},$$

where for each block the coordinates of the last two positions of the $1^{st}$ row are stored for prediction of the next block.

Case 3 (C is unavailable, i.e. at the 1$^{st}$ column of a block)
Case 3.1 (both B and E are available)

$$\begin{cases} \Delta X_{SP} = X_{SP} - (2X_B - X_E) \\ \Delta Y_{SP} = Y_{SP} - (2Y_B - Y_E) \end{cases}$$

Case 3. 2 (only B is available)

$$\begin{cases} \Delta X_{SP} = X_{SP} - X_B \\ \Delta Y_{SP} = Y_{SP} - Y_B \end{cases}$$

FIG. 37 conceptually illustrates an example of XY-interleaved coordinate residual block 3700 after coordinate prediction and interleaving. FIG. 37 provides an example of an 8×8 block of X, Y coordinate map, X, Y coordinate residual blocks after prediction and the interleaved X, Y coordinate residual block. In one or more implementations, the coordinates of last two locations of the first row of the left neighboring block are stored for the coordinate prediction of the current block.

Figure 38:
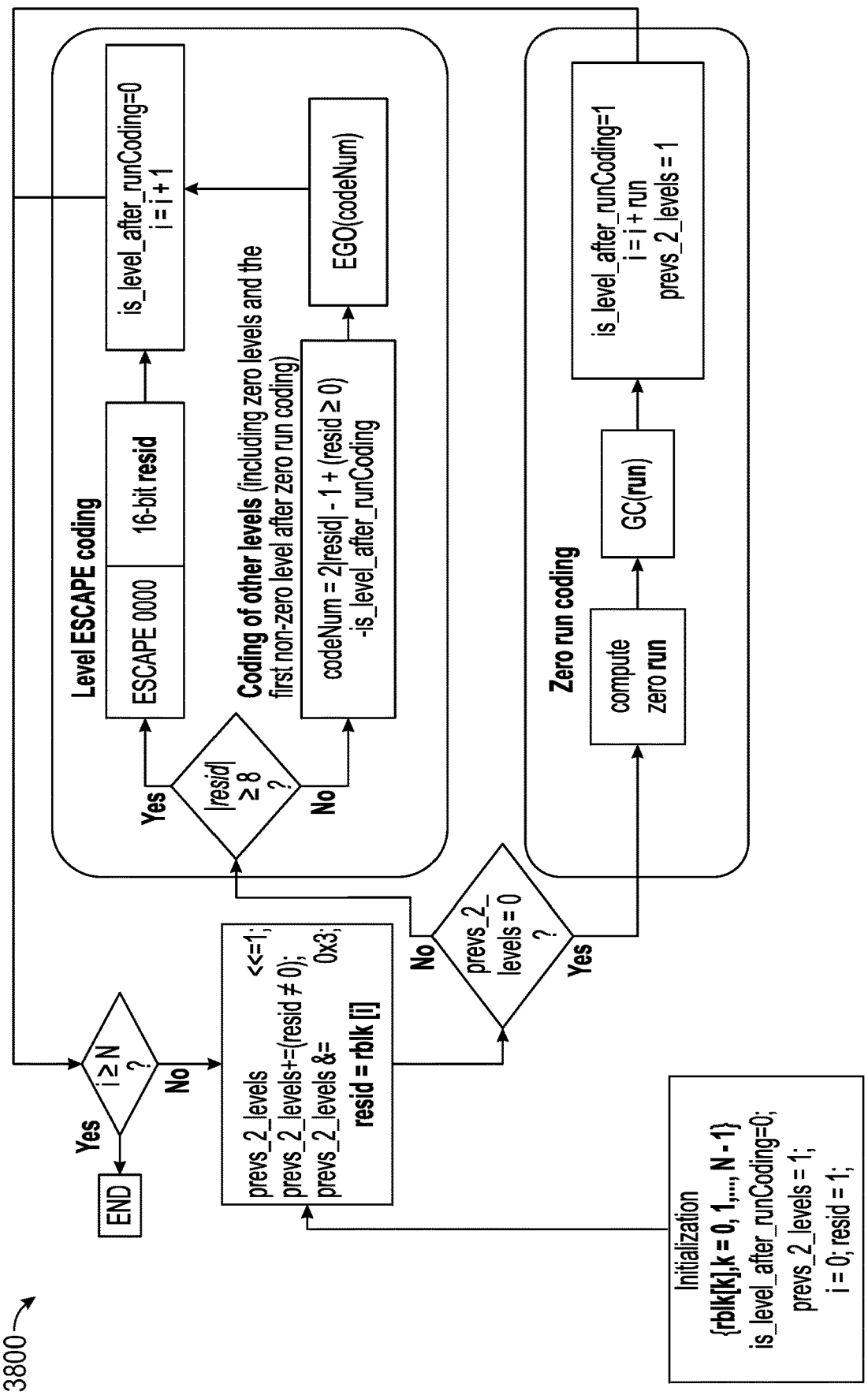
FIG. 38 illustrates an example of a process of coordinate residual compression.

FIG. 38 illustrates an example of a process 3800 of coordinate residual compression. After the coordinate prediction, the coordinate residual sequence for a block of map (either projection map or projection format conversion map) is compressed by using the adaptive zero-run coding and residual level coding as shown in FIG. 38. The compression may have the following steps:

1) The coordinate of upper-left corner of the first block map of each block row is FLC-coded (16-bit each)
2) A block of projection map residual is coded with the adaptive zero run and residual sample level coding in raster-scan order
   i) Residual levels outside the range of [−7:7] is coded with 4-bit ESCAPE, 16-bit FLC-coded residual
   ii) Residual levels in the range of [−7:7] are coded with Exp-Golomb code
   iii) Zero runs are coded with Golomb code
   iv) Adaptation between the zero-run coding and residual level coding is implicitly controlled by the residual values of previously coded two residuals and the value of current residual:
      (1) Level coding is turned on at the beginning of the block
      (2) Zero run coding is switched on if the previous two residuals immediately preceding the current residual are all zero
      (3) Zero run coding is transitioned to level coding when the current residual is non-zero
      (4) Repeat steps 2 and 3 until finishing coding of the block.

In one or more implementations, the VLC tables used for zero run coding and residual level coding are provided in Table 3 and Table 4, respectively. An example of coordinate residual coding based on the disclosed system is depicted in Table 5.

TABLE 3

Exp-Golomb Codes used for residual level coding

| Is_level_after_runCoding | | Exp-Golomb Code | |
|---|---|---|---|
| 0 | 1 | (i.e. EG0(codeNum)) | |
| residual | residual | codecNum | codeword |
| 0 | −1 | 0 | 1 |
| −1 | 1 | 1 | 01 0 |
| 1 | −2 | 2 | 01 1 |
| −2 | 2 | 3 | 001 00 |
| 2 | −3 | 4 | 001 01 |
| −3 | 3 | 5 | 001 10 |
| 3 | −4 | 6 | 001 11 |
| −4 | 4 | 7 | 0001 000 |
| 4 | −5 | 8 | 0001 001 |
| −5 | 5 | 9 | 0001 010 |
| 5 | −6 | 10 | 0001 011 |
| −6 | 6 | 11 | 0001 100 |
| 6 | −7 | 12 | 0001 101 |
| −7 | 7 | 13 | 0001 110 |
| 7 | | 14 | 0001 111 |
| >=8 or <=−8 | >=8 or <=−8 | ESCAPE | ESCAPE = 0000, 16-bit FLC residual |

TABLE 4

Golomb Codes used for zero run coding
Golomb Code (i.e. GC(run))

| | run | codeword |
|---|---|---|
| 1 | 0~1 | 1 x |
| 2 | 2~5 | 01 xx |
| 3 | 6~13 | 001 xxx |
| 4 | 14~29 | 0001 xxxx |
| 5 | 30~61 | 00001 xxxxx |
| ... | ... | ... |
| g | $2^g - 2$~$2^{g+1} - 3$ | 000 . . . 001 xxx . . . xxx |

FIG. 42 is a Table 4200 illustrating examples of coordinate residual compression (residual, coding symbols and VLC codes). In one or more implementations, the VLC tables are used for high-throughput. For better compression efficiency, other more complicated entropy coding tool such as context adaptive binary arithmetic coding may be used. Experimental results revealed that the disclosed system can achieve a compression ratio of approximately 9× for projection map and projection format conversion map of different emerging projection formats.

Figure 39:
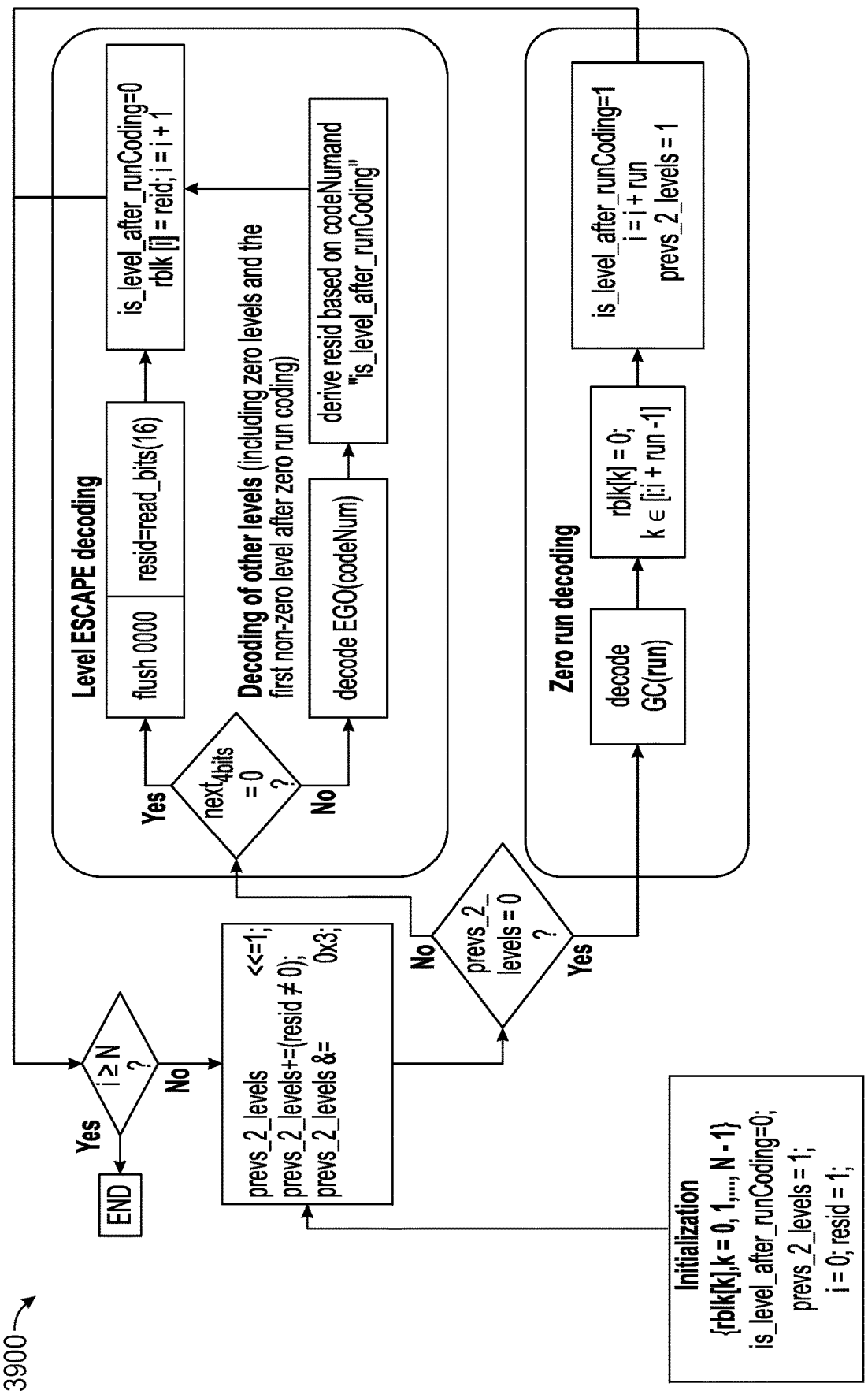
FIG. 39 illustrates an example of a process of coordinate residual decompression.

FIG. 39 illustrates an example of a process 3900 of coordinate residual decompression. In FIG. 39, the decompression algorithm may be hardwired to meet high-throughput requirements.

Figure 40:
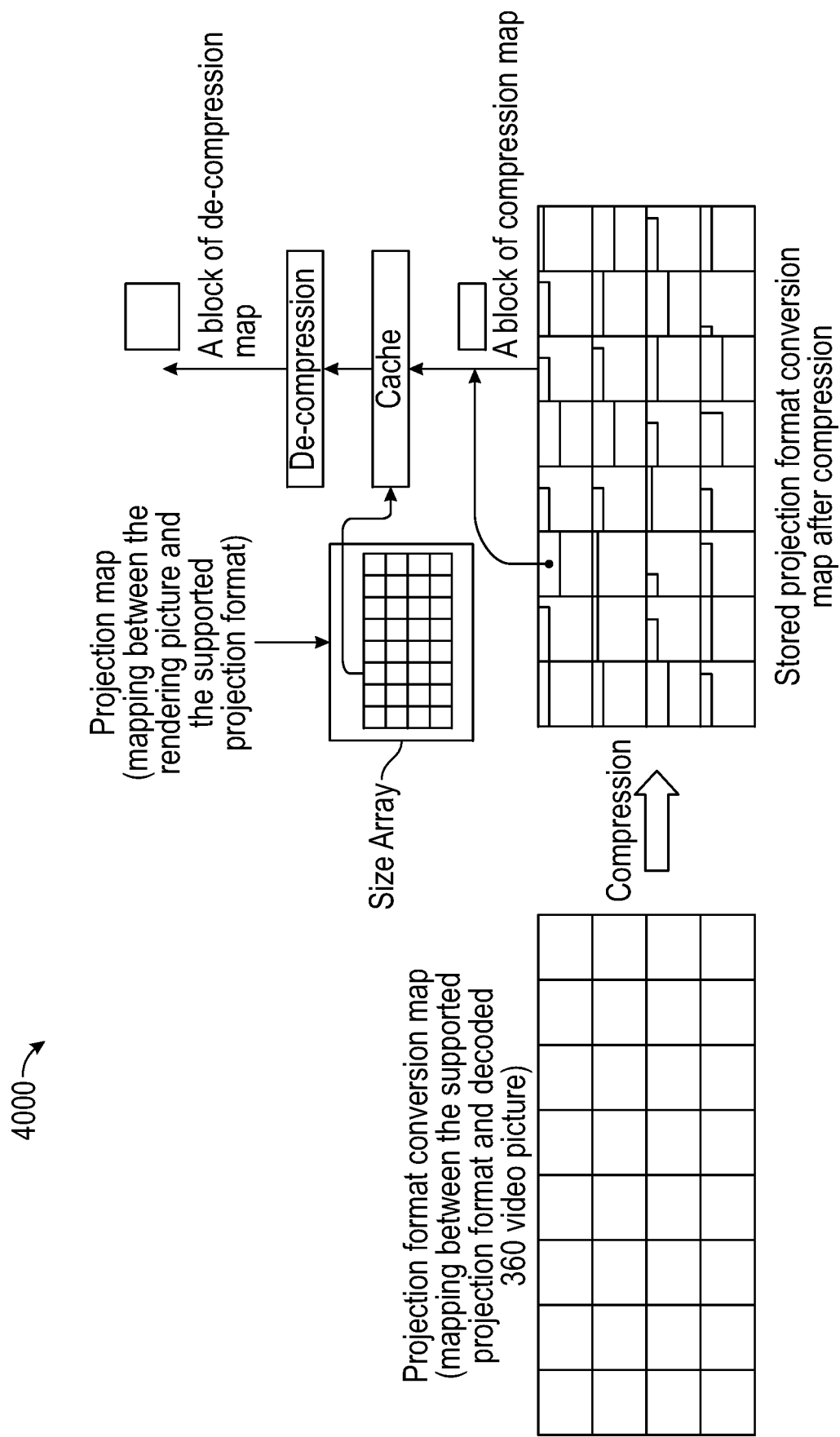
FIG. 40 conceptually illustrates an example of a storage layout of a compressed projection format conversion map.

FIG. 40 conceptually illustrates an example of a storage layout of a compressed projection format conversion map 4000. A compressed projection map can be stored in the continuous off-chip memory as long as the block size of the projection map is aligned with the rendering block size, for the fact that there is one to one mapping between the a projection map block and a rendering block once the block size is aligned. However, for a compressed projection format conversion map each map block has to be stored using same amount of memory to guarantee random access. As shown in FIG. 40, which portion of projection format conversion map is used for rendering of the current block is determined by a block of coordinates in the projection map, which in return may correspond to a group of map blocks in the projection format conversion map. To avoid the need of loading entire projection format conversation map for rendering a block, the storage of the compressed projection format conversion map may provide random access, so that particular map blocks in the projection format conversion map are loaded. In FIG. 40, the compressed blocks of a projection format conversion map occupy a same amount of memory, and a size array is stored to record the map block size after compression. The storage of size array may be provided so that the map blocks of a compressed size are loaded, achieving the purpose of coordinate compression for memory bandwidth saving of the projection format conversion map.

If a projection format has multiple faces, such as cube projection format with six faces, there may be discontinuous face boundaries in a layout of a 360 degree video picture. For rendering, such as using bilinear filtering that normally uses four nearest reference samples of integer-pel position for generating of a rendering sample, rendering artefacts may occur if those four reference samples cross discontinuous face boundaries. In the coordinate compression algorithm, the absolute X, Y coordinates (the coordinate origin is the position of the upper-left corner of input 360 degree video picture regardless of face ID values) may be compressed, such that the face ID values are discarded for saving memory bandwidth. In order to avoid the issue of reference sample crossing discontinuous face boundaries, the X, Y coordinates on the both sides of a discontinuous face boundary are rounded to integer-pel precision when using software to generate the projection map or projection format conversion map of an emerging projection format of multiple faces.

Figure 41:
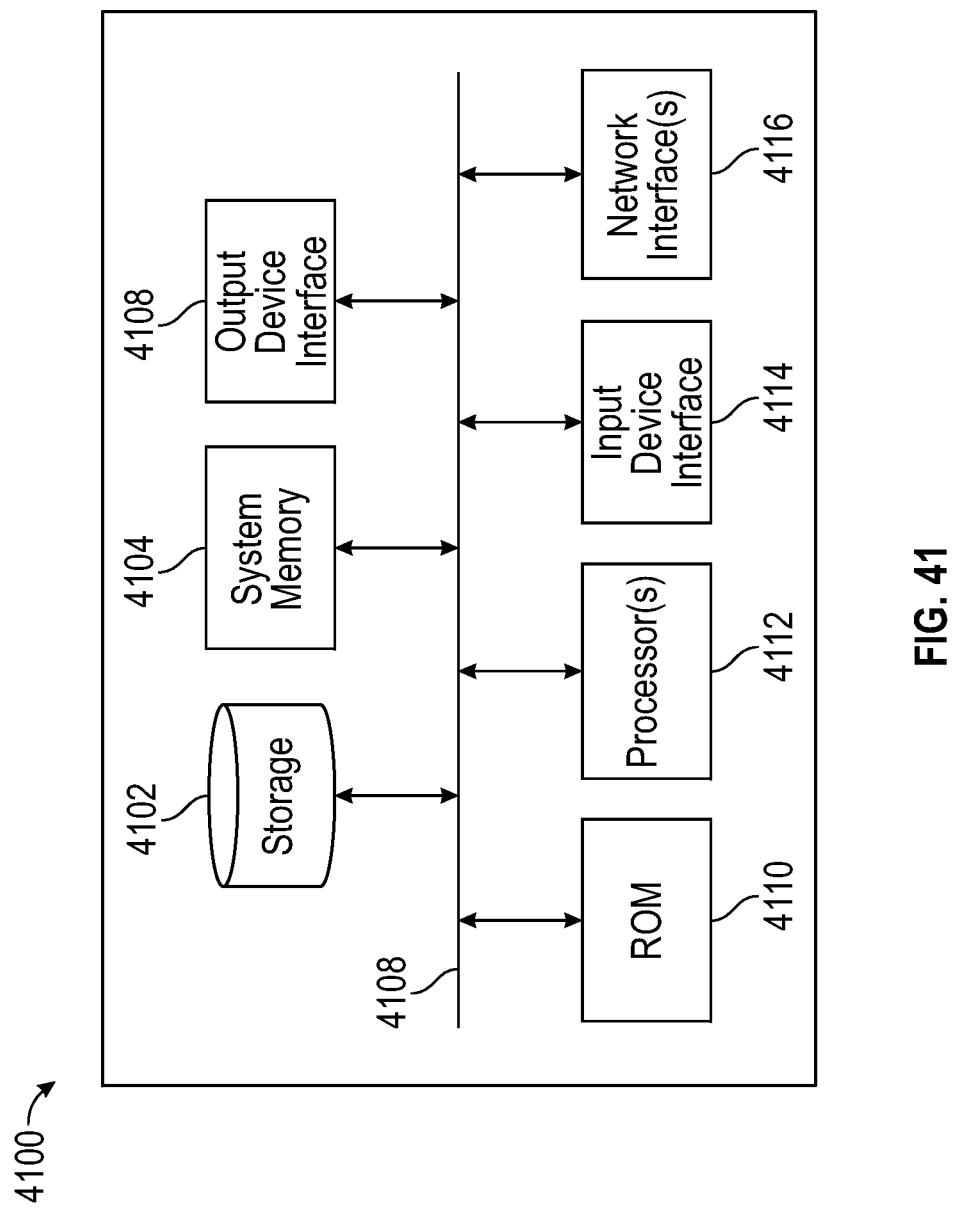
FIG. 41 conceptually illustrates an electronic system with which one or more implementations of the subject technology may be implemented.

FIG. 41 conceptually illustrates an electronic system 4100 with which one or more implementations of the subject technology may be implemented. The electronic system 4100, for example, can be a network device, a media converter, a desktop computer, a laptop computer, a tablet computer, a server, a switch, a router, a base station, a receiver, a phone, or generally any electronic device that transmits signals over a network. Such an electronic system 4100 includes various types of computer readable media and interfaces for various other types of computer readable media. In one or more implementations, the electronic system 4100 may be, or may include, one or more of the devices 102, 104, 106, 108, 110, the 360 degree video projection format conversion device, and/or the 360 degree video playback device. The electronic system 4100 includes a bus 4108, one or more processing unit(s) 4112, a system memory 4104, a read-only memory (ROM) 4110, a permanent storage device 4102, an input device interface 4114, an output device interface 4106, and a network interface 4116, or subsets and variations thereof.

The bus 4108 collectively represents all system, peripheral, and chipset buses that communicatively connect the numerous internal devices of the electronic system 4100. In one or more implementations, the bus 4108 communicatively connects the one or more processing unit(s) 4112 with the ROM 4110, the system memory 4104, and the permanent storage device 4102. From these various memory units, the one or more processing unit(s) 4112 retrieves instructions to execute and data to process in order to execute the processes of the subject disclosure. The one or more processing unit(s) 4112 can be a single processor or a multi-core processor in different implementations.

The ROM 4110 stores static data and instructions that are needed by the one or more processing unit(s) 4112 and other modules of the electronic system. The permanent storage device 4102, on the other hand, is a read-and-write memory device. The permanent storage device 4102 is a non-volatile memory unit that stores instructions and data even when the electronic system 4100 is off. One or more implementations of the subject disclosure use a mass-storage device (such as a magnetic or optical disk and its corresponding disk drive) as the permanent storage device 4102.

Other implementations use a removable storage device (such as a floppy disk, flash drive, and its corresponding disk drive) as the permanent storage device 4102. Like the permanent storage device 4102, the system memory 4104 is a read-and-write memory device. However, unlike the permanent storage device 4102, the system memory 4104 is a volatile read-and-write memory, such as random access memory. System memory 4104 stores any of the instructions and data that the one or more processing unit(s) 4112 needs at runtime. In one or more implementations, the processes of the subject disclosure are stored in the system memory 4104, the permanent storage device 4102, and/or the ROM 4110. From these various memory units, the one or more processing unit(s) 4112 retrieves instructions to execute and data to process in order to execute the processes of one or more implementations.

The bus 4108 also connects to the input device interface 4114 and the output device interface 4106. The input device interface 4114 enables a user to communicate information and select commands to the electronic system. Input devices used with the input device interface 4114 include, for example, alphanumeric keyboards and pointing devices (also called "cursor control devices"). The output device interface 4106 enables, for example, the display of images generated by the electronic system 4100. Output devices used with the output device interface 4106 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 41, the bus 4108 also couples the electronic system 4100 to one or more networks (not shown) through one or more network interfaces 4116. In this manner, the computer can be a part of one or more network of computers (such as a local area network ("LAN"), a wide area network ("WAN"), or an Intranet, or a network of networks, such as the Internet. Any or all components of the electronic system 4100 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above may not be understood as requiring such separation in all embodiments, and it may be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system, comprising:
   a video capture device configured to capture 360 degree video, the 360 degree video being captured in a first projection format;
   an encoding device configured to encode the captured 360 degree video into a 360 degree video bitstream, the 360 degree video bitstream being encoded with an indication of the first projection format;
   a decoding device configured to decode the 360 degree video bitstream;
   a rendering device configured to convert the decoded 360 degree video bitstream from the first projection format to a second projection format or generate a rendered viewport of the 360 degree video bitstream, based on the indication; and
   a display device configured to render and display the 360 degree video bitstream in the second projection format or display the rendered viewport from the rendering device.

2. The system of claim 1, wherein the rendering device is further configured to:
   precompute or compute on-the-flay a projection map for the first projection format based on one or more of field of view angles, viewing direction angles, an input picture size of the captured 360 degree video, a rendering picture size for the 360 degree video bitstream, a projection format of the 360 degree video, and rendering precision values; and
   storing the projection map in a data structure accessible to the rendering device.

3. The system of claim 2, wherein the rendering device is further configured to:
   receive the projection map as input from the data structure;
   load the projection map for a current rendering block;
   load one or more reference blocks for the current rendering block from a data buffer accessible to the rendering device; and
   render the current rendering block using the projection map and the one or more reference blocks.

4. The system of claim 2, wherein the rendering device is further configured to:
   generate a first projection map for a luminance picture component of the decoded 360 degree video; and
   generate a second projection map for a chrominance picture component of the decoded 360 degree video, wherein the second projection map for the chrominance picture component is generated from the first projection map for the luminance picture component.

5. The system of claim 2, wherein the rendering device is further configured to:
   compute an estimated rendering picture size based on one or more of field of view angles, the input picture size, and the projection format;
   select a scaling ratio from a plurality of scaling ratios, the selected scaling ratio minimizing a difference between the estimated rendering picture size and a scaled display picture size; and
   compute the rendering picture size using the display picture size and the selected scaling ratio.

6. The system of claim 2, wherein the rendering device is further configured to:
   compute a first pixel ratio of the decoded 360 degree video;
   compute a second pixel ratio for the rendered 360 degree video bitstream; and
   compute one or more of the field of view angles using the first pixel ratio and the second pixel ratio.

7. The system of claim 1, further comprising:
   a processing device configured to generate a memory bandwidth consumption map based on an input picture size of the captured 360 degree video, a rendering picture size for the 360 degree video bitstream and a projection format of the 360 degree video, the memory bandwidth consumption map including a representation of a memory bandwidth measurement as a function of a horizontal field of view angle and a vertical field of view angle, wherein the memory bandwidth measurement indicates a ratio of a total number of loaded samples from the decoded 360 degree video to the input picture size.

8. The system of claim 7, wherein the processing device is further configured to:
   receive a viewing direction angle as input;
   receive a predetermined memory bandwidth constraint; and
   select one or more field of view angles for rendering the decoded 360 degree video bitstream from the memory bandwidth consumption map based on the viewing direction angle and the predetermined memory bandwidth constraint.

9. A computer-implemented method comprising:
   capturing a 360 degree video in a first projection format;
   encoding the captured 360 degree video into a 360 degree video bitstream, the 360 degree video bitstream being encoded with an indication of the first projection format;
   decoding the 360 degree video bitstream;
   converting the decoded 360 degree video bitstream from the first projection format to a second projection format based on the indication;
   rendering the decoded 360 degree video bitstream in the first projection format or the second projection format; and
   displaying the 360 degree video bitstream in the second projection format or a rendered viewport of the 360 degree video bitstream.

10. The computer-implemented method of claim 9, further comprising:
    precomputing or computing on-the-fly a projection map for the first projection format based on one or more of field of view angles, viewing direction angles, an input picture size of the captured 360 degree video, a rendering picture size for the 360 degree video bitstream, a projection format of the 360 degree video, and rendering precision values; and storing the projection map in a data structure.

11. The computer-implemented method of claim 10, wherein the converting comprises:
receiving the projection map as input from the data structure;
loading the projection map for a current rendering block;
loading one or more reference blocks for the current rendering block from a data buffer; and
rendering the current rendering block using the projection map and the one or more reference blocks.

12. The computer-implemented method of claim 10, further comprising:
generating a first projection map for a luminance picture component of the decoded 360 degree video; and
generating a second projection map for a chrominance picture component of the decoded 360 degree video,
wherein the second projection map for the chrominance picture component is generated from the first projection map for the luminance picture component.

13. The computer-implemented method of claim 10, further comprising:
computing an estimated rendering picture size based on one or more of field of view angles, the input size, and the projection format;
selecting a scaling ratio from a plurality of scaling ratios, the selected scaling ratio minimizing a different between the estimated rendering picture size and a scaled display picture size; and
computing the rendering picture size using the display picture size and the selected scaling ratio.

14. The computer-implemented method of claim 10, further comprising:
computing a first pixel ratio of the decoded 360 degree video;
computing a second pixel ratio for the rendered 360 degree video bitstream; and
computing one or more of the field of view angles using the first pixel ratio and the second pixel ratio.

15. The computer-implemented method of claim 10, further comprising:
generating a memory bandwidth consumption map based on an input picture size of the captured 360 degree video, a rendering picture size for the 360 degree video bitstream and a projection format of the 360 degree video, the memory bandwidth consumption map including a three-dimensional representation of a memory bandwidth measurement as a function of a horizontal field of view angle and a vertical field of view angle, wherein the memory bandwidth measurement indicates a ratio of a total number of loaded samples from the decoded 360 degree video to the input picture size.

16. The computer-implemented method of claim 15, further comprising:
receiving a viewing direction angle as input;
receiving a predetermined memory bandwidth constraint; and
selecting one or more field of view angles for rendering the decoded 360 degree video bitstream from the memory bandwidth consumption map based on the viewing direction angle and the predetermined memory bandwidth constraint.

17. A system comprising:
a video capture device configured to capture 360 degree video;
an encoding device configured to encode the captured 360 degree video into a 360 degree video bitstream;
a decoding device configured to decode the 360 degree video bitstream, the decoded 360 degree video bitstream being stored in a decoded picture buffer;
a processing device configured to generate a plurality of projection maps, each of the plurality of projections maps being associated with a different one of a plurality of projection formats, the plurality of projection maps being encoded and stored in a projection map buffer accessible to the processing device;
a rendering device configured to render the decoded 360 degree video bitstream using one of the plurality of projections maps from the projection map buffer; and
a display device configured to display the rendered 360 degree video bitstream.

18. The system of claim 17, wherein the processing device is further configured to:
generate a projection format conversion map from a first projection format to a second projection format, the projection format conversion map indicating a mapping between a sample location of the decoded 360 degree video in the first projection format and a corresponding sample location of the decoded 360 degree video in the second projection format, the projection format conversion map being stored and compressed in a projection format conversion map buffer;
obtain one of the plurality of projection maps from the projection map buffer, the obtained projection map indicating a mapping between a sample location in a viewport of the decoded 360 degree video and a corresponding sample location of the 360 degree video in the first projection format; and
generate a coordinate mapping between the sample location in the viewport of the 360 degree video and the corresponding sample location of the decoded 360 degree video in the second projection format,
wherein the rendering device is further configured to render the decoded 360 degree video using the coordinate mapping,
wherein each of the plurality of projection maps and the projection format conversion map are provided for transmission from the processing device of a server to the rendering device of a client device.

19. The system of claim 18, wherein the processing device is further configured to:
detect a change in one or more of field of view angles or viewing direction angles of the decoded 360 degree video; and
generate, in response to detecting the change, a new projection map using the coordinate mapping, the new projection map being stored and compressed in the projection map buffer.

20. The system of claim 19, wherein each of the plurality of projections maps is encoded in an array of two-dimensional coordinates in integer-pel or sub-pel precision, wherein the processing device is further configured to:
determine a coordinate prediction for a block of the projection map from one or more neighboring pixels;
interleave one or more residual blocks associated with the coordinate prediction;
raster-scan the interleaved one or more residual blocks into a one-dimensional sequence; and
compress the raster-scanned residual blocks with adaptive zero-run coding and residual sample coding using respective Golomb and Exp-Golomb codes.

* * * * *

UNITED STATES PATENT AND TRADEMARK OFFICE
CERTIFICATE OF CORRECTION

PATENT NO. : 10,681,326 B2
APPLICATION NO. : 15/599443
DATED : June 9, 2020
INVENTOR(S) : Minhua Zhou et al.

Page 1 of 1

It is certified that error appears in the above-identified patent and that said Letters Patent is hereby corrected as shown below:

In the Claims

Column 35, Line 40 (Claim 2): Replace "on-the-flay" with --on-the-fly--;

Column 37, Line 26 (Claim 13): Replace "different" with --difference--.

Signed and Sealed this
Eighteenth Day of August, 2020

Andrei Iancu
*Director of the United States Patent and Trademark Office*